(12) United States Patent
Knoblach et al.

(10) Patent No.: US 9,519,045 B2
(45) Date of Patent: Dec. 13, 2016

(54) SYSTEMS AND APPLICATIONS OF LIGHTER-THAN-AIR (LTA) PLATFORMS

(71) Applicant: SPACE DATA CORPORATION, Chandler, AZ (US)

(72) Inventors: Gerald M. Knoblach, Chandler, AZ (US); Eric A. Frische, Sun Lakes, AZ (US); Bruce Alan Barkley, Phoenix, AZ (US)

(73) Assignee: SPACE DATA CORPORATION, Chandler, AZ (US)

( * ) Notice: Subject to any disclaimer, the term of this patent is extended or adjusted under 35 U.S.C. 154(b) by 34 days.

(21) Appl. No.: 14/473,691

(22) Filed: Aug. 29, 2014

(65) Prior Publication Data

US 2015/0309157 A1  Oct. 29, 2015

Related U.S. Application Data

(60) Division of application No. 13/757,585, filed on Feb. 1, 2013, now Pat. No. 8,825,232, which is a division of
(Continued)

(51) Int. Cl.
*B64B 1/40* (2006.01)
*G01S 5/06* (2006.01)
(Continued)

(52) U.S. Cl.
CPC . *G01S 5/06* (2013.01); *B64B 1/40* (2013.01); *B64B 1/44* (2013.01); *B64B 1/62* (2013.01);
(Continued)

(58) Field of Classification Search
CPC ......... B64B 1/40; B64B 1/44; H04B 7/18504; H04B 7/18576; G01S 5/04; G01S 5/06; B64C 19/00; A61F 2/958
(Continued)

(56) References Cited

U.S. PATENT DOCUMENTS 2,151,336 A  3/1939  Scharlau
2,366,423 A  1/1945  Pear, Jr.
(Continued)

FOREIGN PATENT DOCUMENTS

DE  1188951  3/1965
EP  0837567 A2  4/1998
(Continued)

OTHER PUBLICATIONS

US Non Final Office Action (U.S. Appl. No. 14/328,331) dated Jan. 28, 2015.
(Continued)

*Primary Examiner* — Dalena Tran
(74) *Attorney, Agent, or Firm* — Pillsbury Winthrop Shaw Pittman LLP

(57) ABSTRACT

Innovative new methods in connection with lighter-than-air (LTA) free floating platforms, of facilitating legal transmitter operation, platform flight termination when appropriate, environmentally acceptable landing, and recovery of these devices are provided. The new systems and methods relate to rise rate control, geo-location from a LTA platform including landed payload and ground-based vehicle locations, and steerable recovery systems.

30 Claims, 26 Drawing Sheets

Related U.S. Application Data application No. 12/099,004, filed on Apr. 7, 2008, now abandoned, which is a division of application No. 10/673,474, filed on Sep. 30, 2003, now Pat. No. 7,356,390, which is a continuation-in-part of application No. 09/342,440, filed on Jun. 29, 1999, now Pat. No. 6,628,941, and a continuation of application No. 10/129,666, filed as application No. PCT/US02/12228 on Apr. 18, 2002, now Pat. No. 7,203,491.

(60) Provisional application No. 60/284,799, filed on Apr. 18, 2001.

(51) Int. Cl.

| | | |
|---|---|---|
| *B64B 1/44* | (2006.01) | |
| *B64B 1/64* | (2006.01) | |
| *B64B 1/70* | (2006.01) | |
| *H04B 7/185* | (2006.01) | |
| *B64C 19/00* | (2006.01) | |
| *B64B 1/62* | (2006.01) | |
| *G05D 1/04* | (2006.01) | |
| *G01S 5/12* | (2006.01) | |
| *G01S 19/42* | (2010.01) | |
| *H04W 4/02* | (2009.01) | |

(52) U.S. Cl.
CPC . *B64B 1/64* (2013.01); *B64B 1/70* (2013.01); *B64C 19/00* (2013.01); *G01S 5/12* (2013.01); *G01S 19/42* (2013.01); *G05D 1/042* (2013.01); *H04B 7/18502* (2013.01); *H04B 7/18504* (2013.01); *H04B 7/18576* (2013.01); *H04W 4/023* (2013.01); *H04W 4/027* (2013.01)

(58) Field of Classification Search
USPC ........ 701/4, 300, 400; 455/431, 456.1, 13.1; 244/31, 128, 3.18, 75.1, 97; 342/458, 462, 342/465
See application file for complete search history.

(56) References Cited

U.S. PATENT DOCUMENTS

| | | |
|---|---|---|
| 2,462,102 A | 2/1949 | Istvan |
| 2,542,823 A | 2/1951 | Lyle |
| 2,598,064 A | 5/1952 | Lindenblad |
| 2,626,348 A | 1/1953 | Nobles |
| 3,030,500 A | 4/1962 | Katzin |
| 3,030,509 A | 4/1962 | Carlson |
| 3,045,952 A | 7/1962 | Underwood |
| 3,058,694 A | 10/1962 | Fazio et al. |
| 3,174,705 A | 3/1965 | Schiff et al. |
| 3,206,749 A | 9/1965 | Chatelain |
| 3,384,891 A | 5/1968 | Anderson |
| 3,404,278 A | 10/1968 | Chope |
| 3,471,856 A | 10/1969 | Laughlin, Jr. et al. |
| 3,555,552 A | 1/1971 | Alford |
| 3,674,225 A | 7/1972 | Johnson |
| 3,742,358 A | 6/1973 | Cesaro |
| 3,781,893 A | 12/1973 | Beukers et al. |
| 3,781,894 A | 12/1973 | Ancona et al. |
| RE28,725 E | 2/1976 | Hutchinson et al. |
| 4,123,987 A | 11/1978 | Singerle et al. |
| 4,249,181 A | 2/1981 | Lee |
| 4,262,864 A | 4/1981 | Eshoo |
| 4,394,780 A | 7/1983 | Mooradian |
| 4,419,766 A | 12/1983 | Goeken et al. |
| 4,457,477 A | 7/1984 | Regipa |
| 4,472,720 A | 9/1984 | Reesor |
| 4,481,514 A | 11/1984 | Beukers et al. |
| 4,509,053 A | 4/1985 | Robin et al. |
| 4,509,851 A | 4/1985 | Ippolito et al. |
| 4,589,093 A | 5/1986 | Ippolito et al. |
| 4,595,928 A | 6/1986 | Wingard |
| 4,689,739 A | 8/1987 | Federico et al. |
| 4,696,052 A | 9/1987 | Breeden |
| 4,740,783 A | 4/1988 | Lawrence et al. |
| 4,747,160 A | 5/1988 | Bossard |
| 4,868,577 A | 9/1989 | Wingard |
| 4,979,170 A | 12/1990 | Gilhousen et al. |
| 4,995,572 A | 2/1991 | Piasecki et al. |
| 5,005,513 A | 4/1991 | Van Patten et al. |
| 5,067,172 A | 11/1991 | Schloemer |
| 5,119,397 A | 6/1992 | Dahlin et al. |
| 5,121,128 A | 6/1992 | Lidth de Jeude et al. |
| 5,123,112 A | 6/1992 | Choate |
| 5,175,556 A | 12/1992 | Berkowitz |
| 5,189,734 A | 2/1993 | Bailey et al. |
| 5,204,970 A | 4/1993 | Stengel et al. |
| 5,212,804 A | 5/1993 | Choate |
| 5,214,789 A | 5/1993 | George |
| 5,218,366 A | 6/1993 | Cardamone et al. |
| 5,235,633 A | 8/1993 | Dennison et al. |
| 5,239,668 A | 8/1993 | Davis |
| 5,287,541 A | 2/1994 | Davis |
| 5,327,572 A | 7/1994 | Freeburg |
| 5,345,448 A | 9/1994 | Keskitalo |
| 5,384,565 A | 1/1995 | Cannon |
| 5,420,592 A | 5/1995 | Johnson |
| 5,430,656 A | 7/1995 | Dekel et al. |
| 5,433,726 A | 7/1995 | Horstein et al. |
| 5,439,190 A | 8/1995 | Horstein et al. |
| 5,444,762 A | 8/1995 | Frey et al. |
| 5,455,823 A | 10/1995 | Noreen et al. |
| 5,467,681 A | 11/1995 | Liberman |
| 5,471,641 A | 11/1995 | Dosiere et al. |
| 5,488,648 A | 1/1996 | Womble |
| 5,519,761 A | 5/1996 | Gilhousen |
| 5,533,029 A | 7/1996 | Gardner |
| 5,557,656 A | 9/1996 | Ray et al. |
| 5,559,865 A | 9/1996 | Gilhousen |
| 5,584,047 A | 12/1996 | Tuck |
| 5,615,409 A | 3/1997 | Forssen et al. |
| 5,645,248 A | 7/1997 | Campbell |
| 5,745,685 A | 4/1998 | Kirchner et al. |
| 5,748,620 A | 5/1998 | Capurka |
| 5,759,712 A | 6/1998 | Hockaday |
| 5,761,656 A | 6/1998 | Ben-Shachar |
| 5,781,739 A | 7/1998 | Bach et al. |
| 5,788,187 A | 8/1998 | Castiel et al. |
| 5,832,380 A | 11/1998 | Ray et al. |
| 5,835,059 A | 11/1998 | Nadel et al. |
| 5,870,549 A | 2/1999 | Bobo |
| 5,899,975 A | 5/1999 | Nielsen |
| 5,907,949 A | 6/1999 | Falke et al. |
| 5,909,299 A | 6/1999 | Sheldon, Jr. et al. |
| 5,960,200 A | 9/1999 | Eager et al. |
| 5,978,940 A | 11/1999 | Newman et al. |
| 5,987,432 A | 11/1999 | Zusman et al. |
| 5,992,795 A | 11/1999 | Tockert |
| 5,996,001 A | 11/1999 | Quarles et al. |
| 6,061,562 A | 5/2000 | Martin et al. |
| 6,067,579 A | 5/2000 | Hardman et al. |
| 6,097,688 A | 8/2000 | Ichimura et al. |
| 6,108,673 A | 8/2000 | Brandt et al. |
| 6,128,622 A | 10/2000 | Bach et al. |
| 6,141,660 A | 10/2000 | Bach et al. |
| 6,167,263 A | 12/2000 | Campbell |
| 6,212,550 B1 | 4/2001 | Segur |
| 6,226,494 B1* | 5/2001 | Lundstrom ........ H04B 7/18513 342/352 |
| 6,243,737 B1 | 6/2001 | Flanagan et al. |
| 6,250,309 B1 | 6/2001 | Krichen et al. |
| 6,253,200 B1 | 6/2001 | Smedley et al. |
| 6,256,676 B1 | 7/2001 | Taylor et al. |
| 6,259,447 B1 | 7/2001 | Kanetake et al. |
| 6,271,768 B1 | 8/2001 | Frazier et al. |
| 6,289,382 B1 | 9/2001 | Bowman-Amuah |
| 6,324,398 B1 | 11/2001 | Lanzerotti et al. |
| 6,397,253 B1 | 5/2002 | Quinlan et al. |
| 6,401,136 B1 | 6/2002 | Britton et al. |
| 6,414,947 B1 | 7/2002 | Legg et al. |

(56) References Cited

U.S. PATENT DOCUMENTS

| | | |
|---|---|---|
| 6,421,010 B1 * | 7/2002 | Chadwick ............... G01S 3/48 342/462 |
| 6,446,110 B1 | 9/2002 | Lectiona et al. |
| 6,453,343 B1 | 9/2002 | Housel et al. |
| 6,507,856 B1 | 1/2003 | Chen et al. |
| 6,507,857 B1 | 1/2003 | Yalcinalp |
| 6,510,466 B1 | 1/2003 | Cox et al. |
| 6,513,758 B1 | 2/2003 | Lloyd et al. |
| 6,518,877 B1 * | 2/2003 | Starkey ............... B60C 23/004 340/447 |
| 6,519,617 B1 | 2/2003 | Wanderski et al. |
| 6,529,921 B1 | 3/2003 | Berkowitz et al. |
| 6,530,078 B1 | 3/2003 | Shmid et al. |
| 6,535,896 B2 | 3/2003 | Britton et al. |
| 6,560,639 B1 | 5/2003 | Dan et al. |
| 6,589,291 B1 | 7/2003 | Boag et al. |
| 6,591,272 B1 | 7/2003 | Williams |
| 6,601,071 B1 | 7/2003 | Bowker et al. |
| 6,606,642 B2 | 8/2003 | Ambler et al. |
| 6,613,098 B1 | 9/2003 | Sorge et al. |
| 6,615,383 B1 | 9/2003 | Talluri et al. |
| 6,628,941 B2 | 9/2003 | Knoblach et al. |
| 6,643,825 B1 | 11/2003 | Li et al. |
| 6,665,861 B1 | 12/2003 | Francis et al. |
| 6,668,354 B1 | 12/2003 | Chen et al. |
| 6,687,873 B1 | 2/2004 | Ballantyne et al. |
| 6,697,489 B1 | 2/2004 | Carlson |
| 6,728,685 B1 | 4/2004 | Ahluwalia |
| 6,738,975 B1 | 5/2004 | Yee et al. |
| 6,753,889 B1 | 6/2004 | Najmi |
| 6,772,206 B1 | 8/2004 | Lowry et al. |
| 6,775,680 B2 | 8/2004 | Ehrman et al. |
| 6,799,299 B1 | 9/2004 | Li et al. |
| 6,810,429 B1 | 10/2004 | Walsh et al. |
| 6,816,883 B2 | 11/2004 | Baumeister et al. |
| 6,826,696 B1 | 11/2004 | Chawla et al. |
| 6,850,979 B1 | 2/2005 | Saulpaugh et al. |
| 6,859,834 B1 | 2/2005 | Arora et al. |
| 6,874,146 B1 | 3/2005 | Lyengar |
| 6,889,360 B1 | 5/2005 | Ho et al. |
| 6,901,403 B1 | 5/2005 | Bata et al. |
| 6,901,430 B1 | 5/2005 | Smith |
| 6,904,598 B2 | 6/2005 | Abileah et al. |
| 6,907,564 B1 | 6/2005 | Burchhardt et al. |
| 6,909,903 B2 | 6/2005 | Wang |
| 6,910,216 B2 | 6/2005 | Abileah et al. |
| 6,912,719 B2 | 6/2005 | Elderon et al. |
| 6,915,523 B2 | 7/2005 | Dong et al. |
| 6,948,117 B2 | 9/2005 | Van Eaton et al. |
| 6,948,174 B2 | 9/2005 | Chiang et al. |
| 6,952,717 B1 | 10/2005 | Monchilovich et al. |
| 6,964,053 B2 | 11/2005 | Ho et al. |
| 6,971,096 B1 | 11/2005 | Ankireddipally et al. |
| 6,980,963 B1 | 12/2005 | Hanzek |
| 6,980,993 B2 | 12/2005 | Horvitz et al. |
| 7,000,238 B2 | 2/2006 | Nadler et al. |
| 7,013,306 B1 | 3/2006 | Turba et al. |
| 7,043,687 B2 | 5/2006 | Knauss et al. |
| 7,046,934 B2 | 5/2006 | Badesha et al. |
| 7,051,032 B2 | 5/2006 | Chu-Carroll et al. |
| 7,054,901 B2 | 5/2006 | Shafer |
| 7,058,955 B2 | 6/2006 | Porkka |
| 7,069,291 B2 | 6/2006 | Graves et al. |
| 7,080,092 B2 | 7/2006 | Upton |
| 7,107,285 B2 | 9/2006 | von Kaenel et al. |
| 7,111,011 B2 | 9/2006 | Kobayashi et al. |
| 7,120,645 B2 | 10/2006 | Manikutty et al. |
| 7,120,702 B2 | 10/2006 | Huang et al. |
| 7,124,299 B2 | 10/2006 | Dick et al. |
| 7,130,893 B2 | 10/2006 | Chiang et al. |
| 7,134,075 B2 | 11/2006 | Hind et al. |
| 7,143,190 B2 | 11/2006 | Christensen et al. |
| 7,152,205 B2 | 12/2006 | Day et al. |
| 7,181,493 B2 | 2/2007 | English et al. |
| 7,266,582 B2 | 9/2007 | Stelting |
| 7,296,229 B2 | 11/2007 | Junkermann |
| 7,358,862 B2 * | 4/2008 | Andersson ............... G01W 1/08 340/870.1 |
| 7,398,221 B1 | 7/2008 | Bensoussan et al. |
| 7,418,508 B2 | 8/2008 | Haller et al. |
| 7,421,701 B2 | 9/2008 | Dinh et al. |
| 7,590,987 B2 | 9/2009 | Behrendt et al. |
| 8,820,678 B2 | 9/2014 | Devaul et al. |
| 2001/0004583 A1 | 6/2001 | Uchida |
| 2001/0014900 A1 | 8/2001 | Brauer et al. |
| 2001/0016869 A1 | 8/2001 | Baumeister et al. |
| 2001/0032232 A1 | 10/2001 | Zombek et al. |
| 2001/0034791 A1 | 10/2001 | Clubb et al. |
| 2001/0037358 A1 | 11/2001 | Clubb et al. |
| 2001/0047311 A1 | 11/2001 | Singh |
| 2002/0010716 A1 | 1/2002 | McCartney et al. |
| 2002/0031101 A1 | 3/2002 | Petite et al. |
| 2002/0035583 A1 | 3/2002 | Price et al. |
| 2002/0038335 A1 | 3/2002 | Dong et al. |
| 2002/0038336 A1 | 3/2002 | Abileah et al. |
| 2002/0042849 A1 | 4/2002 | Ho et al. |
| 2002/0046294 A1 | 4/2002 | Brodsky et al. |
| 2002/0049815 A1 | 4/2002 | Dattatri |
| 2002/0052968 A1 | 5/2002 | Bonefas et al. |
| 2002/0056012 A1 | 5/2002 | Abileah et al. |
| 2002/0059344 A1 | 5/2002 | Britton et al. |
| 2002/0078010 A1 | 6/2002 | Ehrman et al. |
| 2002/0078255 A1 | 6/2002 | Narayan |
| 2002/0083099 A1 | 6/2002 | Knauss et al. |
| 2002/0099735 A1 | 7/2002 | Schroeder et al. |
| 2002/0100027 A1 | 7/2002 | Binding et al. |
| 2002/0107915 A1 | 8/2002 | Ally et al. |
| 2002/0111989 A1 | 8/2002 | Ambler et al. |
| 2002/0116454 A1 | 8/2002 | Dyla et al. |
| 2002/0133569 A1 | 9/2002 | Huang et al. |
| 2002/0143820 A1 | 10/2002 | Van Eaton et al. |
| 2002/0156930 A1 | 10/2002 | Velasquez |
| 2002/0160745 A1 | 10/2002 | Wang |
| 2002/0160805 A1 | 10/2002 | Laitinen et al. |
| 2002/0161801 A1 | 10/2002 | Hind et al. |
| 2002/0174340 A1 | 11/2002 | Dick et al. |
| 2002/0178031 A1 | 11/2002 | Sorensen et al. |
| 2002/0178290 A1 | 11/2002 | Coulthard et al. |
| 2002/0178299 A1 | 11/2002 | Teubner |
| 2002/0183900 A1 | 12/2002 | Sainthuile et al. |
| 2002/0188688 A1 | 12/2002 | Bice et al. |
| 2002/0194227 A1 | 12/2002 | Day et al. |
| 2002/0198974 A1 | 12/2002 | Shafer |
| 2003/0004746 A1 | 1/2003 | Kheirolomoom et al. |
| 2003/0007397 A1 | 1/2003 | Kobayashi et al. |
| 2003/0040955 A1 | 2/2003 | Anaya et al. |
| 2003/0046035 A1 | 3/2003 | Anaya et al. |
| 2003/0055768 A1 | 3/2003 | Anaya et al. |
| 2003/0065623 A1 | 4/2003 | Cornell et al. |
| 2003/0070006 A1 | 4/2003 | Nadler et al. |
| 2003/0074217 A1 | 4/2003 | Beisiegel et al. |
| 2003/0078902 A1 | 4/2003 | Leong et al. |
| 2003/0081002 A1 | 5/2003 | De Vorchik et al. |
| 2003/0093403 A1 | 5/2003 | Upton |
| 2003/0093436 A1 | 5/2003 | Brown et al. |
| 2003/0093468 A1 | 5/2003 | Gordon et al. |
| 2003/0093500 A1 | 5/2003 | Khodabakchian et al. |
| 2003/0097327 A1 | 5/2003 | Anaya et al. |
| 2003/0120730 A1 | 6/2003 | Kuno et al. |
| 2003/0121142 A1 | 7/2003 | Horvitz et al. |
| 2003/0126229 A1 | 7/2003 | Kantor et al. |
| 2003/0159111 A1 | 8/2003 | Fry |
| 2003/0163544 A1 | 8/2003 | Wookey et al. |
| 2003/0163585 A1 | 8/2003 | Elderon et al. |
| 2003/0167233 A1 | 9/2003 | Plederer et al. |
| 2003/0191970 A1 | 10/2003 | Devine et al. |
| 2003/0204460 A1 | 10/2003 | Robinson et al. |
| 2003/0212686 A1 | 11/2003 | Chu-Carroll et al. |
| 2004/0006739 A1 | 1/2004 | Mulligan |
| 2004/0024820 A1 | 2/2004 | Ozzie et al. |
| 2004/0030740 A1 | 2/2004 | Stelting |
| 2004/0054969 A1 | 3/2004 | Chiang et al. |
| 2004/0064466 A1 | 4/2004 | Manikutty et al. |
| 2004/0103370 A1 | 5/2004 | Chiang et al. |

(56) References Cited

U.S. PATENT DOCUMENTS

| | | | |
|---|---|---|---|
| 2004/0111464 | A1 | 6/2004 | Ho et al. |
| 2004/0205536 | A1 | 10/2004 | Newman et al. |
| 2004/0205731 | A1 | 10/2004 | Junkermann |
| 2004/0205770 | A1 | 10/2004 | Zhang et al. |
| 2004/0210469 | A1 | 10/2004 | Jones et al. |
| 2004/0221292 | A1 | 11/2004 | Chiang et al. |
| 2004/0230987 | A1 | 11/2004 | Snover et al. |
| 2004/0237034 | A1 | 11/2004 | Chiang et al. |
| 2005/0050228 | A1 | 3/2005 | Perham et al. |
| 2005/0091639 | A1 | 4/2005 | Patel |
| 2005/0165826 | A1 | 7/2005 | Ho et al. |
| 2005/0165936 | A1 | 7/2005 | Haller et al. |
| 2005/0166209 | A1 | 7/2005 | Merrick et al. |
| 2005/0171970 | A1 | 8/2005 | Ozzie et al. |
| 2005/0203944 | A1 | 9/2005 | Dinh et al. |
| 2005/0210414 | A1 | 9/2005 | Angiulo et al. |
| 2005/0278410 | A1 | 12/2005 | Espino |
| 2006/0265478 | A1 | 11/2006 | Chiang et al. |
| 2007/0083524 | A1 | 4/2007 | Fung et al. |
| 2007/0084283 | A1 | 4/2007 | Fung et al. |
| 2008/0263641 | A1 | 10/2008 | Dinh et al. |
| 2008/0271049 | A1 | 10/2008 | Dinh et al. |

FOREIGN PATENT DOCUMENTS

| | | |
|---|---|---|
| EP | 1058409 | 12/2000 |
| GB | 2216319 | 10/1989 |
| JP | 950826 | 2/1997 |
| JP | 2001273177 | 10/2001 |
| WO | WO9502094 | 1/1995 |
| WO | WO9504407 | 2/1995 |
| WO | WO9851568 A1 | 11/1998 |
| WO | WO0101710 | 1/2001 |
| WO | WO0167290 | 9/2001 |

OTHER PUBLICATIONS

US Non Final OA (U.S. Appl. No. 14/328,331) dated Feb. 9, 2015.
Notice of Allowance issued in U.S. Appl. No. 14/328,331 dated Mar. 30, 2015.
Office Action from Chinese Patent Office for Chinese Patent Application No. 201210096318.5.
Djuknic, G. M. et al. (1997) "Establishing Wireless Communications Services via High-Altitude Aeronautical Platforms: A Concept Whose Time Has Come?, " IEE Communictions Magazine 35(9):128-135.
Dymetman at al., XML and Multilingual Document Authoring: Convergent Trends, ACM Jul. 2000, pp. 243-249.
Gavan, J, (1996) "Stratospheric Quasi-Stationary Platforms: (SQ-SP) Complementary toRadio Satellite Systems," Electrical and Electronics Engineers in Israel, 1996, Nineteenth Convention of 283-286.
Glushko et al., An XML Framework for Agent-Based E-Commerce, ACM Mar. 1999, pp. 106-114.
Hase, Y. et al. (1998) "A Novel Broadband All Wireless Access Network Using Stratospheric Plaforms" VTC 1191-1194.
Huang et al., Design and Implementation of a Web-based HL7 Message Generation and Validation System, Google 2003, pp. 49-58.
Jantti, Jouko et al., "Solutions for IMS Connectivity", http://www-1.ibm.com/support/docsview.wss?uid=swg27009024&aid=1, Feb. 2006.
Jouko Jantti et al., "IMS Version 9 Implementation Guide", ibm.com/redbooks, pp. 139-143.
Long et al. "IMS Primer" Jan. 2000, IBM, Chapter 18.
Microfocus International "DBD, PSB and MFS Statements," 2001, available at <http://supportline,microfocus.com/documentation/books/mx25sp1/imdbds,htm> as of Jun. 16, 2009.
Mraz, Stephen J. (1998) "Nanosatellites Head for the Launch Pad" Machine Design 70(13):38, 42, 44, 46.
Office Action from U.S. Patent and Trademark Office for U.S. Appl. No. 12/168,451, received May 10, 2011.
Office Action from U.S. Patent and Trademark Office for U.S. Appl. No. 12/169,486, received Feb. 1, 2012.
OMG XML Metadata Interchange (XMI) Specification, Jun. 2000, OMG, v1.0.
PR Newswire, Sterling Commerce Announces Availability of First Data Transformation Engine to Support Both XML and Traditional EDI Standards, ProQuest May 12, 1999, pp. 1-3.
Suzuki et al., Managing the Software Design Documents with XML, ACM 1999, pp. 127-136.
UMLTM for EAI. UMLTM Profile and Interchange Models for Enterprise Application Integration (EAI), OMG document No. ad/Sep. 17, 2001.
"Attunity Connect for Mainframe, Native Os/390 Adapters to Data and Legacy," 2003, pp. 1-3.
"Connecting to IMS Using XML, Soap and Web Services", Shyh-Mei F. Ho. IMS Technical Conference, Koenigswinter, Germany, Oct. 15-17, 2002.
"Correlate IMSADF Secondary Transaction MFS Generation with the Generation of the Output Format Rule", IBM Technical Disclosure Bulletin, vol. 27, No. 1B, pp. 623-624, Jun. 1984.
"Creating WSDL and a Proxy Client From a Web Service", www.west-wind.com/webconnection/docs/_08413NI2E.htm, 2002.
"HostBridge and WebSphere: Integrating CICS with IBM's Application Server," a HostBridge White Paper, Jul. 23, 2002, pp. 1-34.
"IBM Mainframe," www.dmreview.com/whitepaper/WID1002720.pdf. Mar. 18, 2005.
"IMS Connect Guide and Reference version 1", http://publibfp.boulder.ibm.com/epubs/pdf/icgr0001.pdf, Oct. 2000, IBM.
"IMS Connect Guide and Reference", IBM et al. http://publibfp.boulder.ibm.com/epubs/pdf/hwsuga11.pdf, Oct. 2002.
"IMS Connector for Java, User's Guide and Reference", IBM VisualAge for Java, Version 3.5, 9 pages, IBM.
"IMS Follow-on Ideal for e-business", Excerpts from http://www.3.ibm.com/software/data/ims/ . . .ntations/two/imsv7enh/HTML!indexp54.htm, IBM Corporation, 2002.
"IMS Information", Excerpts from http://www.3.ibm.com/software/data/ims/ . . .ntations/two/imsv7enh/HTML!indexp55.htm, IBM Corporation, 2002.
"Learning Management Systems XML and Web Services," Finn Gronbaek, IBM Corporation, copyright 2001, Apr. 20, 2003, pp. 1-29.
"Leveraging IMS Applications and Data"< Excerpts from Leveraging IMS2 found at http://www.3.ibm.com/software/data/ims/ . . .ntations/two/imsv7enh/HTML/indexp52.htm, IBM Corporation, 2002.
"MFS XML Utility Version 9.3.0 User's Guide and Reference", 57 pages, IBM Corporation, ftp://ftp.software.ibm.com/software/data/ims/toolkit/mfswebsupport/mfsxml-v3.pdf, 2003.
"NetDynamics, PAC for IMS" User Guide, Precise Connectivity Systems, 1998.
"Quarterdeck Mosiac User Guide," 1995, Chapters 1-7.
"Remote Execution of IMS Transactions for OS/2", IBM Technical Disclosure Bulletin, vol. 34, No. 7B, p. 16, Dec. 1991.
"Requirements for Building Industrial Strength Web Services: The Service Broker", http:www.theserverside.com/Warticles.tss?1=Service-Broker Jul. 2001.
"S1215, WWW.IMS or Websphere Working with IMS," Ken Blackman, 39 pp.
"Web Services Description Language (WSDL) 1, "Mar. 2001, W3C.
"Web Services", www.webopedia.com/TERM/W/Web services.html, 2003.
"Web Services-The Next Step in the Evolution of the Web", Excerpt from http://www.3.ibm.com/software/data/ims/ . . .ntations/two/imsv7enh/HTML/indexp51.htm, IBM Corporation, 2002.
"What Web Services Are Not", www.webreference.com/xml/column50, 2003.
"What's Next in IMS Providing Integrated e-business Solutions: IMS Version 8," Excerpt from http://www.3.ibm.com/software/data/ims/ . . .ntations/two/imsv7enh/HTML/indexp53.htm, IBM Corporation, 2002.

(56) References Cited

OTHER PUBLICATIONS

"XML and IMS for Transparent Application Integration", Excerpt from http://www.3.ibm.com/software/data/ims/ . . .ntations/two/imsv7enh/HTML!indexp50.htm, IBM Corporation, 2002.
"XML Schema Part 2: Datatypes" 2001, W3C <http://www.w3.org/Tr/2001/Pr-xmischema-2-20010330>.
Application Development/Enablement, http://www.306.ibm.com/software/data/ims/presentation/five/trends2003/HTML!indexp15.htm, Oct. 11, 2003.
Arndt et al., An XML-Based Approach to Multimedia Software Engineering for Distance Learning, AVM 2002, pp. 525-532.
Blackman, "IMS eBusiness Update", IMS V8 Roadshow, 11 pages, IBM Corporation, http://www-306ibm.com.software/data/ims/shelf/presentation/oneday/IMSeBusinessUpdate2003.pdf, 2003.
Component of the Week: XMI Toolkit:, Jun. 1, 2001 http://www-106.ibm.com/developerworks/library/co-cow21. html.
Cover et al., "Web Services User Interface (WSUI) Initiative", http://xml.coverpages.org/wsui.html, Oct. 29, 2002.
Cover, Robin et al. Web Services for Interactive Applications (WSIA). [Web Services Component Model (WSCM)], http://xml.coverpages.org/wscm, Jan. 21, 2002, printed Oct. 31, 2007, 4 pages.
Cronje, "Absa Uses VGR to Ensure Online Availability", www-306.ibm.com/software/data/ims/quarterly/Winter2000/winter.htm.
Crouch et al., "Balloon and Airship" Compton's Interactive Encyclopedia, 5 pages excerpt, 1993-1994.
David A. Brown "Balloon Technology Offers High-Altitude Applications" Aviation Week & Space Technology, Nov. 16, 1992, pp. 56-57.
Diaz et al., Inter-Organizational Document Exchange-Facing the Conversion Problem with XML, ACM 2002, pp. 1043-1047.
Extended European Search Report mailed on Aug. 1, 2006, for patent application No. 05026040.5, 7 pages.
Extensible Markup Language (XML) 1.0 (Second Edition) Oct. 2000, W3C.
Google Search for IMS on Demand SOA IMS MFS Web Solution [retrieved Dec. 17, 2009 at http://www.google.com/search?hl=en$source=hp&q=MFS+MID+MOD+DIF+DOF&aq . . . .].
Hofstetter, the Future's Future: Implications of Emerging Technology for Special Education Program Planning, Journal of Special Education Technology, Fall2001, vol16, 7 pgs.
Microsoft Corp, Computer Dictionary, Third Edition, Microsoft Press, 1997, p. 371.
Parr et al., Distributed Processing Involving Personal Computers and Mainframe Hosts, IEEE 1985, pp. 479-489.
PR Newswire, XMLSolutions Delivers XML-based Prototype for Envera Marketplace, ProQuest, Apr. 2000, pp. 1-3.
Royappa, Implementing Catalog Clearinghouses with XML and XSL, ACM 1998, pp. 616-623.
Starkey, "XML-Based Templates for Generating Artifacts from Java-Based Models," Research Disclosure, Dec. 1998, pp. 1678-1680.
Stieren, SST: Using Single-sourcing, SGML, and Teamwork for Documentation, ACM 1999, pp. 45-52.
Wong, Web services and Enterprise Application Integration, Google Jun. 2002, pp. 1-57.

\* cited by examiner

SYSTEMS AND APPLICATIONS OF LIGHTER-THAN-AIR (LTA) PLATFORMS

RELATED APPLICATIONS

This Application is a Divisional of U.S. patent application Ser. No. 13/757,585 filed Feb. 1, 2013, which is a Divisional of U.S. patent application Ser. No. 12/099,004 filed Apr. 7, 2008, which is a Divisional of U.S. patent application Ser. No. 10/673,474 filed Sep. 30, 2003, now U.S. Pat. No. 7,356,390, which is Continuation-In-Part of U.S. patent application Ser. No. 09/342,440 filed Jun. 29, 1999, now U.S. Pat. No. 6,628,941, and of U.S. patent application Ser. No. 10/129,666 filed May 9, 2002, now U.S. Pat. No. 7,203,491; U.S. patent application Ser. No. 10/129,666 is a National Stage of PCT/US02/12228 filed Apr. 18, 2002, which claims benefit to U.S. Provisional Application No. 60/284,799 filed Apr. 18, 2001; the contents of all of which are incorporated herein in their entirety by reference. This instant application is related to U.S. patent application Ser. No. 14/328,331 filed Jul. 10, 2014, which is also incorporated herein in its entirety by reference.

TECHNICAL FIELD OF THE INVENTION

The present invention relates to unmanned lighter-than-air platforms operating in the stratosphere and more particularly, their termination and recovery.

BACKGROUND OF THE INVENTION

Unmanned lighter-than-air ballooncraft have been used for many years to perform tasks such as near space research, and meteorological measurements. Such ballooncraft have even carried payloads with instrumentation that sometimes includes radio transmission capabilities.

Until recently, all communications satellites were located on one orbit called the geosynchronous arc, which is located 22,300 miles above the Earth's equator. Since international treaties required satellites to be spaced two degrees apart, there were only 180 sites on geosynchronous orbit. An optimally-designed three-stage chemical rocket typically must be 94% propellant at launch to reach geosynchronous orbit, which, after allocating about 5.6% of the weight for the rocket, only leaves about 0.4% of the initial launch weight for the satellite. To put this in perspective, a typical 3,000 lb. automobile with the same performance would only be able to carry one 200 lb. person, would need an 8,400-gallon fuel tank, and would be junked after one trip! Finally, although the NASA space shuttle can service a few very low orbit satellites at great expense, most satellites cannot be serviced or upgraded after being launched.

Currently, since there are a limited number of sites on the geosynchronous orbit, geosynchronous satellites are growing in size and performance, now being able to broadcast television signals directly to homes. Recently, additional satellite networks have been deployed that do not require a geosynchronous orbit. All of these new networks have launched smaller communication satellites into much lower orbits where there are an unlimited number of sites. Because the satellites required for a network are more numerous and because the satellites are smaller, up to 8 satellites per rocket have been launched. Although satellites have become smaller and more numerous, there are still no "personal satellites" and no mass producers of consumer products in the satellite industry today. It might be estimated that a network of microsatellites in low Earth orbit and ground equipment to accommodate the tracking, transmission, reception, signal handoff among the plurality of microsatellites and necessary system network for a voice system would cost at least $3 billion to deploy. Within four years of deploying a system, each one of five million subscribers might be expected to invest as much as $3,000 in the equipment, which results in a total combined investment by the users in the new equipment of about $15 billion. The cost of deploying a smaller system of low Earth orbit advanced messaging satellites might be estimated at about $475 million. Such a system might be expected to serve two to three million subscribers, each with user equipment costing $300-$1,000. Thus, the total investments by the users for their equipment may be at least $600 million.

There is currently an industry involving radiosondes for purposes of gathering weather information. Radiosondes are the instrument packages launched on weather balloons to gather weather data. Radiosondes are launched from a network of sites around the world at noon and at midnight Greenwich Mean Time each day. The weather service radiosondes collect temperature, humidity, pressure and wind data as they rise from the surface of the Earth to approximately 100,000 feet during a two-hour flight. This data is then input in atmospheric models that are run on supercomputers. The information gathered from the network of ascending radiosondes is critical in predicting the weather. Most countries of the world are bound by treaty to launch radiosondes from designated sites and to share the data with other countries. Currently there are about 800,000 radiosondes launched each year throughout the world. This number represents the 997 global weather stations launching two radiosondes per day, 365 days per year (727,000) plus a small number of radiosondes launched for research purposes. About 18% of radiosondes are recovered, reconditioned and reclaimed, resulting in new production of about 650,000 weather-gathering radiosondes per year.

The location systems currently used to track weather balloons are either being deactivated (Omega, beginning before the year 2000, and Loran-C, shortly after the year 2000) or are so old that the operation and maintenance is becoming prohibitively expensive (radars and radiotheodolites).

Changes in radiosonde systems are usually very slow, since meteorologists study climatic trends by comparing data collected over decades. Thus, they are very leery of any changes that may introduce new biases into data as it is collected. This is evident from the fact that major users, like the U.S. National Weather Services (NWS) still use analogue radiosondes tracked by radiotheodolites when digital, navaid sondes have been around for many years. Tightening of governmental budgets has made some users unable to pay for new technology required. There presently is a push in the sonde marketplace to convert to using the Global Positioning System (GPS) for wind tracking on radiosondes. From 1995 to 1998, the NWS tried and failed to get the U.S. Congress to fund a program to develop a GPS tracking system for the U.S. Observation Network. This inability to obtain the necessary newer technology to replace old and unsupportable radiosonde infrastructure is occurring simultaneously with the rapid reallocation of the radiosonde's RF spectrum to commercial uses. Radiosondes have traditionally transmitted at 400 MHZ for navaid sondes and 1680 MHZ for radiotheodolite sondes. The 400 MHZ band is being auctioned off by the Federal Communications Commission (FCC) in the United States for simultaneous use by commercial services. Thus, interference is increasing and sondes may be forced to use to narrower bandwidths with digital downlinks instead of the wide bands with analogue downlinks still in common use.

Very large and expensive NASA balloons have been individually launched and maintained at a floating altitude for extended periods of time. These balloons carry hundreds of pounds of equipment and cost tens of thousands of dollars each. The single balloons do not have the capability of line-of-sight coverage with entire geographic areas.

Personal communications services (PCS) are a new category of digital services that the FCC started auctioning spectrum for in 1994. PCS is split into two categories: broadband and narrow band PCS. The broadband category is primarily for voices services and PCS broadband phones now compete with traditional cellular phones. The narrow band category is for advanced messaging, which is essentially two-way paging. The paging industry sees advanced messaging as being the mobile extension of one's e-mail account, just as a cellular phone has been the mobile extension of one's desktop phone. Nationwide narrow band PCS (NPCS) was the first spectrum ever auctioned by the FCC. About 30 regional and nationwide NPCS licenses have been auctioned and sold to private commercial ventures. The fact that the spectrum was auctioned is significant in that there are fewer restrictions on the use of this spectrum than on the use of traditional spectrum licensed from the FCC. Before auctions, the FCC granted spectrum on a piecemeal basis, and companies had to prove that they were using the airwaves for the "public good." Usually there was very specific federal regulation on how the frequency could be used. Since companies paid for their PCS licenses, they essentially owned the spectrum. The FCC imposed only minimal regulations required to prevent systems from interfering with other carriers' and other countries' systems. Additionally, the FCC and Industry Canada reached what is known as a Terrestrial Radio Communication Agreement and Arrangement in which Canada allocated the same frequencies for NPCS with the same channel structure as the auctioned spectrum for the NPCS in the United States. This made cross-border NPCS possible and in 1996, at least one paging system company was granted an NPCS license in Canada to operate on the same frequencies as its U.S. licensee. Mexico also has specified the same channel spacing as used in the United States.

One of the goals of the FCC is to encourage providing radio frequency (RF) communications services to consumers in rural areas at an affordable price. This market has been largely ignored by the larger communications companies because of the diminishing return on investment in providing wireless communications to sparsely populated areas. These wireless services include paging, advanced messaging, telemetry, voice, etc. Although both voice and messaging services are available to rural areas using satellite systems, the costs are generally in the thousands of dollars per unit and well out of reach of most consumers. In addition satellite systems have problems providing services in urban areas because they lack the signal strength necessary for providing building penetration.

SUMMARY OF THE INVENTION

This invention relates to a rise rate control system to control a rise rate of a free-floating lighter than air platform comprising a vent actuator, an altitude sensor and a device that controls the vent actuator when the rise rate is greater than a predefined rise rate. Preferably, the altitude sensor determines both an altitude of the free-floating platform and the rise rate, the device determines the rise rate and the device is located on the free-floating platform. The system could further comprise a ballast container, a ballast and a ballast discharge actuator that controls a discharge of the ballast from the ballast container when the rise rate is less than a particular rise rate.

Another embodiment is a method of controlling a rise rate of a free-floating lighter than air platform by a rise rate control system comprising a vent actuator, an altitude sensor and a device that controls the vent actuator when the rise rate is greater than a predefined rise rate, the method comprising determining the rise rate and controlling the rise rate. Preferably, the controlling the rise rate comprises venting the vent actuator by the device. Preferably, the rise rate control system further comprises a ballast container, a ballast and a ballast discharge actuator that controls a discharge of the ballast from the ballast container when the rise rate is less than a particular rise rate and wherein the controlling the rise rate comprises discharging the ballast from the ballast container.

Another embodiment is a method for determining a location of a device transmitting wireless signals with a plurality of free-floating lighter than air platforms comprising taking signal path delay measurements from the plurality of free-floating lighter than air platforms and determining the location of the device transmitting wireless signals based on the signal path delay measurements, wherein the plurality of free-floating lighter than air platforms have a speed relative to the surface of the earth of less than 100 miles per hour and float at an altitude of 60,000-140,000 feet, wherein the method does not require a Doppler shift correction. Preferably, the signal path delay measurements are performed by measuring the difference between a time of arrival of a wireless signal of the device transmitting wireless signals and a standard time and the determining the location of the device transmitting wireless signals is based on the signal path delay measurements from at least three independent free-floating lighter than air platforms. In one embodiment, device transmitting wireless signals is located on (a) a free-floating lighter than air platform that has landed on the earth or (b) a ground-based vehicle, and the device is a transmitter or a transceiver. In one variation, the determining the location of the device transmitting wireless signals based on the signal path delay measurements comprises determining distances from the device to the plurality of free-floating lighter than air platforms, tracing out approximate circles on the earth based on the distances and determining a point of intersection of the circles, the point of intersection being substantially the location of the device transmitting wireless signals. In one variation, the taking signal path delay measurements is taking only two signal path delay measurement while in another variation the taking signal path delay measurements is done by sectored or directional antennas.

Another embodiment is a method for determining a location of a payload comprising a device transmitting wireless signals and a GPS unit, the method comprising measuring a location of the device transmitting wireless signals by the GPS unit, checking for a shift in the location of the device transmitting wireless signals and communicating the location of the payload to a free-floating lighter than air platform. Preferably, the payload has landed on the earth and the free-floating lighter than air platform floats at an altitude of about 60,000-140,000 feet, wherein the method does not require a Doppler shift correction.

Another embodiment is a system for locating and determining usage of a ground-based vehicle comprising a housing attached to a hub of the ground-based vehicle, the housing comprising a GPS unit, a device transmitting wireless signals and a power source. The housing could further comprise a tire rotation sensor. The system could further comprise a free-floating lighter than air platform comprising a device receiving wireless signals that receives signals from the device transmitting wireless signals. Preferably, the power source is a solar power source, a battery, a generator, or combinations thereof.

Another embodiment is a method for steering a steerable system comprising flying the steerable system in a circle relative to a local wind at the steerable system thereby nullifying a flight vector of the steerable system and determining a local wind vector of the local wind with respect to a position on the earth without using data obtained from a compass or an air speed indicator. Preferably, the steerable system is an autonomous, GPS guided steerable system that does not have the compass or the air speed indicator onboard the steerable system. Further preferably, the determination of the local wind vector is based on a ground track vector of the steerable system. Furthermore, the ground track vector could be obtained from a GPS unit located on the steerable system. Preferably, the steerable system is a component of a free-floating lighter than air platform floating at an altitude of about 60,000-140,000 feet.

Another embodiment is a method for determining a location of a device transmitting wireless signals with one or more free-floating lighter than air platforms comprising taking signal path delay measurements from the one or more free-floating lighter than air platforms at different intervals of time and determining the location of the device transmitting wireless signals based on the signal path delay measurements, wherein the one or more free-floating lighter than air platforms have a speed relative to the surface of the earth of less than 100 miles per hour and floats at an altitude of 60,000-140,000 feet, wherein the method does not require a Doppler shift correction. Preferably, the one or more free-floating lighter than air platforms has one free-floating lighter than air platform. Also, the one or more free-floating lighter than air platforms could have two free-floating lighter than air platforms.

Another embodiment is a system for locating and determining usage of a ground-based vehicle comprising a housing, the housing comprising a GPS unit, a device transmitting wireless signals and a power source, the system further comprising one or more free-floating lighter than air platforms comprising a device receiving wireless signals that receives signals from the device transmitting wireless signals. Preferably, the one or more free-floating lighter than air platforms have a speed relative to the surface of the earth of less than 100 miles per hour and floats at an altitude of 60,000-140,000 feet, wherein the system does not require an instrument for a Doppler shift correction.

BRIEF DESCRIPTION OF THE DRAWINGS

A better understanding of the invention may be had with reference to the attached drawing Figures in connection with the Detailed Description below in which like numerals represent like elements and in which.

DETAILED DESCRIPTION OF THE INVENTION

Figure 1:
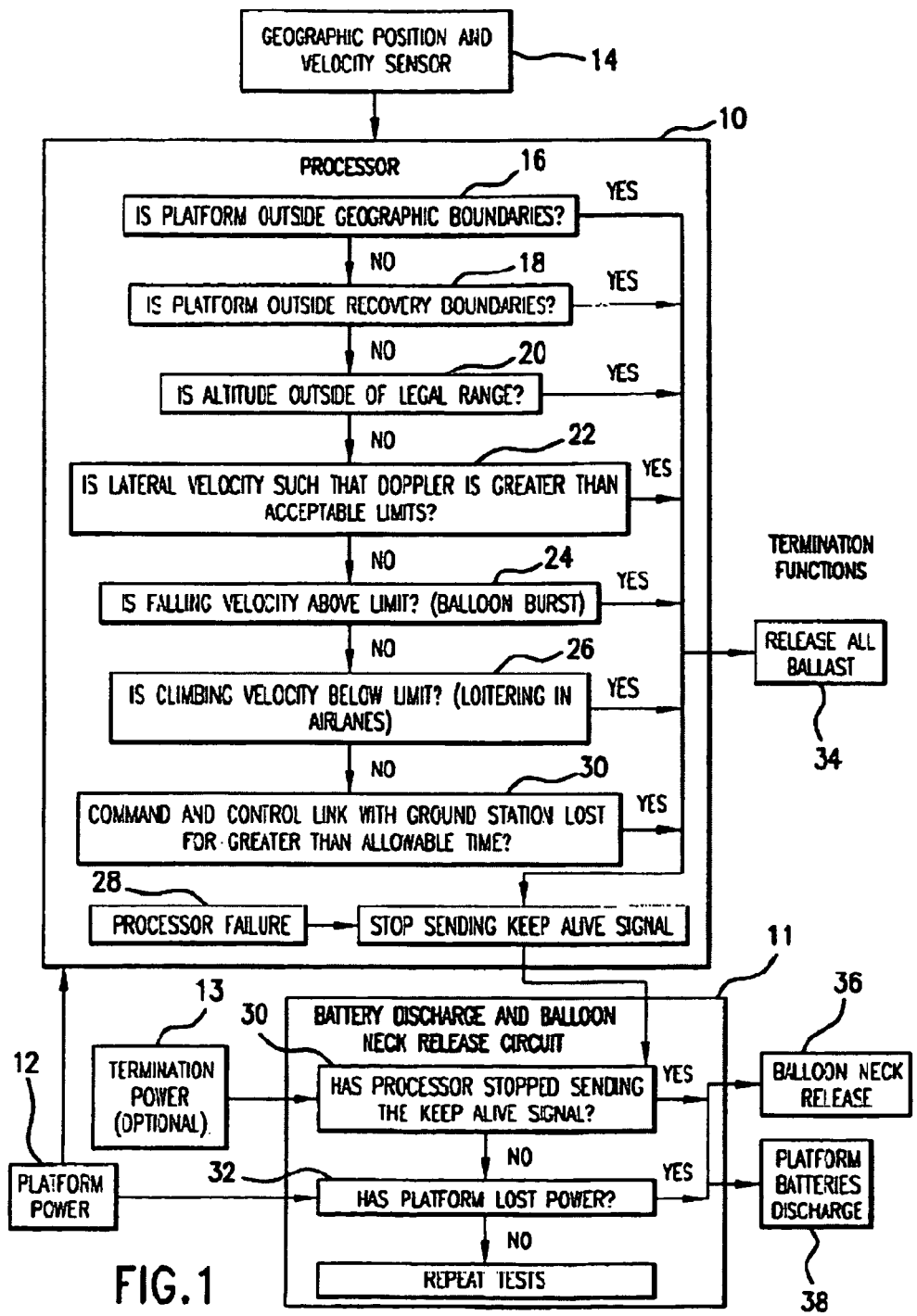
FIG. 1 schematically depicts a flow diagram of combined methods of a termination decision by a processor or controller including termination criteria, criteria detection by sensing of geographic position and velocity and elements of operation according to certain aspects of the invention.

The present invention overcomes drawbacks of prior communication satellites, by using small and relatively inexpensive microelectronics to incorporate most of the functions provided by existing communication satellites in small, lighter-than-air communications platforms. In particular, a plurality of lighter-than-air balloons is designed to carry microelectronic communication equipment into a layer of the Earth's atmosphere called the stratosphere. The weight of these platforms is approximately 100 to 1,000 times less than the micro-satellites currently launched into non-geosynchronous orbits. For convenient reference, the airborne communication platforms or balloons carrying a payload of electronic communication and control equipment have sometimes been referred to herein as "stratospheric nanosatellites" or "SNS" for short. In the metric system, the "nano" prefix signifies units 1,000 times smaller than the "micro" prefix. The SNS invention eliminates the need for a rocket to propel the satellite into orbit. Synchronized airborne launching of a plurality of the SNS platform at spaced-apart geographical locations provides a low cost constellation of satellites. The SNS platforms rise after launch to a controlled, adjustable altitude where they migrate over the geographic area according to ascent atmospheric and the stratospheric weather conditions and particularly the winds. The SNS platforms may be raised or lowered in altitude by gas venting or ballast drop in order to catch prevailing winds favorable to keep the SNS platforms evenly spaced apart. The platforms are caused to rapidly descend when no longer needed.

Existing user equipment designed for terrestrial wireless communication can work with the SNS system of the present invention. This is not the case in the traditional communication satellite industry, since either the communications satellites are very far from the user (more than 22,000 miles for geosynchronous satellites) making the signal too weak without specialized user equipment, or the satellites travel at high speeds relative to the users on the ground (more than about 36,000 mph for low earth orbit satellites) causing phase errors in the receiver. The SNS platform is, at most, about 175 miles (280 kilometers) from the ground user, depending upon the altitude and the radial coverage range from the particular platform among the plurality of platforms covering the geographic area. Moreover, the airborne platforms move at speeds approximating the speed of an automobile (between about zero and 60 mph at their float altitude). Compatibility with existing wireless communication systems is a significant advantage because when deploying a new communications system, the user equipment investment is always the largest total investment required.

In contrast to the large deployment and new equipment costs for orbiting satellite systems, the present invention provides a low cost alternative that does not require new subscriber equipment. Thus, a benefit of the SNS System is an advanced messaging SNS network that is compatible with standard one-way and two-way pagers already in existence and already in use with tower-based transceiver networks. Even without considering deploying of the SNS system, market analysts predict 35 million users will be carrying compatible, standard two-way pager equipment by the year 2003. At, for example, $100/unit, this represents an investment by users of over $3.5 billion. These users can receive the enhanced coverage of the inventive SNS platform network as an extension of their present service simply by electing to pay the monthly and incremental usage fees. There are no up-front costs for new user equipment or training and no need to change the user's habits and burden them with carrying more than one pager or other communication device as is the case with current satellite pagers.

Furthermore, the inventive SNS system, when performing advanced messaging, uses a communication or pager protocol that is being adopted internationally. International opportunities for the new system are at least equal to the U.S. potential. The SNS System may utilize other popular paging protocols as well. The system also has uses beyond personal paging for other communications, remote, imaging, infrared scanning, equipment tracking and weather data collection services.

It will also be beneficial for the National Weather Service (NWS) to consider utilizing the current SNS invention as a replacement system capable of providing the NWS with required information during the ascent of SNS platforms. GPS information available from the SNS Platform could provide the desired wind information the NWS needs but is unable to afford. Existing NWS launching facilities might even be used as SNS launch, tracking and communication sites. After the ascent and transmission of weather data to the NWS, the platform would then be controlled to float at a regulated altitude and to provide other commercial communications services. The NWS sondes could be removably attached and dropped as ballast after the ascent is complete and the desired information there from has been transmitted to the NWS. The attached radiosondes could use exactly the same sensors utilized in the current radiosondes in order to keep the data consistent with current radiosonde data.

The inventive SNS network is uniquely designed to cover large areas and to use dedicated frequencies on a national, and ideally, on an international basis, between bordering countries. It is beneficial to allocate nationwide, or ideally international dedicated frequencies to the SNS system due to the large coverage circles of each of the SNS airborne platforms. Overlapping use of the same frequency without time multiplexing the signals would most likely cause interference at the receiver. The System will optimally work within a range of frequencies designated the "Narrowband Personal Communications Services" or "NPCS" spectrum. Moreover, the entire NPCS industry in the U.S. has generally agreed on a standard two-way messaging protocol called "REFLEX". REFLEX is a protocol that uses time division multiple access (TDMA). The REFLEX protocol is an extension of the FLEX protocol designed by Motorola and is a synchronous protocol where there are 128 frames in a four-minute cycle. The start and end of each frame is coordinated nationwide using GPS technology for timing. This will allow a single frequency to be shared between the SNS network of the present invention and existing terrestrial satellite networks by simply allocating a certain number of frames to each network during each four-minute cycle. Thus, the disclosed SNS system can either operate on its own dedicated frequencies or interoperate with terrestrial systems on the same channel and never transmit on top of each other. This is unique to REFLEX and is preferably incorporated into the new SNS system. The SNS may also work using other protocols that utilize code division multiple access (CDMA) as well.

In contrast to most voice and paging networks where many different protocols are used over a wide range of frequencies, NPCS contains a near contiguous set of nationwide frequencies in which nationwide narrowband PCS licensees have adopted the FLEX/REFLEX protocol.

The present inventive SNS system benefits from a nationwide consistency of frequencies and protocols so that it can relatively easily operate across all NPCS channels owned by any or all of the nationwide carriers if need be. Minimal governmental regulation of the NPCS bands also allow the new SNS system, which was unknown when the NPCS regulations were drafted, to operate in the NPCS bands without violating current regulations. Since the NPCS licensees essentially own the frequencies purchased at auction, and the inventive SNS system can compatibly use the same frequencies with permission from the purchaser, additional licenses from the FCC may not be needed. This unique feature also saves two or three years in start-up time that it can sometimes take in order to pursue separate licenses.

As discussed briefly above, in addition to minimizing the regulatory hurdles, the new SNS network has a huge advantage in that it does not require new, specialized user equipment. It is expected that there may be as many as between 6-15 million units of compatible user equipment operating off existing terrestrial satellite networks. These can simply be added to the new SNS system using inexpensive system programming and thereby receive the expanded, more complete, coverage of the contiguous geographic area provided by the constellation of floating communication platforms according to the present invention. To the NPCS carrier, the new system can provide complete communication coverage, particularly coverage in remote non-metropolitan.

Since existing paging equipment owners and users may acquire the expanded coverage provided by the present invention through their existing carrier, the decision to expand coverage can be as simple as checking a box on their monthly bill. They could keep their current page system company, and simply add the benefit of remote area coverage provided by the SNS. No new equipment is needed and no start-up time is needed to learn the features of a new electronic gadget. There is simply improved coverage for the user without changing equipment. A very important benefit of the inventive SNS network is the significant improvement in complete remote area geographic coverage. Currently, wireless data coverage is a patchwork of covered high-density population areas, primarily around metropolitan areas. The SNS network works cooperatively with the existing coverage areas and fills in all the low-density population and thus low communication traffic areas all using the same subscriber device. The governmental regulations governing NPCS systems require minimum system build-outs for all licensees. For example, by about 1999, a licensee providing NPCS must service at least 37.5% of the U.S. population or 750,000 square kilometers, and by the year 2004, a NPCS licensee must service at least 75% of the U.S. population, or 150,000 square kilometers. Since the population is very concentrated, prior systems have been required to build towers for coverage over a very small percentage of the total landmass. In fact, the minimum area requirement for the 1999 and for the 2004 population service limits correspond to approximately 8% and 16% of the total U.S. landmass, respectively. Because of the high population density in U.S. cities. For example, covering 90% of the population requires a carrier to build out only about 20% area coverage of the country's total landmass. Servicing areas of low population density is more expensive for prior systems since tower transmitter/transceivers have a short range so that much more equipment is needed per potential customer. Thus, few prior carriers have systems that cover more than 90% of the population because of the diminishing returns. Many established wireless data carriers are built out only to about 70%-80%.

The present invention is designed to provide substantially 100% coverage and can be compatibly combined with existing high density wireless carrier systems and networks such that the high density build-out by prior paging system carriers handles the high population density geographic areas and the low population density or remote area, wherever they might be located within the contiguous geographic area, are picked up and handled by the inventive SNS system. The SNS system is complementary to high-density tower paging systems. Thus, although the SNS system has a lower total signal handling capacity when compared to high population density tower systems, it provides complete geographic coverage so that subscribers in or traveling through remote areas are provided with the additional coverage of the SNS system. Subscribers are always within the range of paging services or other compatible communication services using a single device. The SNS system may also reallocate capacity on a regional basis by launching more SNS platforms or by reallocating the frequency use dynamically among the neighboring platforms.

The SNS system also has uses beyond personal paging for other communications, voice, remote imaging, infrared scanning, equipment tracking and weather data collection services. Broadband PCS (BPCS) phones that have come to market in the past year all offer an advanced messaging service call Short Messaging Service (SMS). The SNS system could page a subscriber's phone when the phone was out of the BPCS phone service area. BPCS voice service may also be possible with an SNS system. Another potential application for SNS technology is the remote imaging market. Governments, city planners, farmers, environmentalists, mapmakers, and real estate developers all rely on aerial or satellite photos. Worldwide, this market is over $1.4 billion. Since an SNS is over twenty times closer to the subject than a satellite, SNS can achieve one-meter resolution with only a 0.75-inch diameter lens. Weather data from the extended stay in the stratosphere can be collected and reported by the SNS platform as current radiosondes do not have the capability of maintaining a float altitude.

An embodiment of the present invention is a constellation of small airborne communications platforms with a ground network of launching, tracking and communication terminals. Although the entire system is described primarily in terms of communications that are in the form of a paging system, other communications such as voice communications, emergency road service, search and rescue, emergency medical, remote imaging, environmental monitoring, industrial & utility monitoring, remote asset management, photo data, IR scanning, equipment tracking, boxcar and container tracking, vehicle security, personal security, hazardous materials, customs and international shipping security, child security, wildlife tracking, personal messaging, communications for the handicapped, SCADA, trucking communications and shipment tracking, and many other adapted communications might be easily included. As it is used here, paging includes traditional one-way paging as well as newer advanced messaging services (such as two-way paging and voice messaging). The airborne constellation of communications platforms and ground support system extends the limited coverage of current paging networks to provide complete communications coverage over an entire contiguous geographic area. For example, in the U.S., it provides true, nationwide coverage. The ground based tower systems already in place provide the in-building coverage needed in the urban areas while the SNS System provides coverage of the low population density, rural areas. Thus a subscriber can have complete nationwide coverage using the same handheld paging device. The inventive system does this by providing a constellation of evenly-spaced, high altitude, airborne communication platforms, for example, balloon-carried paging transceivers, as opposed to the traditional systems of ground-based communication towers covering only a limited area or, as opposed to very expensive orbiting, high or low altitude, satellite communications systems.

To form the constellation of airborne communications platforms, paging transceivers are attached to lighter-than-air carriers, such as high altitude balloons similar to those used by the National Weather Service (NWS) yet modified to provide for regulated adjustable altitude control using methods such as gas venting and ballast dropping. The lighter-than-air carrier or balloon and the attached communications devices have been referred to in this application as stratospheric nanosatellite platforms (SNS platforms). For coverage of a contiguous geographic area consisting of the Continental United States, SNS platforms may be launched periodically at regular intervals or as needed from approximately 50 to 100 sites throughout the United States. These launch sites may be selected for launching the balloon-carried transceiver to rise to a regulated floating stratospheric altitude of approximately 60,000 to 140,000 feet. Computer regulated altitude control and computerized tracking are utilized. The SNS platforms are regulated to maintain a desired altitude within a predetermined altitude range, as, for example, in the stratosphere over the Earth, as they drift along with existing wind currents. New SNS platforms may be launched to fill any gaps that may occur in the coverage as the platforms drift at different speeds, as they lose buoyancy or as they occasionally burst or malfunction. New SNS platforms may also be launched to provide additional communications capacity as the need arises. Newly launched SNS platforms can collect, record and transmit meteorological data during the ascent to the regulated altitude. Such data might be beneficially communicated via radio to the ground for use by the National Weather Service (NWS). The process of modeling and thereby predicting the coverage of the network of SNS platforms on a continuous basis is a complex task due to the constantly changing weather conditions. This task is facilitated by also using the weather data recorded and/or transmitted to the ground for predicting the movement of individual platforms relative to each other and relative to ground launching and tracking terminals. This data may also be used to control the altitude of individual SNS to catch favorable prevailing winds to help fill gaps in coverage. Each floating satellite at a stratospheric altitude will have line-of-sight radio communication coverage at a radius of approximately 175 miles (280 km) in all directions from antenna suspended below and forming a part of the communications platform.

Ground based support for the plurality of SNS platforms forming the constellation comprises at least one network operations center (NOC) and a plurality of launching and tracking terminals. The NOC is preferably a high speed, high volume, computing, communications and operations center for the SNS system. The NOC may be in charge of all controllable aspects of every communications platform's flight and operation. These controls include platform launches, floating altitudes, tracking, all paging communications and control signal transmissions, and communications with partnering paging companies. Typically, the SNS ground terminals include launch facilities, tracking and communications equipment and communication antennas. The co-located launch facilities and ground terminals may also advantageously correspond with existing locations of the approximately seventy NWS balloon launch facilities that are designed to monitor weather conditions nationwide. Similar Weather stations also exist and are maintained by treaties essentially worldwide. These ground terminals may be automated. Portable or mobile launching and tracking ground terminals can also be used when necessary to fill in anticipated coverage gaps that may develop between the overlapping circular coverage patterns of the floating platforms. These portable or mobile launching and tracking ground terminals may be moved seasonally to provide additional launch sites as the stratospheric winds change on a seasonal basis. These would most likely be positioned along the coastline or the edges of the coverage area. The ground terminals can advantageously track a number of SNS platforms floating near their location and can provide the uplink and downlink of all communications, including paging and control data, to each platform within range of the terminal. Paging signals from a subscribing paging company may be sent to the SNS system through the NOC. The NOC determines which SNS platform is currently over the addressed pager and sends the paging message to the ground terminal that is tracking that SNS platform. The ground terminal receives the paging message from the NOC and relays it to the SNS platform. The SNS platform then transmits the paging message down to the individual pager. Any message sent by a two-way pager is received by the nearest SNS platform and relayed down to the ground terminal. The ground terminal sends the message to the NOC, which relays the message to the appropriate subscribing paging carrier. The NOC also keeps track of all billing information and subscriber location information. The SNS system is advantageously designed to be fully compatible with FLEX (one-way pagers) and also REFLEX (two-way pagers) without modification to the pagers. The launch facilities, whether co-located with NWS launch facilities or separately located at other selected ground locations, may consist of a fully automated launcher and ground terminal. One ground terminal may control multiple SNS platforms at one time. Land lines, satellite links or other high signal capacity network communications coupling from one ground location to another may be used to connect the plurality of launch sites and ground terminals to each other or the NOC.

One embodiment of this invention is a system comprising a free-floating platform and a communication device that is separate from the platform, the platform comprising a lighter-than-air gas enclosure and a payload, the payload comprising a processor and a transceiver, wherein the processor is capable of making a decision to terminate a flight of the platform, the transceiver is capable of receiving a signal from the communication device, and the communication device is capable of handing off the signal to another transceiver of another free-floating platform. The payload could further comprise an altitude sensor, a position sensor and a power source. Typically, the payload is within 500 feet of the lighter-than-air gas enclosure.

The decision is based at least in part on (a) if the platform is determined to be outside specified geographic boundaries; (b) if the platform is outside of a specified altitude range; (c) if the platform has a lateral or vertical velocity outside a specified range; (d) if the processor fails; (e) if a power source fails (f) if a command and control communications link fails.

The decision could be releasing of a ballast, stopping a signal to a discharge circuit to prevent a battery from discharging, releasing the platform from the payload, or combination thereof.

Another embodiment of this invention is a method of terminating a flight of a free floating platform, wherein the platform comprises a transceiver capable of receiving a signal from a communication device that is separate from the platform, the method comprising determining a geographic position and/or a velocity of the platform, making a decision with a processor on the platform to terminate the flight of the platform, handing off the signal to another transceiver of another free-floating platform and terminating the flight of the platform.

Yet another embodiment is a system for ascending or slowing the descent of a free floating platform, comprising a lighter-than-air gas enclosure and a ballast comprising reactants that form a gas that is lighter than air when the reactants are mixed. The gas could be hydrogen and the reactants could comprise water and a hydride of Ca or Na. At least one of the reactants should be heavier than air. For example, at least one of the reactants could be a hydrocarbon. The system could further comprise a catalyst for reforming at least one of the reactants.

Another embodiment of this invention is a method for ascending or slowing descent of a free floating platform, the method comprising reacting reactants stored on the platform to form spent reactants and a gas that is lighter than air, introducing the gas into a lighter-than-air gas enclosure and dropping the spent reactants.

Another embodiment of this invention is a system for terminating a flight of a free floating platform, comprising a lighter-than-air gas enclosure, a payload and an element, wherein the element is capable of separating the gas enclosure from the payload. The element could comprise a line and a component capable of breaking the line. The system could further comprise two axially aligned tubes connecting the payload to the gas enclosure. In a preferred embodiment, the element could be a pin.

Yet another embodiment of this invention is a method for terminating a flight of a free floating platform comprising a lighter-than-air gas enclosure, a payload and an element, wherein the method comprises separating the lighter-than-air gas enclosure from the payload by an action of the element. The method could further comprise passing current through the element.

Another embodiment of this invention is a power system comprising a battery, a processor and a discharge circuit, wherein the processor intermittently sends a signal to the discharge circuit to prevent the battery from discharging. Preferably, the processor stops sending the signal when the power system lands on ground or water.

Yet another embodiment of this invention is a method of recovering a free floating platform, comprising landing the platform on ground or water and sending a position of the platform to a transceiver located on another free floating platform. The method could further comprise transmitting the position from the transceiver located on another free-floating platform to a transceiver located in a ground station.

Another embodiment of this invention is a system for terminating a flight of a free-floating platform, comprising a lighter than air gas enclosure, a payload and means for releasing the gas enclosure from the payload. The means for releasing the gas enclosure of those disclosed in the specification and equivalents thereof.

It has been found that the previous largest use of unmanned lighter-than-air ballooncraft has been by the various weather services of the world. For weather data acquisition purposes small latex weather balloons carry instrument packages called radiosondes to gather weather data. These weather balloons are launched from a network of sites around the world at noon and midnight Greenwich Mean Time each day. The weather service radiosondes collect temperature, humidity, pressure and wind data as they rise from the surface of the Earth to approximately 100,000 feet during a two-hour ascent. At approximately 100,000 feet the weather balloons burst and the radiosonde payload falls to earth on a parachute. This data acquire during the ascent is input into atmospheric models run on supercomputers to facilitate predicting the weather. The input data is limited as it represents only a snapshot of the weather data taken during the balloon ascent every 12 hours. The ascent and decent are rapid, mostly landing within the originating country's borders such that the short duration radio transmissions and physically crossing borders are not major issues. Also, most countries of the world are bound by treaty to launch balloon carried radiosondes from designated sites and to share the data with other countries.

Currently there are about 800,000 radiosondes launched each year throughout the world. There are also a small number of research balloons launched for research purposes. The research balloon may be quite large and flights typically are done using special frequencies and with international or individual country permission for border crossing. The total number of balloon flights per year primarily comprises the 997 global weather stations launching two radiosondes per day, 365 days per year (727,000). Only about 18% of these radiosondes are recovered, reconditioned and reclaimed, resulting in the new production of about 650,000 weather-gathering radiosondes per year.

The Federal Communications Commission (FCC) prohibits uncontrolled transmitters as they may cause interference to users on the same frequency or others on nearby frequencies. FCC spectrum licenses generally prohibit a US licensed transmitter from transmitting when it leaves the border of the US.

It has been found that most lighter-than-air platforms that maintain altitude must drop ballast in order to maintain altitude as lifting gas is lost through the balloon membrane and as the heating effect of the sun is lost as night approaches. The Federal Aviation Administration (FAA) regulations Section 101.7 states that unmanned ballooncraft are prohibited from dropping objects or operation such that a hazard may occur. Sec. 101.7 Hazardous operations.

(a) No person may operate any moored balloon, kite, unmanned rocket, or unmanned free balloon in a manner that creates a hazard to other persons, or their property.

(b) No person operating any moored balloon, kite, unmanned rocket, or unmanned free balloon may allow an object to be dropped there from, if such action creates a hazard to other persons or their property.

(Sec. 6(c), Department of Transportation Act (49 U.S.C. 1655(c)))

[Doc. No. 12800, Arndt. 101-4, 39 FR 22252, Jun. 21, 1974]

A major factor influencing the size and cost of a lighter-than-air platform is the weight of the payload. For small ballooncraft such as weather balloons, they may become exempt from certain FAA reporting, lighting, and launching requirements if the total payload weight is kept below 6 pounds and a density of 3 ounces or less per square inch of the smallest side.

Sec. 101.1 (4) Applicability.

This part prescribes rules governing the operation in the United States, of the following:

(4) Except as provided for in Sec. 101.7, any unmanned free balloon that—

(i) Carries a payload package that weighs more than four pounds and has a weight/size ratio of more than three ounces per square inch on any surface of the package, determined by dividing the total weight in ounces of the payload package by the area in square inches of its smallest surface;

(ii) Carries a payload package that weighs more than six pounds;

[Doc. No. 1580,28 FR 6721, Jun. 29, 1963, as amended by Arndt. 101-1, 29 FR 46, Jan. 3, 1964; Arndt. 101-3, 35 FR 8213, May 26, 1970]

The unique use of a light, and low-density payload also significantly reduces costs associated with the launch and allows a launch to occur in all weather conditions. The amount of ballast required to keep a platform within a set altitude range over a 24-hour period is typically on the order of 15% of the total system weight. This is a significant percentage of the total weight for a floating platform especially for ballooncraft missions that may last multiple days. For example, it has been found that a three day flight may require that 38% of the platform's system weight be ballast. This results in either significantly increasing the size of the balloon or decreases the weight available for the payload.

The two sections of the FAA regulations above show the FAA's concern with increased payload weights and densities. This concern appears to focus on reducing the potential for damage to an aircraft in a collision. The density and total weight of the payload are also found to be significant factors in overall safety upon the payload's return to the earth. Generally lower weight and density payloads, are believed to reduce the chances of causing physical damage, and as a beneficial result may also be easier and less costly to insure as well.

The FAA further prohibits uncontrolled lighter-than-air free drifting balloons. Again there may be a concern that uncontrolled flight may present a hazard to aircraft. For example, in 1998, the Canadian Space Agency lost control of a large scientific balloon. This prompted re-routing of trans-Atlantic passenger flights for 10 days as the balloon drifted from its launch site in Canada until it finally landed in Finland. The uncontrolled balloon also resulted in aviation concerns in Russia and Norway. Significant resources were expended, including the use of fighter jets to try to bring the uncontrolled balloon down.

Until now, unmanned, free drifting, lighter-than-air balloons have been either restricted to short flights as is the case with the 50,000 NWS weather balloons launched each year, or a very few large and expensive long duration scientific flights. The NWS weather balloons have an extremely limited life (approximately 2 hours) and their transmitters and batteries have limited power. The long duration scientific balloons typically have long lives and extended missions. These infrequent ballooncraft flights are expensive and generally require frequency and safety coordination with each country that they overfly. They may gain authorization to use government or scientific frequencies for short periods of time that are not available for commercial users.

Applicants, as disclosed in a co-pending application, have discovered and developed new and commercially viable uses for small free-floating platforms with long duration capabilities. These small, long duration ballooncraft or free floating platforms have long flight lives similar to much larger scientific ballooncraft and the ability to travel long distances. The present methods and inventive devices also facilitate reducing the massive reporting and coordination requirements of the larger ballooncraft. The free-floating platforms may be operating on commercial frequencies that have specific laws as to the use of the frequencies in each country. The innovative new methods facilitate maintenance of legal transmitter operations, particularly at borders, they provide for platform flight termination for rogue, uncontrolled or malfunctioning platforms, they provide for environmentally acceptable descent and they enhance the opportunity for recovery and reuse of these devices. All of these methods are especially useful as they relate to regional and international borders. The present invention uses specific criteria and elements of operation or sets of criteria and elements of operation that taken as a whole form a safe method for reducing or preventing illegal transmissions, for terminating flight, for rapidly descending the platform to the ground, for environmentally acceptable landing and for enhanced recovery. All the methods are designed to enhance safety and to comply with known regulations.

FIG. 1 schematically depicts a flow diagram of combined methods of a termination decision by a processor including termination criteria, criteria detection by sensing of geographic position and velocity, and elements of operation according to certain aspects of the invention. In combination with an onboard power source 12 and GPS 14 (or other geographic locator or tracking system), a processor 10 is provided to receive position information and time change of position (velocity) information 14. The position information is compared to stored or programmed criteria information at 16, 18, 20, 22, 24, 26, 28 and 30, to determine whether termination of radio transmission and/or termination of flight should be implemented.

The following criteria based decisions are provided with the processor 10:

Has the Platform Moved or Drifted Outside of a Certain Geographic Area? (See FIG. 1, at 16.)

The relevant boundaries may be frequency license borders set by the FCC as dictated by a regional or nationwide broadcasting license. The FCC prohibits transmitter operation outside such geographic borders. Additionally, a neighboring country may have restrictions on transmitted power into their country from a foreign transmitter. It has been found that on certain frequencies Mexico prohibits transmit power levels above −99 dBm into Mexico from the United States. These restrictions are not hard for terrestrial towers to comply with as the towers can install and adjust directional antennas once during installation and not have to adjust them again thereafter. This is quite different for a free drifting high altitude ballooncraft containing a transmitter as the position and altitude may be constantly changing and may require the platform to stop transmitting while still inside the United States, but within a protective number of miles of the United States-Mexico border. Long duration scientific ballooncraft are not as concerned with this as they typically work on special frequencies or have coordinated with other countries that may be over flown.

Is the Platform Moving Outside of Boundaries that would Significantly Reduce the Probability of Recovering the Platform? (See FIG. 1 at 18.)

As payloads costs may be significant, from $50 to $150 for a typical weather service radiosonde, up to hundreds of dollars for a transceiver platform, and up to many tens of thousands of dollars for a scientific payload, recovery is important both financially and for environmental reasons. A platform may encounter strong winds especially in the jet stream as it descends from high altitudes. In order to keep the platform from drifting out of the country on descent, artificial borders that take into account the winds during descent can be used. Also, boundaries of large bodies of water such as the great lakes, seas and oceans the crossing of which might hamper or prevent recovery of the platform upon normal decent, may be taken into account for termination of flight purposes.

Has the Platform Fallen Below or Risen Above a Set Altitude Range? (See FIG. 1 at 20)

Most scientific and weather balloons reach altitudes above 60,000 feet, The FAA regulates airspace below 60,000 feet and discourages free floating craft or uncontrolled flight craft from loitering especially in commercial air lanes as they present a hazard to commercial planes. Current NWS weather balloons do not have the capability to terminate the flight if they start to hover below 60,000 feet. Even the large-scale scientific balloons may become errant and free drift below 60,000 feet. (see the rogue scientific balloon example listed earlier).

Is the Platform Velocity Sufficient to Create an Unacceptably Large Doppler Shift in the Transmission Frequency? (See FIG. 1, at 22)

A ballooncraft traveling in the jet stream may reach speeds of over 180 miles per hour. This creates a Doppler shift in the frequencies received on the ground. The FCC regulates the amount of total frequency drift allowed on transmissions. Doppler shift contributes to this total frequency drift and if great enough can cause the transmitter to transmit out of its allowed band. These requirements have not been considered or accounted for in the past as free drifting commercially transmitting platforms were not available. Therefore, the requirement that the payload be able to immediately stop transmitting past the speed at which the Doppler becomes too great is new.

Does the Platform Fall Rate Indicate a Balloon Burst? (See FIG. 1, at 24.)

A fast fall rate indicates that the balloon has burst and that the craft is falling.

Is the Lighter-than-Air Platform Rising too Slowly during Ascent? (See FIG. 1, at 26.)

This indicates that the balloon is under-filled or leaking A slow rise rate may present a danger to aircraft by loitering excessively at one altitude particularly at an altitude in designated air lanes.

Has the Processor, the Position Finding Equipment, or the Primary Power Failed? (See FIG. 1, at 28.)

A GPS, star tracker, or system power failure should initiate an on-board termination. The platform must be able to terminate without processor control or power.

Have Command and Control Communications been Lost? (See FIG. 1, at 30.)

Without command and control from the ground, the payload should cease transmission and the flight should be terminated.

The present inventive system detects the foregoing conditions by comparing current position, velocity, and operating conditions to stored, programmed or calculated criteria using an onboard processor or controller. The present invention utilizes a GPS unit and a processor to determine the current platform's geographic coordinates and velocities. A GPS unit or pressure sensor determines the platform altitude. The processor algorithms will implement the complete set of conditions listed above causing the ballast to be released at 34, the transmitter to be shut off at 38 and the flight terminated at 36 upon detection of a stored, programmed or calculated termination criteria. Under conditions of a power loss or processor failure, the transmitter will also be shut off at 38, and the flight will be terminated at 36. The methods and mechanisms for the termination actions are described more fully below.

A separate termination controller 11, which may be under separate power 13 monitors the primary platform power at 32 and monitors processor functions at 30 to determine if the processor 10 is functioning properly. Both the primary processor 10 and the separate termination controller 11 have the ability to terminate transmissions, by discharging the primary platform batteries at 38 and to terminate the flight by releasing the balloon at 36. The separate power source 13 may advantageously comprise a very small environmentally acceptable battery such as an alkaline watch battery.

The present invention solves certain past needs. This invention describes a system, method and design for use with lighter-than-air platforms that overcomes certain safety drawbacks of conventional unmanned lighter-than-air ballooncraft. The processor reduces or eliminates the chance of the platform becoming a free floating, uncontrolled transmitter by monitoring sensed coordinates and platform velocities (GPS, star tracker, etc) and by comparing the sensed information to known (stored, programmed or calculated) geographic or altitude based boundaries. If the processor determines that the platform is out of it's proper boundaries, termination is started. If the GPS fails, the processor also initiates termination. If the processor function unacceptably fails or if the primary power fails, termination and recovery is also automatically initiated with a secondary termination control circuit having its own small and environmentally acceptable power source. This does not require power from the primary power source of the platform.

Termination and recovery comprise several steps or actions as follows:

Releasing all Ballast to Reduce the Payload Density and Weight.

Figure 2:
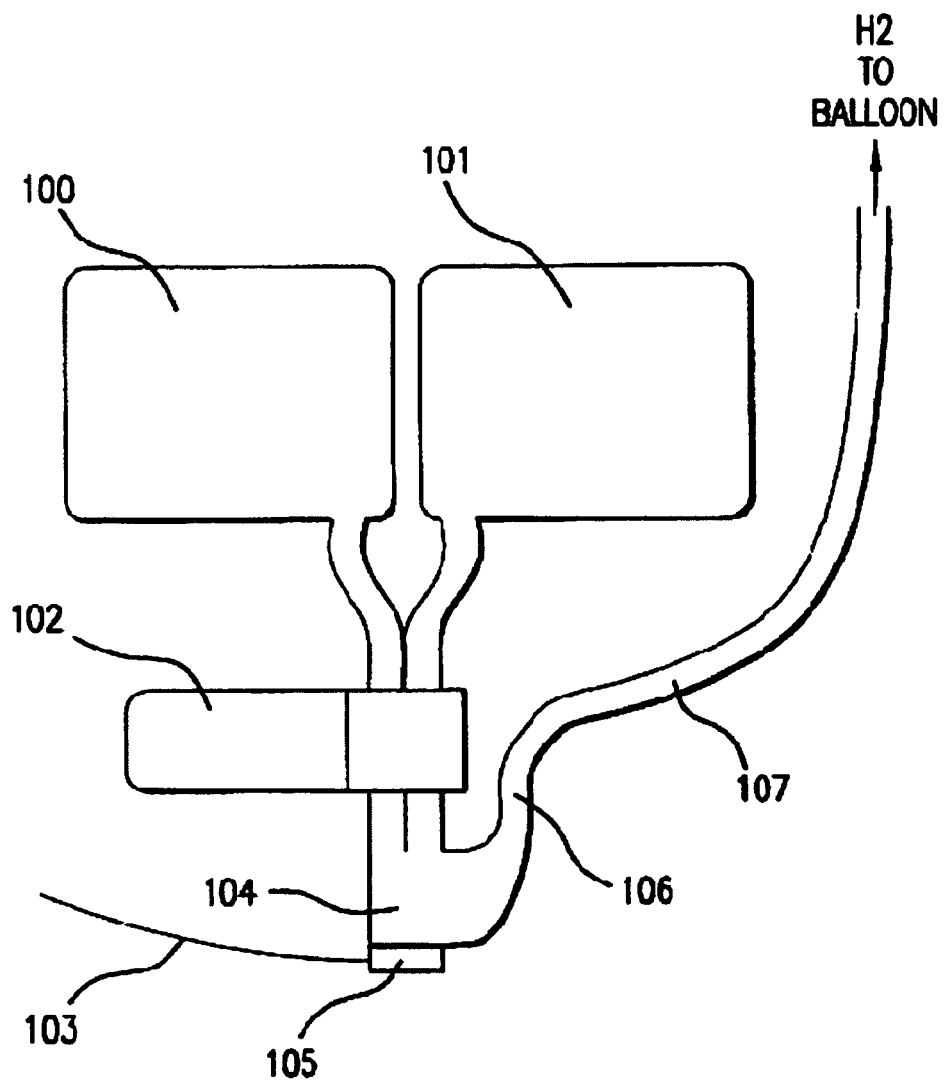
FIG. 2 schematically depict a mechanism for the controlled release of ballast according to certain aspects of the present invention.

The following device allows for the controlled release of ballast (and generation of lifting gas) to reduce the ascent rate or slow down the descent rate. At termination, all ballast is released automatically according to a mechanism as schematically depicted in FIG. 2. Ballast system and release mechanism Both reactant A in Chamber A (100) and reactant B in Chamber B (101) is metered into the reaction chamber (104) where hydrogen generation occurs. The relative size of each of the two chambers is determined by the molar ratio of the reaction. If water is used as one of the reactants and a fuel cell is used on the platform for generating power, the water byproduct of the fuel cell's reaction may be used for the ballast system reaction as one of the reactants. Different metering rates would be required for each reactant if the molar ratio of the reactants were not 1 to 1. This could be done with a dual peristalsis pump (102) if the tubing diameters were adjusted to pump the appropriate amount from each reactant chamber. During the reaction, hydrogen is vented from the reaction chamber through a tube (107) into the balloon. A one-way valve (106) in the tube to the balloon prevents hydrogen from flowing back into the reaction chamber. After the reaction is complete, the byproduct is dropped as ballast from the bottom of the reaction chamber (104) through an electrically actuated valve (105). The valve (105) is then closed. Upon flight termination, the reactants will be reacted as quickly as safely possible in the reaction chamber (104) and the byproducts dropped as ballast.

In a second configuration (not depicted), the ballast system comprises two cavities each containing one of the two reactants. The reactant in the top cavity is metered into the lower cavity where the hydrogen generation occurs. The reaction byproducts are only released as ballast when all of the original reactants are depleted.

In a third configuration, a hydrocarbon chain is reformed to produce hydrogen. This requires a catalyst such as platinum. Methods of reforming hydrocarbons to produce hydrogen are well known in the industry. The hydrogen is added to the lifting container and the remaining reacted reactants as dropped as ballast.

This method of hydrogen generation from the materials used for ballast effectively makes the payload lighter and therefore safer in the event of collision with aircraft or persons and property on the ground. While any acceptable ballast could be released, the novel ballast system described above effectively reduces the actual weight of ballast required by a system thereby increasing the safety of the payload. In the novel ballast system the total amount of ballast carried to provide long duration flight at an acceptable altitude is significantly reduced. Reducing the amount of ballast should in most cases increase safety. In one specific example, the system uses water and either Sodium Hydride or Calcium Hydride as the ballast. When additional altitude is required, a quantity of water is added to a quantity of Sodium Hydride or Calcium Hydride. A large volume of hydrogen gas is generated. This hydrogen is added to the lifting balloon and the byproducts of the reaction are dropped as ballast. The platform becomes lighter due to the dropping of the $Ca(OH)_2$ or $Na(OH)_2$ byproduct and at the same time, hydrogen is added to the balloon increasing lift. Only 73% (75% for Sodium Hydride) of an equivalent weight of inert ballast such as sand is needed. As ballast can be a significant portion of the initial total weight, reducing the weight of the ballast significantly reduces the total weight of the payload.

Releasing the Neck of the Balloon from the Platform to Initiate a Quick Descent.

This makes sure the platform descends quickly through the atmosphere thereby reducing the potential time the payload passes through the commercial air lanes. Small balloon systems such as the NWS weather balloons rely on the balloon bursting due to expansion as it rises through the atmosphere. A hovering balloon does not experience this expansion and therefore must either have a system to burst the balloon or physically separate from the balloon. Venting the balloon is generally not acceptable because of the danger of the partially inflated balloon drifting laterally on the ground increases the chance of personal or property damage. A further problem would occur if hydrogen was used as the lifting gas. This could create a possibility of hydrogen remaining in the balloon after landing and contacting an ignition source. Bursting the balloon is also generally undesirable as a burst balloon still attached to the payload may foul the descent mechanism causing an uncontrolled descent. In the invention, the neck of the ballooncraft is released when power is lost or the processor fails eliminating these potential problems.

Figure 3:
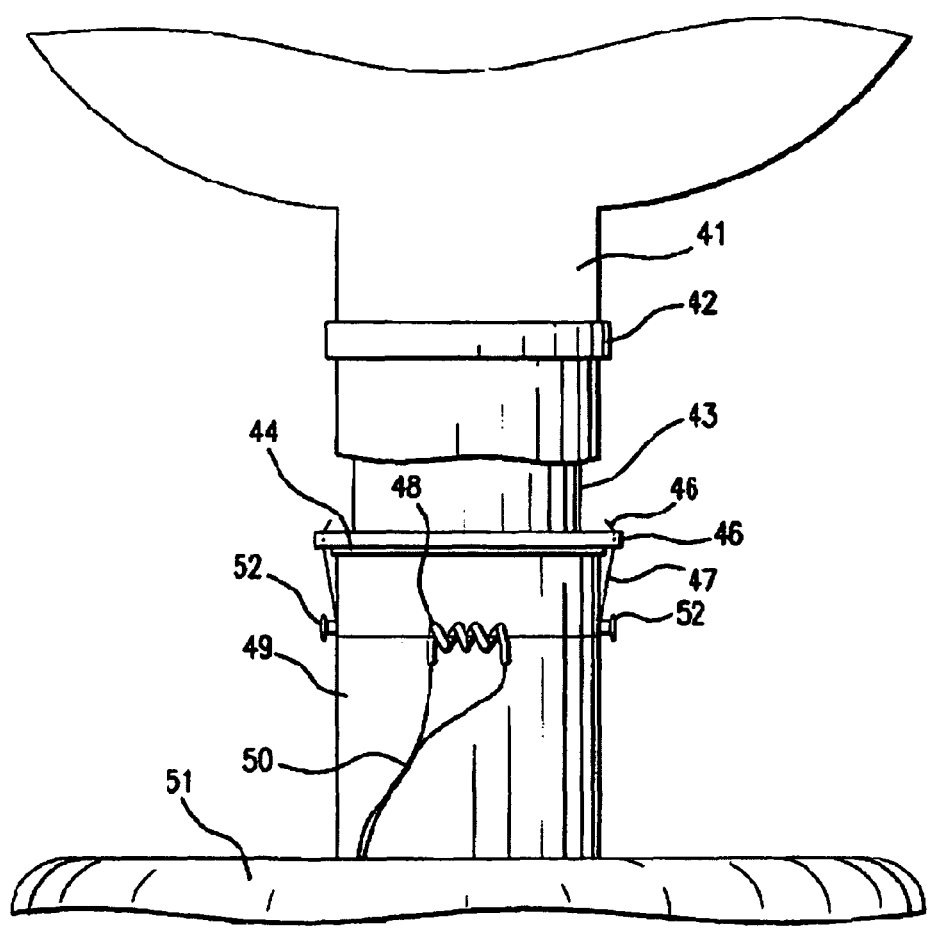
FIG. 3 is a schematic partial front view of a neck of a platform connecting between a balloon and a payload with a line and depicting the construction and method of releasing a balloon from the payload platform.
Figure 4:
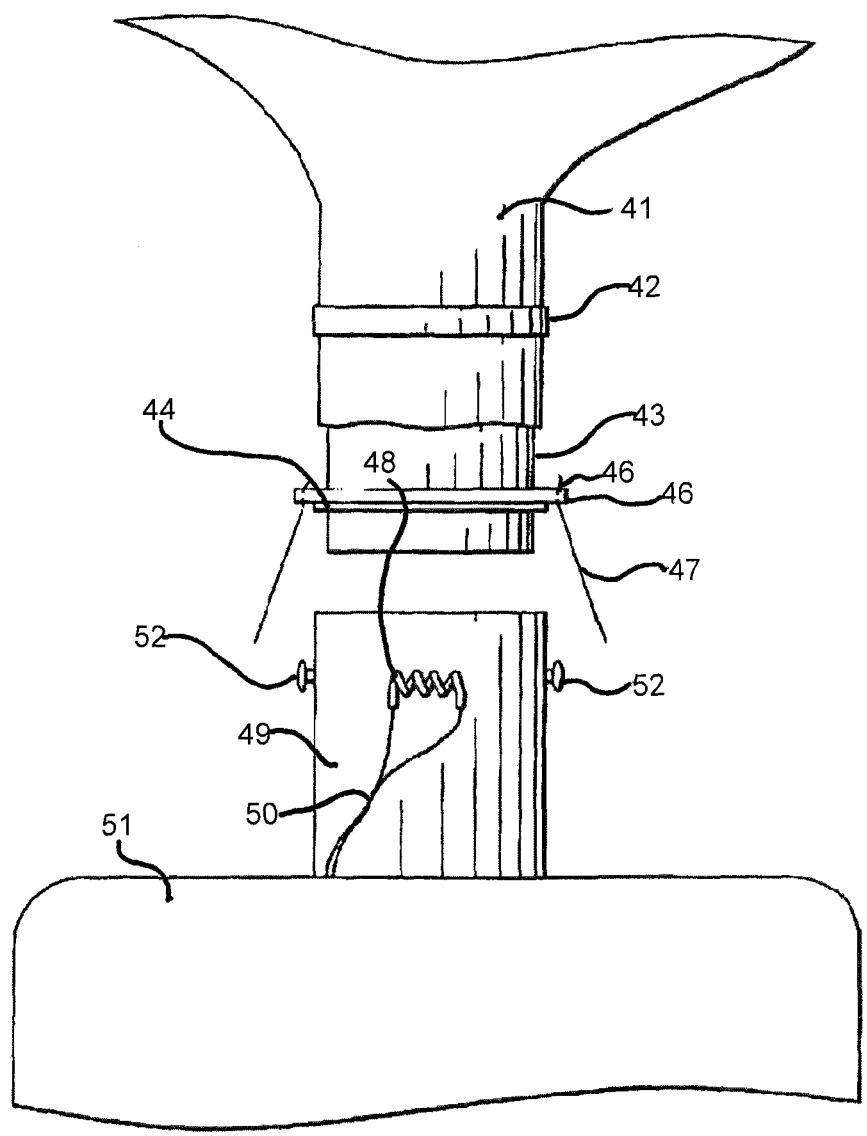
FIG. 4 is a schematic partial front view of the neck of a platform connecting between a balloon and a payload as in FIG. 3 further depicting the release of the balloon from the payload platform.

One possible implementation of the neck release mechanism as depicted schematically in FIGS. 3 and 4, comprises two concentric neck connection tubes (43) and (49). The top tube (43) is slid into and attached to the balloon (41) with a strap (42) or rubber band (42) and fits within the bottom tube (49), which is attached to the payload (51). The top tube (43) is restrained from sliding out of the bottom tube (49) by a piece of monofilament line (47). While top tube (43) and bottom tube (49) are restrained to each other, flexible seal (44) prevents gas in the tubes from leaking at the junction of the tubes. Each end of the monofilament line (47) is threaded through a small hole in flange (46) and tied off. The monofilament line (47) is threaded around two knobs (52) and also through and in contact with an electrically resistive coil (48).

A second implementation of the neck release mechanism utilizes a tube that is attached to the neck of the balloon as in the first implementation. The tube is removably attached to the payload by one or more latches. When these latches are undone, the neck can separate from the payload.

Figure 11:
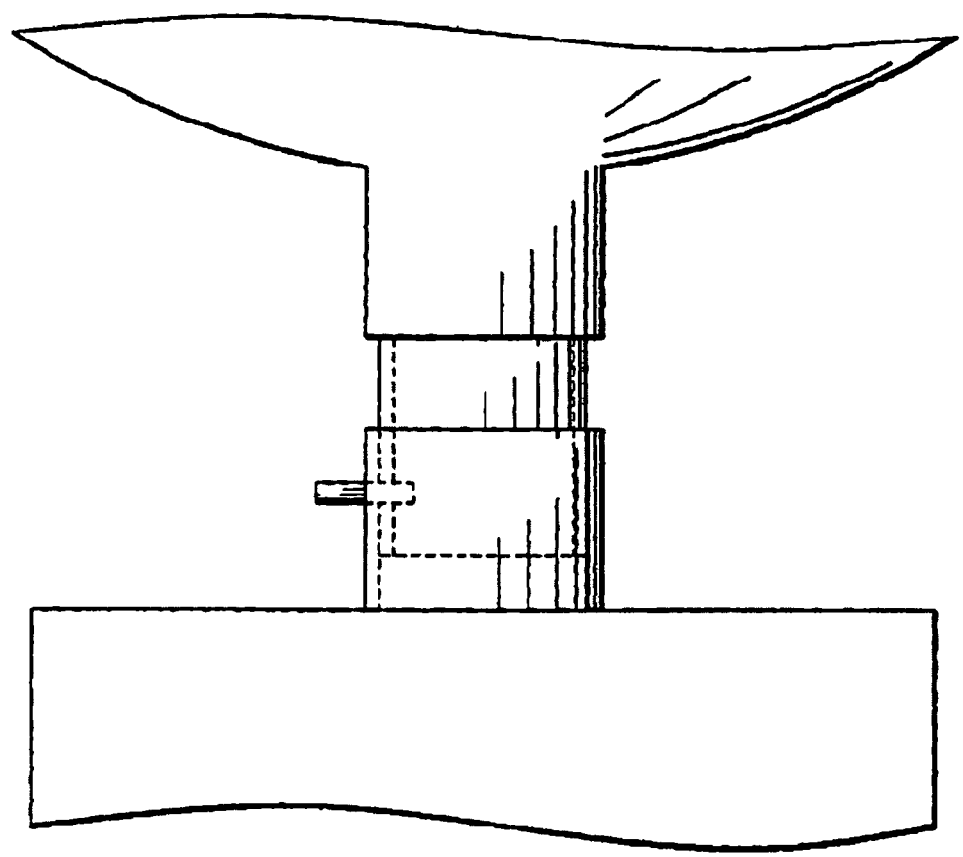
FIG. 11 is a schematic partial front view of a neck of a platform connecting between a balloon and a payload with a pin and depicting the construction and method of releasing a balloon from the payload platform.

In a third implementation of the neck release mechanism, a tube that is attached to the neck of the balloon as in the first implementation is axially aligned and slides within or over the second tube that is attached to the payload. A release pin or pins passes through both tubes from the side such that when the pin is removed, the tubes are free to separate from each other. See FIG. 11.

When termination of the flight is called for, the ballast is preferably released first and then a current is passed through the resistive coil (48). The coil heats (48) up and melts through the monofilament line (47). The weight of the payload (51) now pulls the bottom tube (49) from the top tube and the payload is released from top tube (43).and thus from the balloon (41). This ballast system advantageously allows for the venting of the lifting gas directly at the payload eliminating the need for wiring to remote valves.

The Battery Discharge and Neck Release Circuit.

Figure 5:
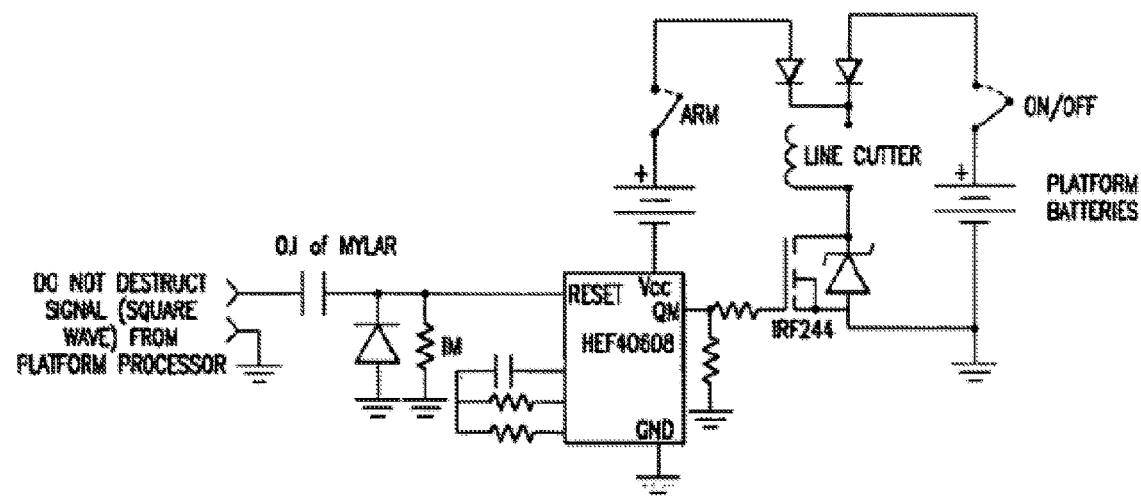
FIG. 5 is a schematic diagram for a battery discharge and neck release circuit.

The battery discharge and neck release circuit is schematically depicted in FIG. 5. The processor must constantly supply a keep alive signal to the battery discharge circuit in order to prevent the batteries from discharging. This keep alive signal comprises a square wave. The battery discharge circuit senses the low to high transitions in the keep alive signal and resets the timer (a HEF 4060) each time a transition is detected. The timer must be reset by the presence of the keep alive square wave or the timer will end it's counting and initiate the battery discharge. A high power FET closes the circuit that discharges the batteries. In one implementation of the discharge circuit, the power from the discharge circuit comes from the main batteries themselves. Because the discharge circuitry can function down to extremely low battery voltages, the batteries are effectively discharged by the time the discharge circuit is unable to function.

An alternate implementation uses a separate, non-hazardous, small battery to operate the discharge circuitry. This implementation ensures that the main batteries are completely discharged. The discharge circuit dissipates power through the resistive wire that during battery discharge, dissipates the energy as heat. The resistive wire is wrapped around a piece of monofilament (fishing) line. When the battery power is dissipated through the resistive wire, the monofilament line is melted through and the neck connecting the balloon to the platform is released from the payload. Another advantage of providing a separate power source for the discharge circuit is that the discharge circuit battery will supply the resistive element with power to cut the monofilament line even if the main batteries are dead. As an alternative, the discharge circuit could dissipate power through a high power resistor if the neck release function were not used.

If the processor senses any of the conditions necessary to initiate termination, it ceases sending the keep alive signal to the discharge circuit. If the processor dies or the power fails, the keep alive signal also ceases, causing termination. The timer advances to a point where it initiates the battery discharge. Battery current flows through the resistive wire discharging the batteries and melting through the monofilament to release the balloon neck. The battery discharge continues until the main batteries are completely dead.

The main platform batteries are fully discharged during descent to positively prevent further radio transmission. Once discharge is initiated, the batteries fully discharge. The processor can initiate the battery discharge as described above or automatically when power or processor control is lost. It has been found that long duration flight at high altitudes and cold temperatures requires special high-density batteries. It has been found that lithium batteries beneficially fulfill such requirements. Additionally, it was found that the Environmental Protection Agency (EPA) states that lithium based batteries are considered hazardous waste except for one type of cell and only when fully discharged. Particularly it has been found that Lithium Sulfur Dioxide (LiS02) batteries, when fully discharged, form a lithium salt, which is not considered hazardous by the EPA. Automatically discharging the LiS02 batteries before they contact the ground not only prevents the transmitter from transmitting but also renders the batteries non-hazardous.

The "Maple seed" Descent Device.

Figure 6:
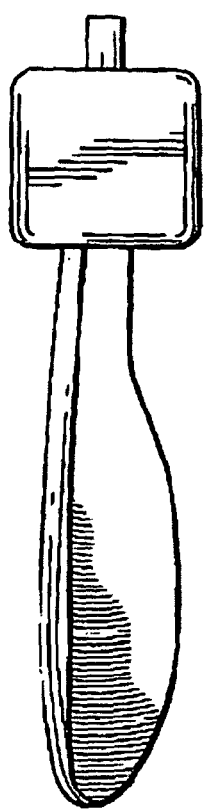
FIGS. 6, 7 and 8 are front side and end views, respectively, of a "maple seed" descent mechanism attached to the bottom of a platform according to one embodiment of certain aspects of the invention.
Figure 7:
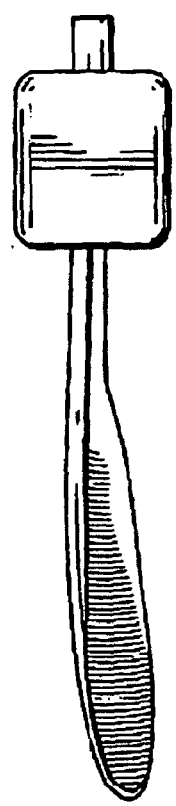
Figure 8:

Use of a novel and integral "maple seed" like descent device to increase safety is depicted in FIGS. 6, 7 and 8. A single airfoil shaped blade attached to the bottom of the platform causes autorotation of the payload and airfoil blade upon rapid descent. This replaces a traditional parachute with a highly reliable decelerator that is generally immune to fouling and requires no deployment mechanism and is also immune to fouling problems with animals and property after descent. The "maple seed" decelerator may also be used to conveniently house the antenna.

This autorotation occurs because of the asymmetrical nature of the airfoil. The center of mass of the payload/airfoil combination is shifted well to the payload end while its center of lift is approximately in the middle. This causes a circular rotation of the entire assembly around its center of mass. The rotation actually inscribes a cone around the axis of fall. The shape of the cone will vary depending upon the aerodynamic qualities of the airfoil. An airfoil with minimal lift properties will inscribe a steep-side cone while an airfoil with strong lift properties will inscribe a very flattened cone.

Platform Recovery.

Figure 9:
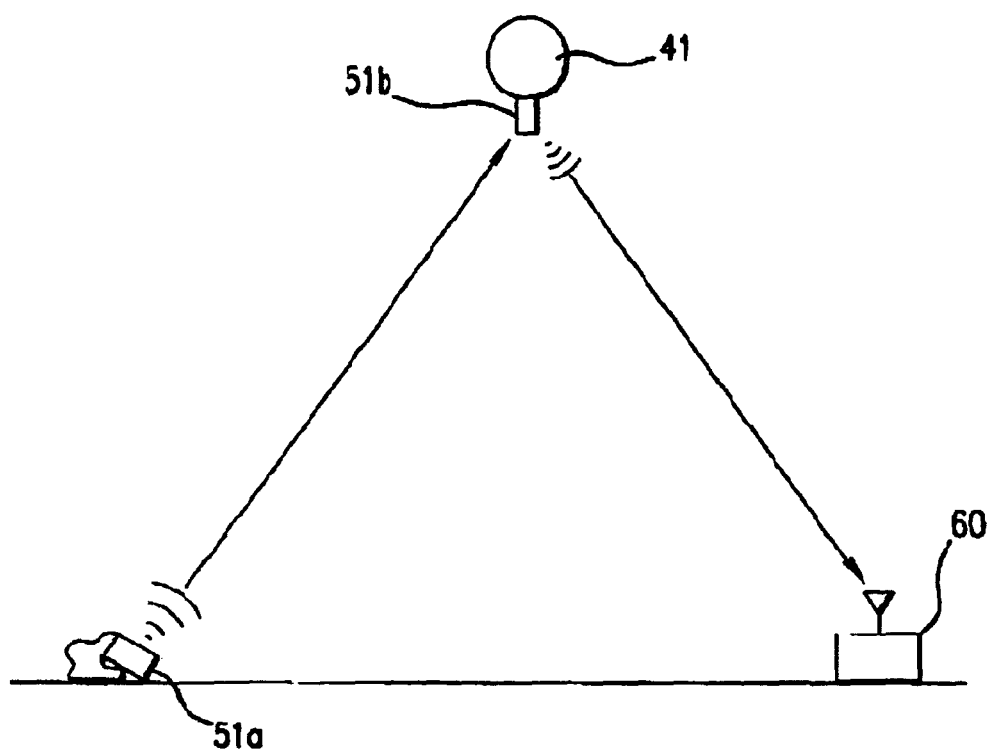
FIG. 9 is a schematic depiction of a landed terminated platform (with or without a balloon) transmitting a locator signal to a floating platform transceiver that relays the locator information to a ground station to facilitate recovery of the terminated platform.

A novel method of platform recovery is depicted in FIG. 9. To aid in the recovery of the platform, the landed platform transmits its last recorded position to an additional airborne platform. The platform could determine that it had landed by comparing sequential position readings and noting when they consistently indicate no change in position. The second platform relays the current location of the landed platform to a ground station where the position of the landed platform is used to aid in recovery of the landed platform. A GPS unit on the landed payload could determine the position of the landed platform. The transmission from the landed platform to the additional airborne platform could utilize nearly any commercially available or custom transceiver.

The "Handoff" Mechanism.

Figure 10:
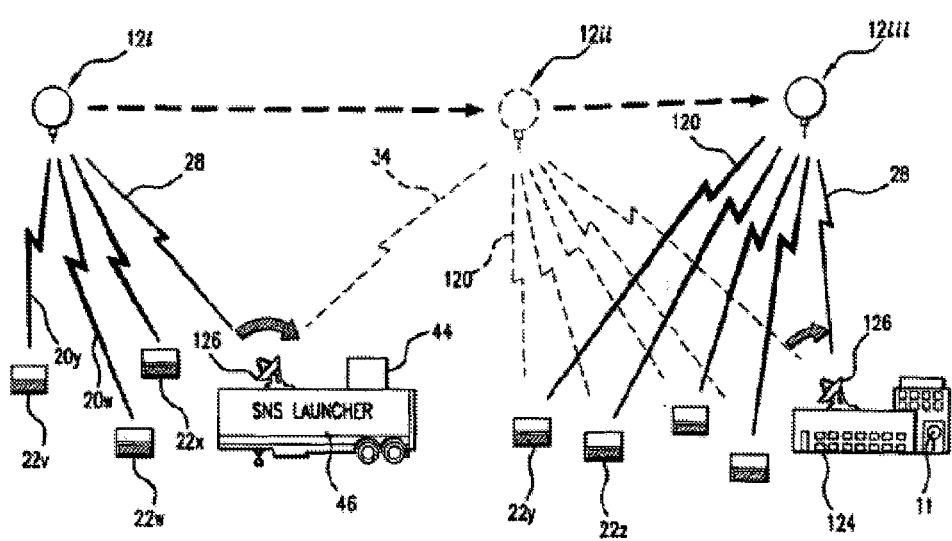
FIG. 10 is a schematic showing the hand-off mechanism.

FIG. 10 shows the capability of handoff, i.e., handing off signal, between platforms by the communications devices. FIG. 10 shows a schematic view of a portion of a constellation and communication network system in which 12(*i*), 12(*ii*) arid 12(*iii*) airborne platforms. Each air borne platform comprises a lighter than air gas enclosure such as a balloon, and a transceiver (processor). Strong and weak signals between platforms and the communication devices (user equipment) 22*v-z*, located on or above ground, are shown by solid and dashed lines 120. The tracking antennas 126 could be located on ground terminal 124 or platform launcher, i.e., SNS launcher 46. Also, on the SNS launcher 46 could be a launcher 44. Lines 28 show the command and control link between the tracking antennas 126 and platforms.

In particular, FIG. 10 shows communication devices 22*y* and 22*z* communicating with platforms 12(*ii*) and 12(*iii*). The signal from platform 12(*iii*) is stronger (as shown by solid lines) than that from platform 12(*ii*) (as shown by dashed lines). When platforms 12(*ii*) and 12(*iii*) migrate from left to right due to wind currents as shown in FIG. 10, communications devices 22*y* and 22*z* hand off communication with platform 12(*iii*) to platform 12(*ii*) as platform 12(*iii*) moves out of the communication range and platform 12(*ii*) moves to the former position of platform (iii). Generally, the processor(s) on board the platform(s) does not hand off the signal; it is the communication device(s) that initiates the handoff.

The communications signal transceiver comprises circuitry capable of communications using FDMA, TDMA, CDMA, and ReFLEX protocols. All of these named protocols use "handoff." For example, U.S. Pat. No. 5,649,000, issued Jul. 15, 1997, discloses a method and system for providing a different frequency handoff in a CDMA cellular telephone system. Devices using these protocols periodically scan for neighboring control channel in the background, without interrupting normal operations. If the device finds a better channel, in terms of significantly better signal strength or higher priority, it can request a transfer. This is usually done using "make before break," a concept similar to the soft hand-off used in PCS phone networks, where registration with a new channel is completed before communication with the old channel is broken. Normally, this means that a device will always be registered with the network, and capable of receiving messages. This permits communication devices to move quickly and efficiently across service areas with different control channels.

Another embodiment is a floating constellation communication system comprising a plurality of lighter-than-air platforms, each including an altitude regulator device to control the floating of said platforms within a predetermined altitude range, each platform carrying at least one communication signal transceiver; a plurality of geographically spaced-apart platform launching sites from which said plurality of platforms can be launched; a plurality of ground terminals capable of tracking one or more of said plurality of platforms, said ground terminals capable of transmitting communication signals to and capable of receiving communication signals from at least one of said plurality of communication signal transceivers carried by said plurality of platforms; a network of communication links interconnecting said ground terminals to one another; and a plurality of coded communication devices within a contiguous geographic area, said coded communication devices having communication capabilities compatible with the capabilities of said signal transceivers carried by said platforms.

Another embodiment is a floating constellation of communication platforms comprising a plurality of separately launchable lighter-than-air platforms capable of initially ascending into the Earth's atmosphere after being launched; each of said plurality of platforms further comprising an altitude regulator operatively connected to regulate each of said platform to float within a predetermined altitude range after initial ascent; and a communication signal transceiver carried by each of said plurality of platforms.

Another embodiment is a floating constellation communication system comprising a plurality of lighter-than-air platforms regulated to float within a predetermined altitude range, each platform carrying at least one communication signal transceiver; a plurality of geographically spaced-apart platform launching sites from which said plurality of platforms can be launched; a space satellite and a network of satellite communication links between a plurality of ground terminals capable of said space satellite and of said plurality of platforms, and capable of transmitting communication signals to and receiving communication signals from said plurality of communication signal transceivers carried by said plurality of platforms; a network operations center (NOC) and a satellite communications link between said NOC and said space satellite thereby interconnecting said NOC and said plurality of platforms; and a plurality of coded communication devices within a contiguous geographic area having communication capabilities compatible with capabilities of said communication signal transceivers carried by said plurality of platforms.

Another embodiment is a floating constellation of communication platforms comprising a first plurality of airborne platforms regulatable to ascend and float in the air for a period of time within a predetermined range of altitudes, said first plurality of airborne platforms ascending at a first time from geographically spaced-apart locations; a next plurality of airborne platforms regulatable to ascend and float in the air within said predetermined range of altitudes, said next plurality of airborne platforms ascending at a next time from said geographically spaced-apart locations; a rapid deflation system for removing said airborne platforms from the air upon malfunction or improper location of said airborne platform; at least one platform communications signal transceiver attached to each of said airborne platforms; a plurality of geographically spaced-apart ground transceivers capable of communication with said airborne platform; a network of communication links interconnecting said plurality of ground transceivers; and a plurality of coded devices having communication capabilities corresponding to the capabilities of said platforms and selectably addressable by communication signals from said platforms.

Yet another embodiment is a floating constellation of communication platforms comprising a plurality of airborne platforms regulatable to float within an adjustable altitude range and spaced apart to provide substantially ubiquitous line-of-sight coverage over a contiguous geographic area; said plurality of airborne platforms including a plurality of communication transceivers, at least one of said plurality of communication transceivers carried by each of said plurality of airborne platforms; a plurality of ground terminals spaced-apart over said contiguous geographic area for maintaining substantially ubiquitous line-of-sight signal communication between said communication devices of said plurality of airborne platforms and said ground terminals; a network of communication links interconnecting said plurality of ground terminals; and a plurality of coded devices capable of communications with said plurality of communication transceiver and addressable from one or more of said plurality of platform-carried communication transceivers.

Another embodiment is an airborne constellation comprising a plurality of individual lighter-than-air platforms spaced apart above a contiguous geographic area so that substantially ubiquitous line of sight coverage of said geographic area is provided; each of said plurality of platforms comprising an enclosure holding a regulated volume of low density gas so that the total density of said platform is lower than the atmospheric air up to a predetermined altitude range; and each of said plurality of platforms further comprising a signal transmitting device attached to said enclosure by which signals from said platform may be transmitted to said contiguous geographic area.

Another embodiment is an altitude regulated lighter-than-air communications platform comprising a low density gas enclosure for holding a quantity of low density gas; a transceiver attached to said enclosure including electronic circuitry and an onboard electrical power source; and an altitude regulator attached to said platform to regulate the altitude of said platform within a predetermined altitude range, said altitude regulator comprising an altitude determining mechanism; a controllable vent from said gas enclosure and vent controls operatively coupled with said altitude determining venting of gas for regulating the altitude of said platform; and a controllable ballast release attached to said platform and ballast controls coupled with said altitude determining mechanism to release ballast for regulating the altitude of said platform.

Another embodiment is a free floating constellation communications system comprising a plurality of lighter-than-air platforms comprising at least a first platform and a second platform, the first and second platforms comprising a communications signal transceiver and being free floating without any longitudinal and latitudinal position control; and a plurality of communications devices within a contiguous geographic area, at least one of the communications devices having communications capability with the communications signal transceiver; wherein the at least one of the communications devices is capable of handing off communication with the first platform to the second platform as the first platform moves out of a communication range of the at least one of the communications devices, and wherein the free floating constellation communications system provides a line-of-sight coverage of wireless data to a population on a contiguous landmass and the plurality of lighter-than-air platforms are launched in a manner such that when in an operating range of 60,000 to 140,000 feet there is substantially a relative distance between the plurality of lighter-than-air platforms. The free floating constellation communications system (CCS) could further comprise an altitude regulator device; plurality of geographically spaced-apart platform launching sites from which the plurality of platforms can be launched; a plurality of ground terminals; and a network of communications links interconnecting at least some of the ground terminals to one another. Preferably, the regulator is operatively connected to regulate the platform to float within the stratosphere of the Earth. Preferably, a predetermined altitude range within which the plurality of platforms is regulated to float comprises a range of about 70,000 feet to about 100,000 feet. The regulator regulates the floating of the platform within a predetermined altitude range and comprises a quantity of contained gas having a density less than the density of air within the predetermined altitude range and a controllable vent by which a portion of the quantity of contained gas can be released to reduce the buoyancy of the platform. The regulator comprises a quantity of high density material carried onboard the platform and a release device by which a portion of the high-density matter can be released to increase buoyancy of the platform. Preferably, the regulator comprises: a controllable gas vent; a controllable ballast release device; an altitude determining mechanism; and a control signal processor device connected with the transceiver, the altitude determining mechanism, the gas vent and ballast release so that the altitude can be adjusted.

Preferably, the communications system of the plurality of spaced-apart ground terminals comprises a transceiver. The CCS could further comprise a tracking device, wherein the tracking device comprises: a directional antenna; and a directional antenna aiming mechanism responsive to GPS coordinate data for selectively aiming the directional antenna at one or more of the plurality of platforms. The tracking device comprises: a directional antenna; and a directional antenna aiming and gain tracking mechanism for aiming the directional antenna at a selected platform according to communication signal strength between the selected platform and the directional antenna. Preferably, at least one of the spaced-apart ground terminals comprises a network operation center.

The CCS could further comprise a network operation center (NOC) connected to the network of communications links. Different variations on NOC connections are the following. The NOC is connected to at least some of the plurality of ground terminals with a hub and spoke arrangement of communications links. The NOC is connected to at least some of the plurality of ground terminals with a mesh arrangement of communications links.

Other variations are the following. The network of communications links interconnecting the ground terminals comprises connections to ground lines. The network of communications links interconnecting the ground terminals comprises space satellite communications links. The network of communications links comprises platform-to-platform communications links.

Other variations include the following. The plurality of platforms comprise a lighter-than-air device selected from the group consisting of a balloon, a blimp, an aerostat, a zeppelin, an airship, a dirigible, a weather balloon, a jimsphere, a hot air balloon, a sounding balloon and a meteorological balloon and combinations thereof. The plurality of platforms comprises rubber balloons. The platforms have zero-pressure balloons, internal air bladder balloons, adjustable volume balloons or hydrogen-filled balloons.

Other variations include the following. The communications devices include pagers, advanced messaging devices, wireless telephones, telemetry devices or equipment tracking units. Still other variations include the following. The platform comprises a rapid descent mechanism; and the platform is disposable. The platform comprises a balloon; the platform comprises a rapid descent mechanism; and the balloon is replaceable for recovery and reuse of the transceiver.

Yet other variations include the following: The communications signal transceiver comprises circuitry capable of communications using Frequency Division Multiple Access (FDMA) protocol, Time Division Multiple Access (TDMA) protocol, Code Division Multiple Access (CDMA) protocol, the ReFLEX protocol, the Flex protocol the POCSAG paging protocol, or the ERMES paging protocol.

The CCS could further comprise an altitude determining mechanism; a source of meteorological data; and controls for adjusting the altitude of a platform into a wind velocity and direction determined according to the meteorological data.

The CCS could further comprise an attitude sensor onboard at least one the plurality of platforms; and a steerable antenna coupled to at least one of the communications signal transceivers and attached to at least one of the plurality of platforms, the steerable antenna having stabilization controls for stabilizing the steerable antenna in a direction from the platform provides consistent ground coverage over the geographic area and an aim control operatively associated with the steerable antenna and the altitude sensor for selectively changing the position of the coverage area of the antenna to facilitate filling gaps of coverage over the geographic area.

The CCS could further comprise an unmanned free balloon; and a payload box having a total weight less than six pounds and exterior surfaces with predetermined areas and that has a weight to size ratio of no more than three ounces per square inch on any surface of the package, determined by dividing the total weight in ounces of the payload box by the area in square inches of its smallest exterior surface.

Other variations include the following. At least one of the plurality of platforms further comprises an altitude regulator operatively connected to regulate the platform to float within a predetermined altitude range after initial ascent; wherein the altitude regulator further comprises: a quantity of high density material; a device for determining the altitude of the platform, wherein the device for determining the altitude of the platform comprises a global positioning system (GPS) receiver; and a material release mechanism for releasing a portion of the quantity of high density material.

The CCS could further comprise a hydrogen gas enclosure for holding a quantity of hydrogen; an onboard electrical power source on at least one of the platforms, wherein the on-board electrical power source comprises a fuel cell interconnected with the hydrogen gas enclosure for receiving hydrogen as a component of the fuel for the fuel cell; and an altitude regulator attached to the platform to regulate the altitude of the platform within a predetermined altitude range, the altitude regulator comprising: an altitude determining mechanism; a controllable vent from the gas enclosure and vent controls operatively coupled with the altitude determining mechanism for venting of the hydrogen gas for regulating the altitude of the platform; and a controllable ballast release attached to the platform to release ballast for regulating the altitude of the platform. In variations thereof, the controllable vent and vent controls are operatively coupled thereto further comprise at least one Nickel-Titanium (NiTi) element mechanically coupled to the control vent and operatively connected to the electrical power source for selectively receiving and not receiving electrical power to thereby selectively change the length of the NiTi element for opening and closing the controllable vent. The CCS could further comprise a meteorological package connected to the platform through a fiber optic link to the transceiver thereby substantially preventing electrical arcing between the meteorological package, the transceiver when the platform moves through electrically charged clouds and a tracking system capable of tracking one or more of the plurality of platforms.

Other variations include the following. The network operation center comprises circuitry for controlling a predetermined operation of the platform.

The CCS could further comprise a rapid deflation system for removing a platform from the air upon malfunction or improper location of the platform.

Another embodiment is a free floating constellation communications system comprising a plurality of lighter-than-air platforms comprising at least a first platform and a second platform, each of the first-and second platforms comprising a communications signal transceiver and being free floating without any longitudinal and latitudinal position control; and a plurality of communications devices within a contiguous geographic area, at least one of the communications devices having communications capability with the communications signal transceivers; wherein the at least one of the communications devices is capable of receiving communications from the communications signal transceiver of the first platform and the communications signal transceiver of the second platform, but hearing communications from only one communications signal transceiver and the plurality of lighter-than-air platforms are launched in a manner such that when in an operating range of 60,000 to 140,000 feet there is substantially a relative distance between the plurality of lighter-than-air platforms.

Yet another embodiment is a free floating constellation communications system comprising a plurality of lighter-than-air platforms comprising at least a first platform and a second platform, each of the first and second platforms comprising a communications signal transceiver and being free floating without any longitudinal and latitudinal position control; and a plurality of communications devices within a contiguous geographic area, at least one of the communications devices having communications capability with the communications signal transceivers; wherein the first and second platforms dynamically assign new frames in which to transmit communication signal from the communications signal transceiver as the platforms drift such that a communications device receives communications signals from only one communications signal transceiver in a particular frame and the plurality of lighter-than-air platforms are launched in a manner such that when in an operating range of 60,000 to 140,000 feet there is substantially a relative distance between the plurality of lighter-than-air platforms.

Yet another embodiment is a method of communicating using a free floating constellation communication system comprising providing a communication device for communicating with lighter-than-air platforms; communicating with a first lighter-than-air platform when the communication device is in a communication range of the first-lighter-than-air platform, communicating with a second lighter-than-air platform when the communication device moves out of the communication range of the first lighter-than-air platform, wherein the first and second lighter-than-air platforms each comprise an altitude regulator device and a communications signal transceiver and wherein the first and second lighter-than-air platforms are free floating without any longitudinal and latitudinal position control and the plurality of lighter-than-air platforms are launched in a manner such that when in an operating range of 60,000 to 140,000 feet there is substantially a relative distance between the plurality of lighter-than-air platforms.

Yet another embodiment is a method of communicating using a free floating constellation communications system comprising providing a plurality of lighter-than-air platforms comprising at least a first platform and a second platform, each of the first and second platforms comprising a communications signal transceiver and being free floating without any longitudinal and latitudinal position control; and communicating with a communication device having communications capability with the communications signal transceiver, wherein the first and second platforms dynamically assign new frames in which to transmit communication signals from the communications signal transceivers as the platforms drift such that a communication device receives communications signals from only one communications signal transceiver in a particular frame and the plurality of lighter-than-air platforms are launched in a manner such that when in an operating range of 60,000 to 140,000 feet there is substantially a relative distance between the plurality of lighter-than-air platforms.

Another embodiment is a method for providing communication service comprising providing a first lighter-than-air platform; providing a second lighter-than-air platform, wherein the first and second lighter-than-air platforms each comprise an altitude regulator device and a communications signal transceiver and wherein the first and second lighter-than-air platforms are free floating without any longitudinal and latitudinal position control; providing a plurality of communications devices within a contiguous geographic area, at least one of the communications devices having communications capability with the communications signal transceiver, wherein the at least one of the communications devices is capable of handing off communication with the first platform to the second platform as the first platform moves out of a communication range of the at least one of the communications devices and wherein the free floating constellation communications system provides a line-of-sight wireless data coverage to a population on a contiguous landmass and the plurality of lighter-than-air platforms are launched in a manner such that when in an operating range of 60,000 to 140,000 feet there is substantially a relative distance between the plurality of lighter-than-air platforms.

Variations include the following. The communication device comprises a pager, an advanced messaging device, or a wireless telephone. The altitude regulator device regulates the altitude of the platform to within a predetermined altitude range of between about 60,000 feet and about 140,000 feet. The altitude regulator device is operatively connected to regulate the platform to float within the stratosphere of the Earth. The altitude regulator regulates the floating of the platform within a predetermined altitude range and comprises a quantity of contained gas having a density less than the density of air within the predetermined altitude range and a controllable vent by which a portion of the quantity of contained gas can be released to reduce the buoyancy of the platform. The altitude regulator comprises a quantity of high density material carried onboard the platform and a release device by which a portion of the high-density matter can be released to increase buoyancy of the platform. The altitude regulator device is operatively connected to regulate the platform to float within the stratosphere of the Earth. The altitude regulator regulates the floating of the platform within a predetermined altitude range and comprises a quantity of contained gas having a density less than the density of air within the predetermined altitude range and a controllable vent by which a portion of the quantity of contained gas can be released to reduce the buoyancy of the platform. The altitude regulator comprises a quantity of high density material carried onboard the platform and a release device by which a portion of the high-density matter can be released to increase buoyancy of the platform. The altitude regulator comprises a quantity of high density material carried onboard the platform and a release device by which a portion of the high-density matter can be released to increase buoyancy of the platform.

Figure 12:
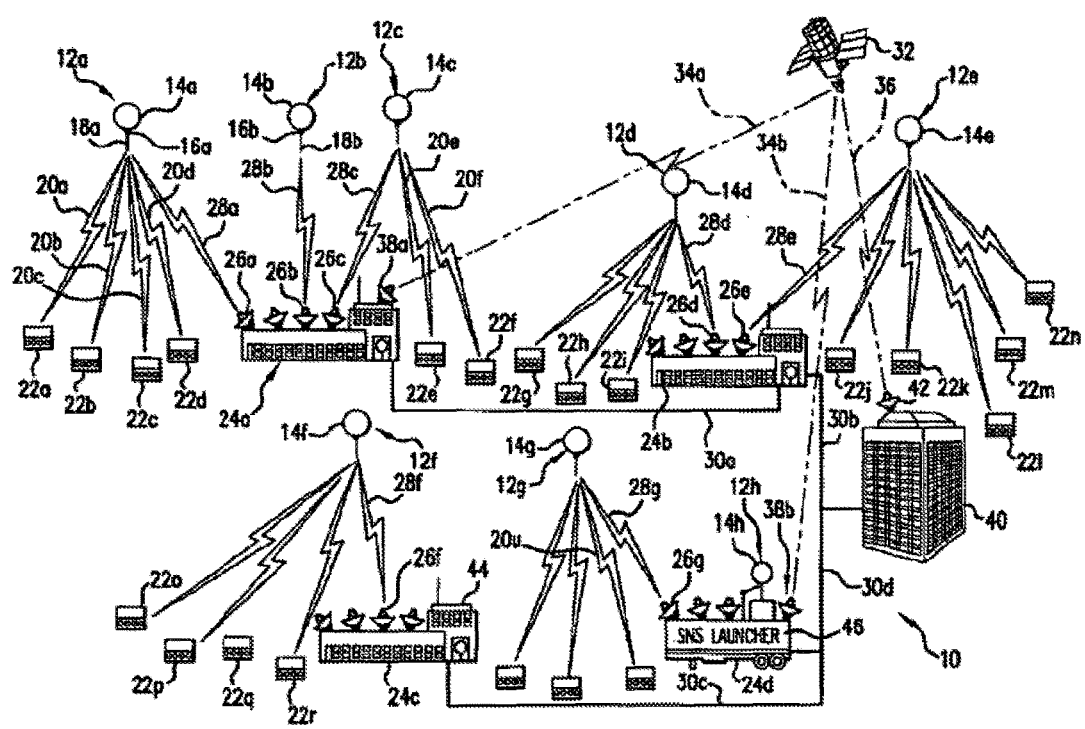
FIG. 12 is a schematic depiction of a plurality of airborne platforms representing a constellation of platforms over a contiguous geographic area, launch facilities and communication terminals, networked together with a network operations center through ground lines and, alternatively, through orbiting satellite communication signals.

FIG. 12 depicts a schematic view of a portion of a constellation and communication network system 10 according to the present invention in which airborne platforms 12(a)-(g) have reached a desired altitude within a range of altitudes, such as in the stratosphere. Also depicted is an airborne platform 12(h) in the process of ascending to a desired altitude. Each airborne platform comprises a lighter-than-air gas enclosure 14(a)-(h), a platform control and communicator device 16(a)-(h) and an antennae 18(a)-(h). Platform-to-ground communication signals are schematically represented at 20(a)-20(u) correspondingly communicating with a plurality of ground communication devices such as radio signal receivers, transceivers, transmitters, or pagers 22(a)-22(u). There are a plurality of launch and tracking terminals 24(a)-(d), each having a plurality of tracking antennas 26(a)-(o). Ground terminals relay message and control data between the SNS platforms and the NOC. Preferably the ground terminals can operate unattended requiring only electrical power and communications signals. The ground terminals consist of a set of transmitters and receivers and their controller, tracking antennas and a tracking controller, redundant communications links to the NOC, and backup power supply. To accommodate the potentiality for several platforms within range at any given time four to six separate transmitters, receivers and tracking antennas are currently contemplated. Both Genera and Motorola offer appropriate commercially available transmitters, transmitter controllers and receivers for the SNS ground terminals although some modifications will be required. The tracking antennas 26 are schematically shown in communication with the various platforms through ground-to-platform signals 28(a)-(g). A ground communication network 30, having interconnecting segments 30(a)-(d) are depicted communicating between the launch and tracking stations 24(a)-(d) and a network operations center 40. The network operations center 40 may also communicate with a plurality of launch and tracking terminals 24 through an orbiting satellite 32 and launch site satellite antennas 38(a)-(d) and network operation center satellite antenna 42. For purposes of illustration, launch and tracking terminal 24(c) is co-located with an airborne platform launcher 44 similar to or the same as the National Weather Service balloon launcher. One aspect of the invention also contemplates a mobile launcher and tracking terminal 46, as for example a self-contained unit mounted on a truck trailer. The mobile launcher can be transported to a desired launch site, parked there and additional SNS platforms can be launched. The tracking and communication terminals 24 can be connected to the network via ground links 30(c) and 30(d), as well as to other launch stations and to the network operations center 40. The mobile launcher and terminal may be moved periodically from one location to another location to launch and/or track additional SNS communication platforms 12(a) as needed to fill in coverage gaps as they might arise due to weather conditions.

Figure 13:
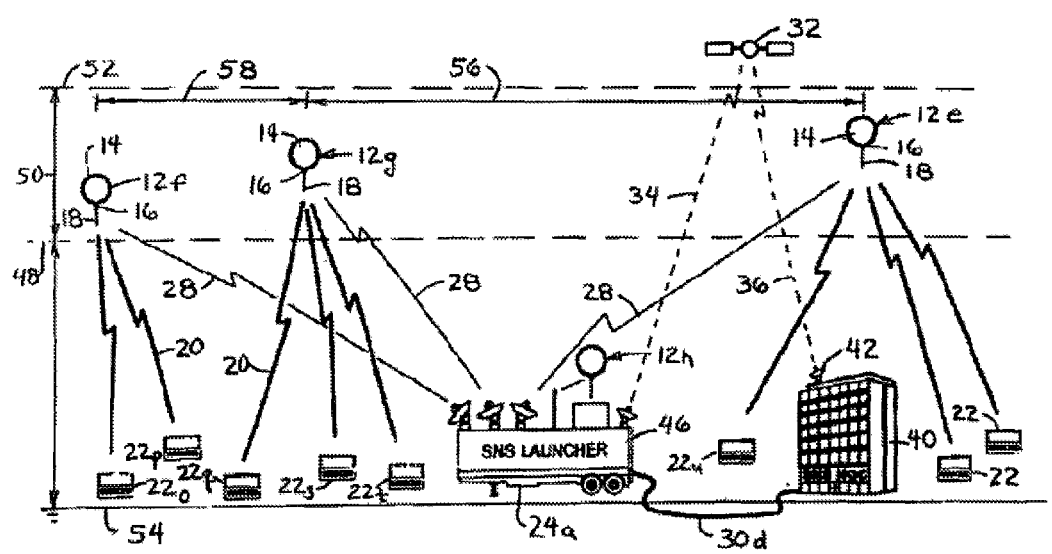
FIG. 13 is an enlarged depiction of a plurality of airborne platforms, a single moveable launch site and communication terminal with network linkage to a network operation center for a plurality of ground terminals and personal communication devices.

FIG. 13 is an enlarged schematic depiction of the mobile SNS launcher 46 of FIG. 12 shown schematically in relationship to platforms 12(f), 12(g) and 12(e) that form a portion of the constellation of platforms. The mobile SNS launcher is in communication with the network operations center 40. Further depicted in FIG. 12 is a range of desired altitudes 50 defined by a minimum desired altitude 48 and a maximum desired altitude 52, each altitude measured relative to sea level 54. In one preferred embodiment, a minimum desired altitude of about 60,000 ft. and a maximum desired altitude of about 140,000 ft define a predetermined range of altitudes. These altitudes generally correspond to the Earth's stratosphere or to a range of stratospheric altitudes 50. Further depicted in FIG. 12 is a gap of coverage 56 between spaced-apart platforms 12(g) and 12(e) schematically represented as a spaced-apart distance 56 that is significantly larger than the desired spaced-apart distance 58 between platforms 12(f) and 12(g). In a further preferred embodiment, it is anticipated that platforms will be regulated to float within a predetermined altitude range of between about 70,000 ft. and 100,000 ft. will have a coverage radius measuring about 175 miles (280 km) will be above commercially regulated airspace and will be below altitudes at which platform survival is less certain. When the distance between two adjacent platforms in any direction is greater than about one and one-half times the coverage radius, a gap in coverage can begin to occur. In such instances, a mobile launching unit 46 can be moved on the ground to a location substantially between the two spaced-apart platforms 12(g) and 12(e) so that an additional supplemental platform 12(h) may be launched for rapid ascent to the desired altitude range 50. Computer modeling based upon the tracking of all the platforms 12 in a constellation 10 of airborne platforms can be used to predict the development of significant gaps 56 in coverage and to rapidly deploy mobile launching units to fill the gaps. In the event that a stationary launching and tracking terminal is already in a location for launching a supplemental SNS platform, no mobile unit would be required.

Figure 14:
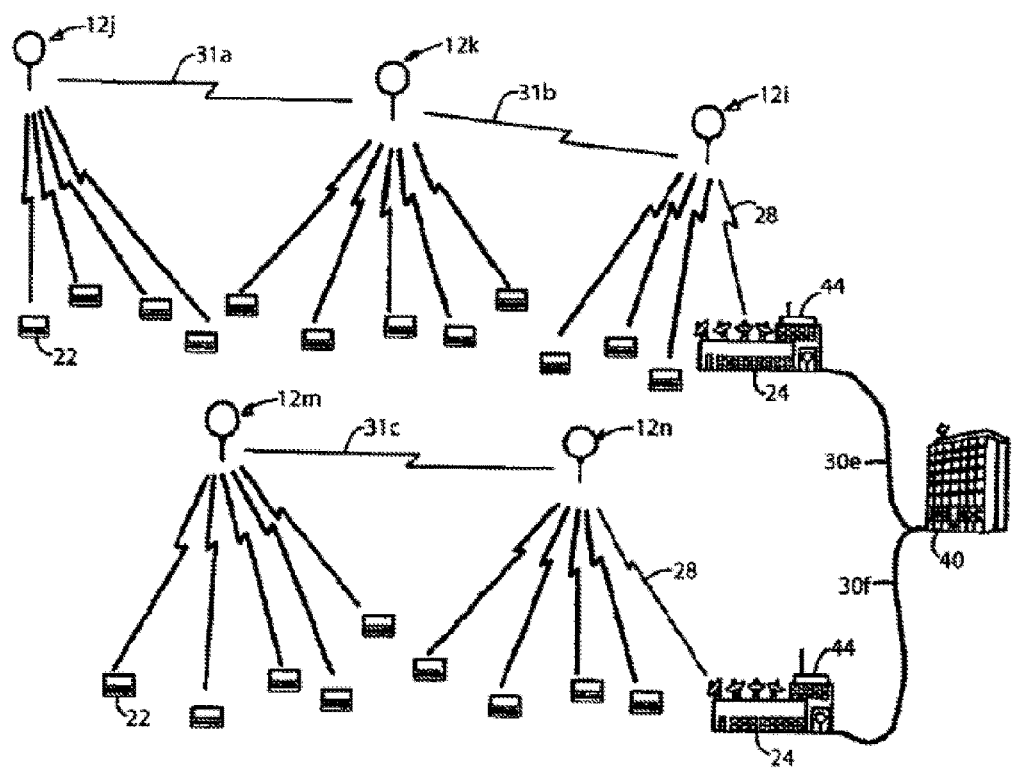
FIG. 14 is a schematic depiction of inter-platform communications with subsequent transmission to ground terminals and to a network operation center (NOC).

FIG. 14 is a schematic depiction of inter-platform communications with subsequent transmission to ground terminals and to a network operation center (NOC).

Figure 15:
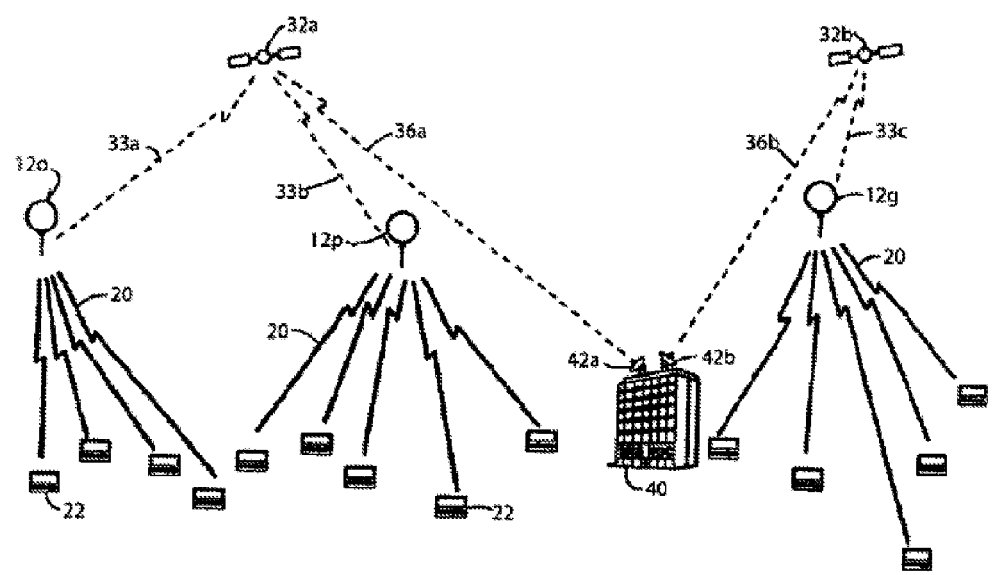
FIG. 15 is a schematic depiction of platform-to-space satellite communication links for providing the network interconnection with a network operation center (NOC).

FIG. 15 is a schematic depiction of platform-to-space satellite communication links for providing the network interconnection with a network operation center (NOC).

Figure 16:
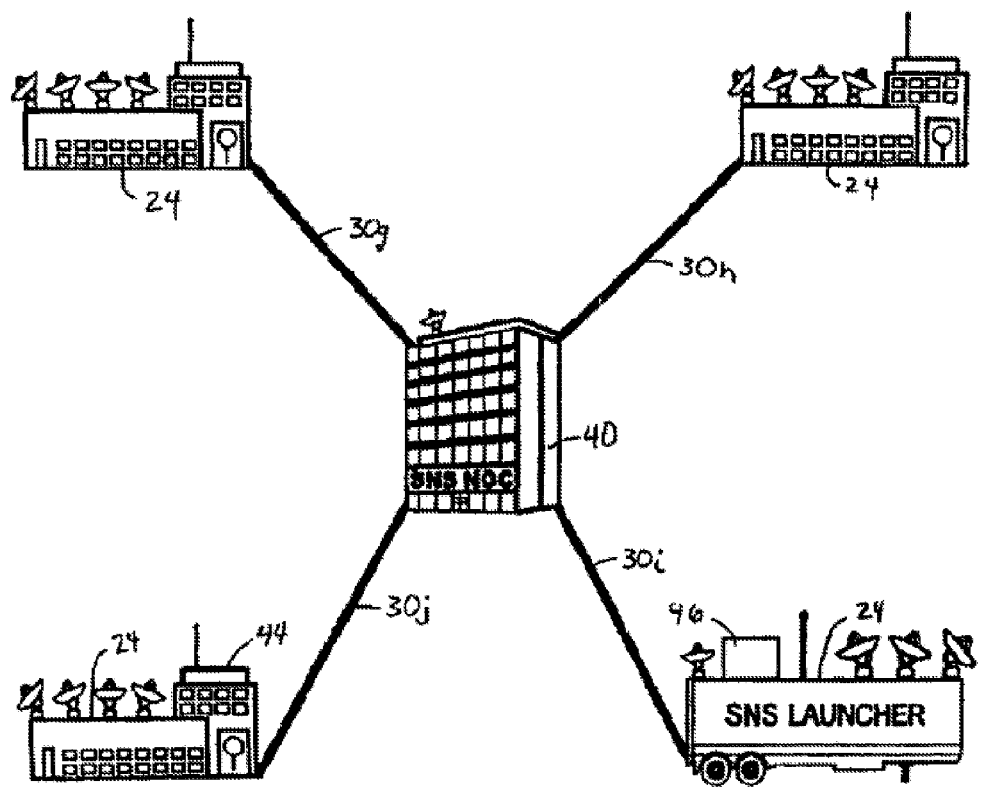
FIG. 16 is a schematic depiction of "hub and spoke" network communication link topography.

FIG. 16 is a schematic depiction of a "hub and spoke" network communication link topography. This is advantageous because it is generally less total communication lines and generally less expensive equipment than by providing a ring topology.

Figure 17:
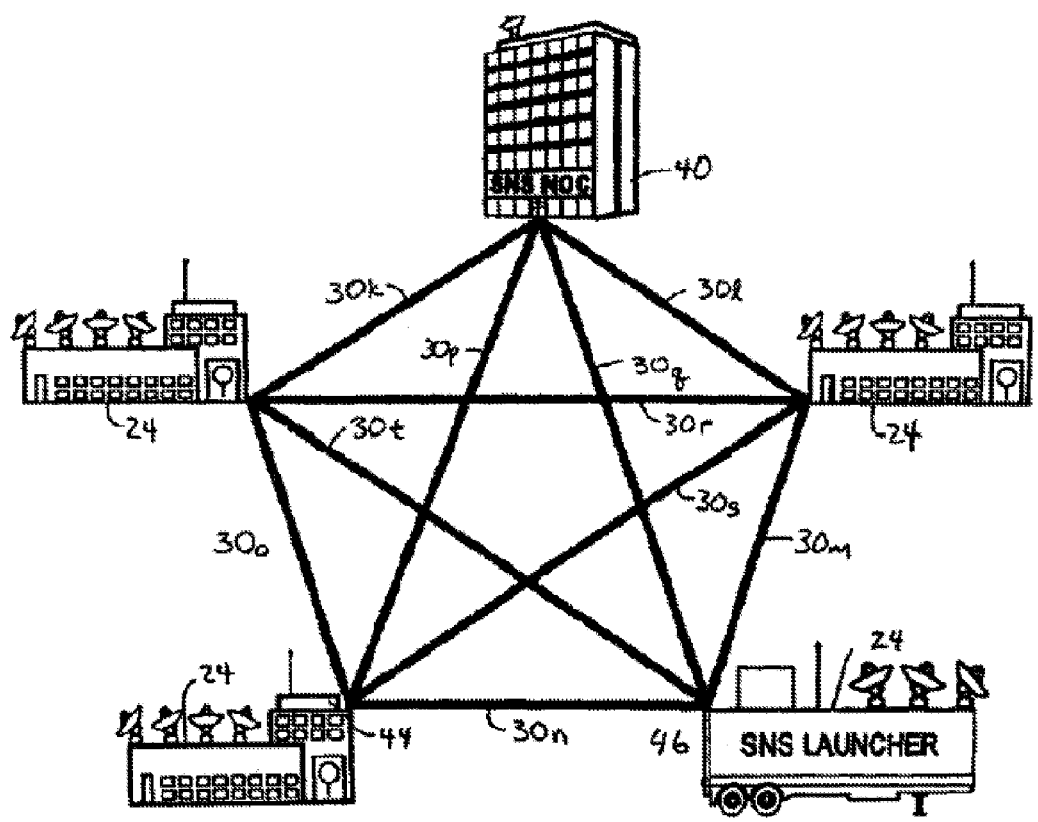
FIG. 17 is a schematic depiction of mesh network communication link topography.

FIG. 17 is a schematic depiction of a mesh network communication link topography. Ring topology essentially daisy chains all of the ground stations together in one, big ring of communications links. This ring is generally considered to lack robustness. If one or two points go down on the ring, it could isolate otherwise functioning ground terminals.

Figure 18:
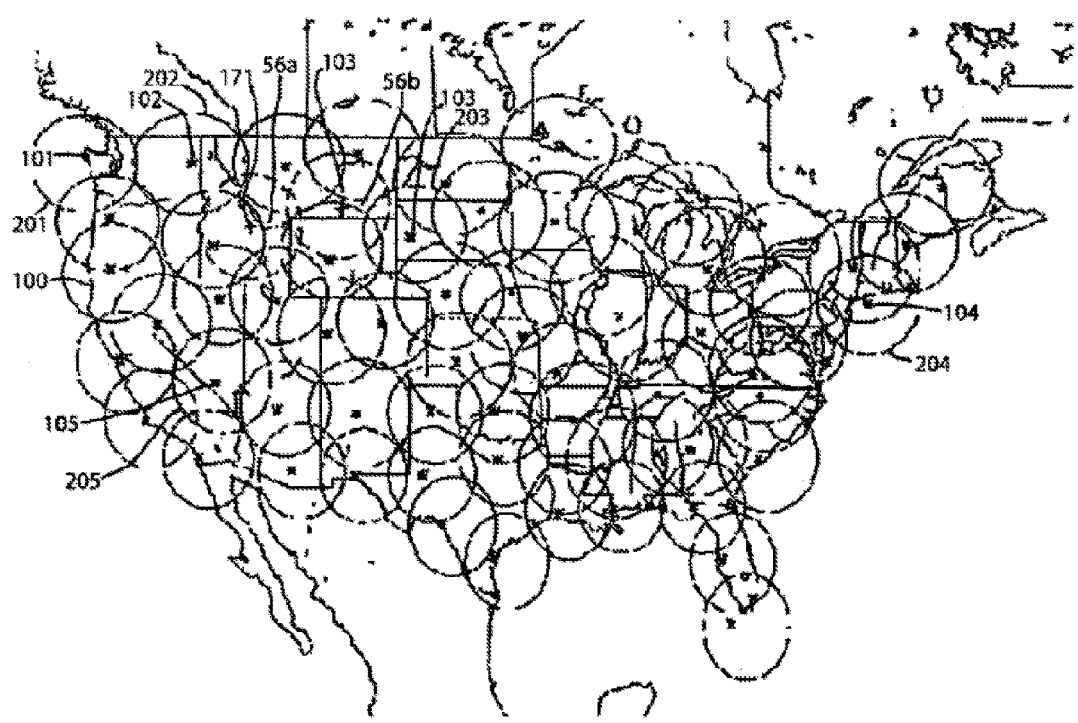
FIG. 18 is a schematic depiction of a contiguous geographic area, particularly the United States, with airborne SNS platform launch sites and showing initial coverage area SAS circles, superimposed on a map of the geographical area and demonstrating the line-of-site coverage areas for each SNS platform such that substantially the entire geographic area is encompassed within the reception range of one or more of the airborne platforms.

FIG. 18 schematically depicts a contiguous geographic area 100, and in particular by way of example, a geographic area corresponding to the United States of America. Superimposed on the geographic area 100 are 70-selected standard launch sites represented by "Xs" 101-170. Further schematically depicted are coverage areas 201-270 representing the position and coverage of each of the platforms 101-170 as they reach a desired regulated altitude, preferably in the stratosphere. Each platform is very small compared to existing synchronous orbit satellites such that they have been referred to and are designed to float in a regulated altitude in the stratosphere such that they have been designated as "stratospheric nanosatellites" (SNS). The coverage areas 201-270 are depicted in FIG. 14 assuming a relatively vertical ascent from the launch sites 101-170. The coverage areas 201-270 will migrate over a period of time, due to wind and weather conditions in a particular locality. However, the ascent to the stratospheric desired altitudes normally takes from about one to two hours, such that the drift for normal airspeeds of less than about 10-20 mph and even passing through the jet stream if present will produce relatively small drifts of 10-80 miles in any direction during the ascent. Thus, relative to the approximately 175-mile (280 km), coverage radius for a circular coverage area having a diameter of about 350 miles (560 km), the migration during a short period of time with standard wind conditions of 10-40 miles, indicates that the launch site is a reasonable approximation for the initial high altitude location at the end of the ascent.

The platform for balloons 12 are provided with altitude control mechanisms, including both low density gas venting and high density ballast dropping mechanisms, allowing the balloon to be controlled to maintain a desired altitude within a range of desired altitudes. The altitudes may be maintained for between 12-24 hours corresponding to the current NWS balloon-launching schedule of two launches per day. If the NWS launching schedule is not used, the balloon altitudes may be maintained for over 100 hours depending on the lift gas, power, and ballast remaining on the balloon 12. In the case of NWS balloons, currently the balloons self-destruct from overexpansion as they reach and exceed altitudes of over 100,000 ft. and weather data is gathered and transmitted to the ground during the ascent. In the case of balloons acting as carriers for the communication platforms, the platforms will be maintained at an altitude preferably less than 140,000 ft. And more preferably less than about 100,000 ft. and will continue to migrate due to upper stratospheric wind conditions. The NOC may command a SNS platform to rapid deflate or burst in the case of a balloon 12, when the platform is no longer needed, it falls below the 60,000 ft. and no ballast remains, it drifts over an undesired area, or it malfunctions. The platform may initiate this if any of these conditions are met and the platform has lost communication with the ground terminals. Advantageously, the wind conditions will have been detected during the ascent and will continue to be monitored through the tracking by the ground stations. This will facilitate predicting the development of any gaps in coverage that might be expected, and particularly the location of such gaps and the number of ground communication devices or pagers that might need to be serviced in the area of the gap.

Figure 19:
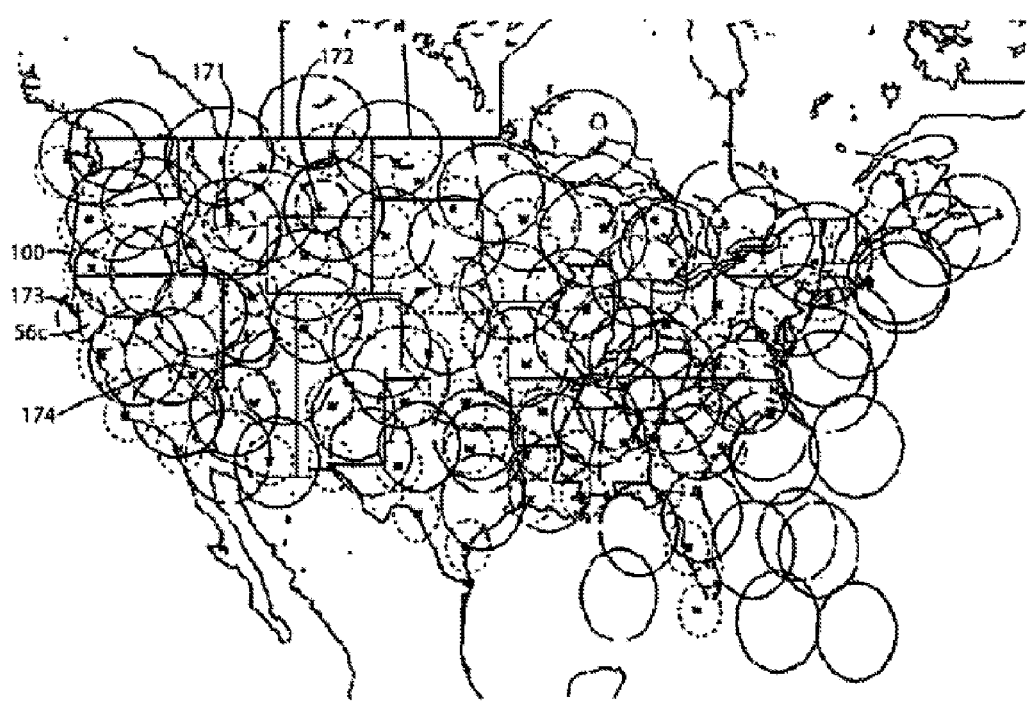
FIG. 19 is a schematic depiction of an example of airborne platform migration after a period of regulated altitude free-floating of the airborne platforms and also depicting additional gap-filling launch sites, that may be provided by mobile launchers, to supplement and complete the continuity of coverage with additionally launched airborne communication platforms.

FIG. 19 is a schematic depiction of the geographic area 100 after a given migration time period during which significant gaps may begin to occur. Mobile units may be positioned at temporary launch sites 171 and 172 for filling developing gaps 56(*b*) and 56(*c*). Also, where a gap is predicted to develop in close proximity to a standard launch site, as, for example, at 105, an additional platform may be launched from launch site 105 in advance of the normally regular launch time period. Thus, gap 56(*c*). In a similar manner, a plurality of typically regionally located mobile launch sites may be employed to fill gaps as they arise. In the event that a pattern of gap development is detected, then additional permanent launch sites 173 and 174 may be added to help compensate for repeated developments of gaps 56(*d*) and 56(*e*), for example. Temporary launch sites may be moved seasonally to fill the gaps along the coast line along the direction the wind is blowing for the season, for example, the western coast during the winter season.

Figure 20:
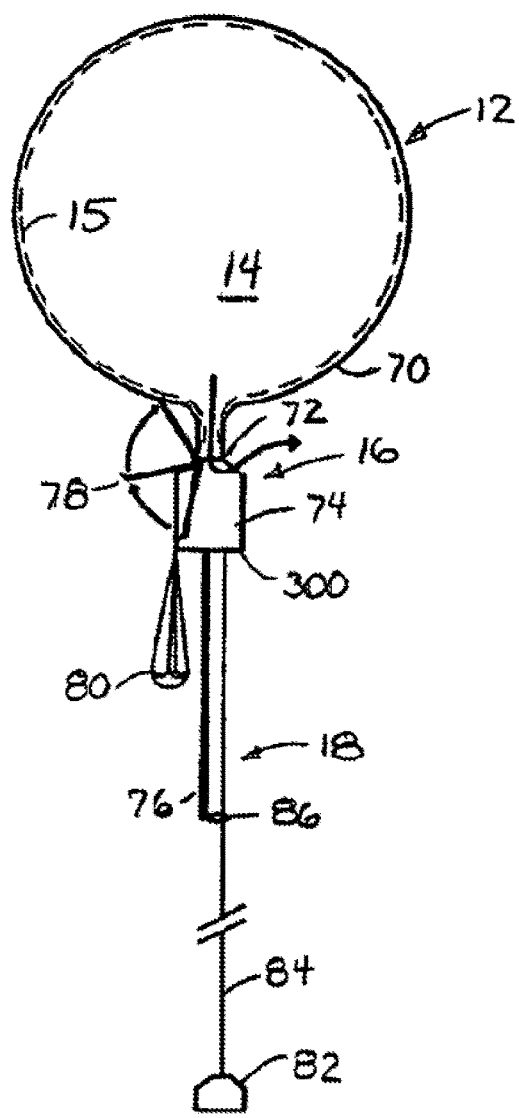
FIG. 20 is a schematic side view of an airborne platform in which a lighter-than-air gas enclosure, such as a balloon, is attached to a box holding the electronic controls, communications devices, sensors and a meteorological data-gathering package.

FIG. 20 shows a schematic side elevation view of a platform 12 in an embodiment in which the low-density gas enclosure 70 is preferably a latex balloon 70. A Totex 1000 balloon filled with hydrogen and internally coated to reduce hydrogen diffusion adequately provides lift for the SNS communications platform. The Totex balloon is released with a diameter of about five and one-quarter feet and expands to about twenty-four feet across at 140,000 feet altitude. It will be noted that other lighter-than-air enclosures, such as blimps, aerostats, zeppelins, airships, dirigibles, weather balloons, jimspheres, hot air balloons, sounding balloons or meteorological balloon might also be used in place of the proposed latex weather balloon 70 schematically depicted in FIG. 6. Also, the diameter of balloon 70 in FIG. 6 is not to scale and it is expected that a total platform weight, including the payload box 300, altitude control vent mechanism 72, meteorological package 82, antennae 76 and meteorological cable connection 84. Preferably the cable 84 is a fiberoptic cable having a length of approximately 25 meters so that the meteorological data collection package 82 is sufficiently distanced from the balloon 70 to reduce to a minimum the effect of turbulence caused by the balloon on the meteorological data sensed by the meteorological package 82. The fiberoptic cable 84 is used to transmit the meteorological data from meteorological package 82 to the communications unit 74. Fiberoptic cable is used as wire would arc due to the high electric field potential when passing through thunderclouds.

There are numerous types of low-density gas enclosure devices, and particularly balloons, that might be considered useful for the present invention. Among the potentially preferred types of balloons are rubber pressure balloons, zero pressure balloons, internal air bladder balloons, adjustable volume balloons and super pressure balloons. Each type of these balloons has different advantages and disadvantages and, for purposes of the present invention, it has been found that the rubber pressure balloon is most preferred and the zero pressure balloon is also considered a preferred alternative.

The rubber pressure balloons have a stretchable rubber membrane containing the lifting gas that allows the balloon to increase in size as the external air pressure decreases as the balloon rises. This is the most common type of weather balloon and is also consistent with party balloons. The primary advantage is the low cost and common accessibility so that high quality balloons of this type, such as weather balloons, are available at low cost. These balloons are somewhat fragile and they have delicate handling requirements and also low extended reliability. Further, the use of such balloons requires venting of the lifting gas to prevent bursting upon reaching maximum altitudes.

The zero pressure balloons consist of an initially loose bag, usually made from a plastic such as polyethylene or Mylar. As the external air pressure decreases, the bag increases in volume. Once the bag reaches its whole volume, gas must be vented or the balloon will burst as the bag material does not stretch. Although this type of balloon may be more reliable than the rubber balloons and provide less diffusion of the lifting gas, it is of a median cost, more costly than the rubber balloons, currently between about four to ten times more expensive. Thus, although the rubber balloon might be more preferred for purposes of low cost platforms, the zero pressure balloon also provides a useful enclosure for lifting the platform up and has certain advantages over the rubber pressure balloons.

Internal air bladder balloons consist of a flexible balloon containing air enclosed in a fixed volume balloon contain a lifting gas. Air is pumped into the inner-flexible balloon, which compresses the lifting gas trapped in the fixed volume balloon, thereby decreasing the overall lift. Air is let out of the inner-flexible balloon to increase lift. Blimps adjust lift using this principle. This type of balloon has certain advantages as there is no lift gas lost when reducing lift and it is potentially more reliable than rubber balloons, however it is more costly due to extra balloon, pump and extra required power for operating the increase and decrease of lift mechanism.

Adjustable volume balloons consist of a fixed volume containing the lifting gas and a mechanical way of reducing the volume of the balloon. By decreasing the volume, the lifting gas is compressed and the lift decreases. The volume may be reduced any number of ways, including an adjustable line inside the balloon from the top of the balloon volume decreases. This has less diffusion of the lifting gas, theoretically, lifting gas is not lost when reducing lift and it may be more reliable than rubber balloons. However, it has a significantly more costly due to the mechanical volume reducing mechanism and further, requires extra power for operation of such a mechanical volume-reducing mechanism.

Super pressure balloons have a fixed volume. They are called super pressure balloons because they do not expand to match the decreasing exterior pressure. They are built strong enough to hold the increased pressure. The balloons can achieve extremely long float lies because they do not need to vent gas to prevent bursting and they typically have very low membrane gas diffusion. This type of balloon is the highest cost, although one of the most reliable, with little loss of lifting gas. The extreme high cost and difficulty of manufacture and the lack of developed technology regarding such balloons, indicates that other alternatives are currently more attractive.

A signal transmission antenna 76 extends from the communication device 74 preferably vertically downward from the communication device 74 and preferably a collinear array with approximately a 6 degree down tilt configured to provide even transmission and reception coverage over the entire circular coverage area. The antennae 77 may advantageously be provided with a support loop 86 to facilitate stabilization between the antennae and the meteorological connection cable 84. Also depicted in FIG. 6 is a balloon destruct mechanism 78 and a parachute 80 for recovery of the communication device 74, when the balloon is destroyed by the controlled destruct mechanism 78 or otherwise by natural causes.

Figure 21:
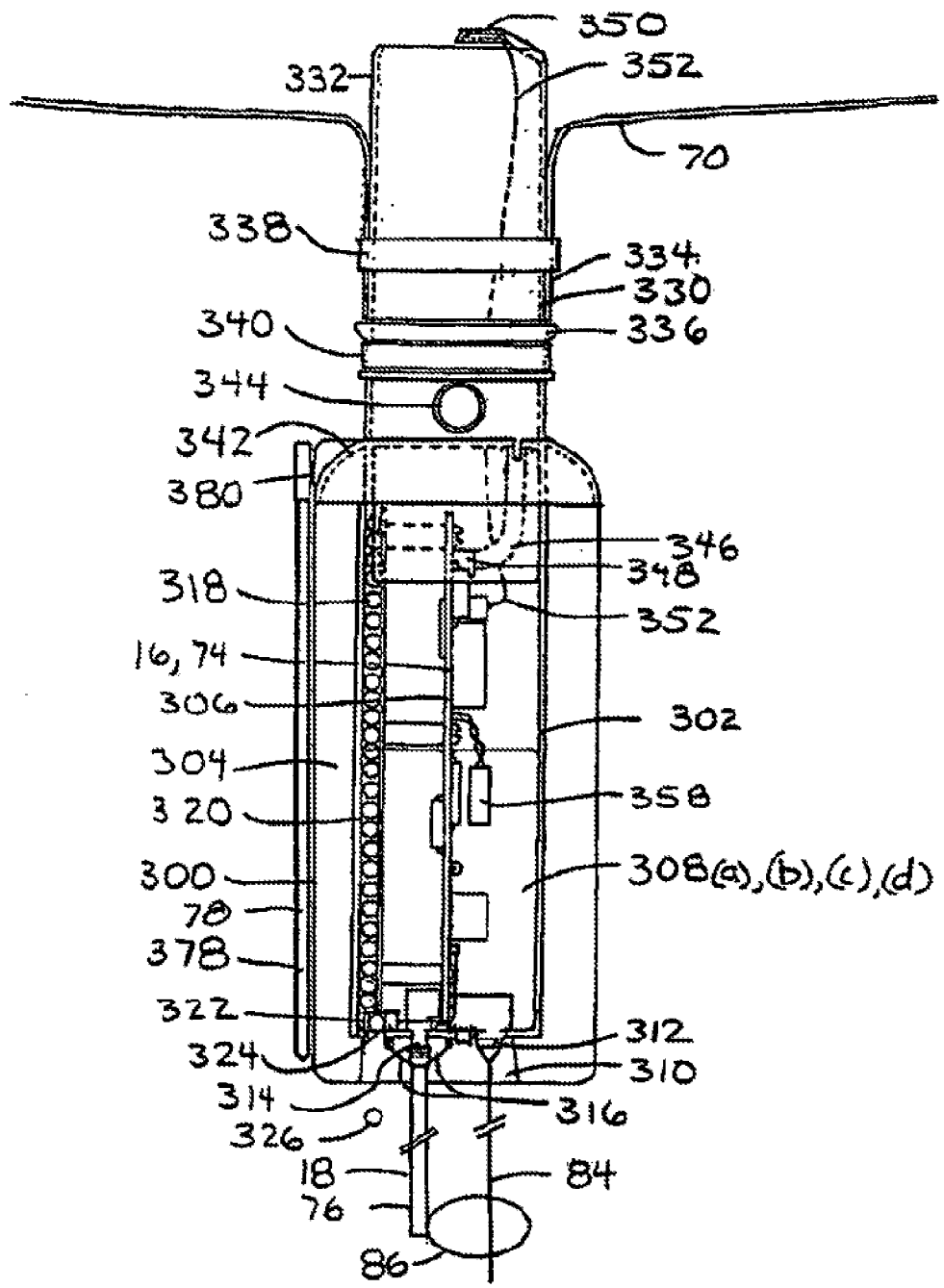
FIG. 21 is an enlarged partial cross-section of an airborne platform, including the control and communications box fastened to a lighter-than-air gas enclosure, or balloon, according to one embodiment of the present invention.

FIG. 21 depicts a partial cross-sectional front view of one embodiment of a communication device 74 according to the present invention. There is a payload box 300, including an interior container 302 and exterior Styrofoam insulation 304 surrounding the interior container 302. Within the container 302 is a circuit board 306 to which various electronic components are attached and interconnected to provide signal communication and remote control of the platform as desired. The electronics section consists of the RF section, antennas, GPS receiver, processor and power regulators. The RF section is based on the low cost transmitter and receiver section of current two-way pagers. The transmitter power is increased to approximately 7 watts. A single 900 MHZ collinear dipole array antenna serves both for transmit and receive functions. Additional antennas may be added for gateway RF links to the Ground Terminals if the additional frequencies become available. Possible frequencies include the 1680 MHz band assigned to meteorological instruments. If the SNS system also collects weather data for the NWS and this data is transmitted on the meteorological aids band, it may be possible to send additional gateway traffic with the meteorological data. A twelve channel GPS receiver in conjunction with the processor provides positional information to both the NWS during ascent and to the SNS NOC for the entire flight. The NOC uses the information to locate the SNS platforms, to determine coverage holes or gaps, and to make rudimentary position adjustments by varying the altitude into favorable wind speeds and directions.

Figure 22:
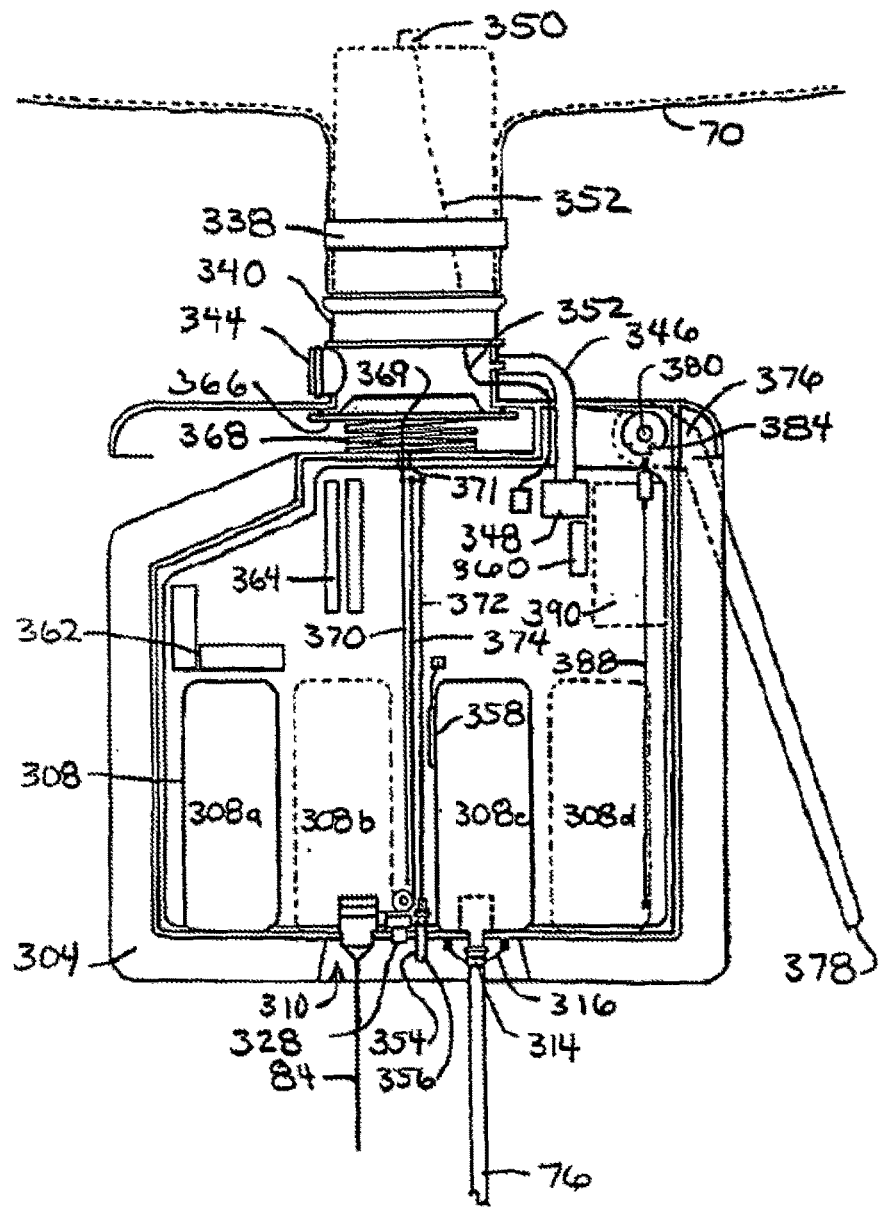
FIG. 22 is a side partial cross-sectional view of the airborne control and communications platform of FIG. 17 according to one embodiment of the invention.

The embodiment depicted in FIG. 21 and the side partial cross-section thereof as depicted in FIG. 22 shows the power for the communication device 74 being provided by a plurality of lightweight, high power batteries 308($a$), ($b$), ($c$) and ($d$). The platform may require between about three and eighteen watts of power depending on the message traffic and the platform configuration. Lithium sulfur dioxide (LiSO2) batteries are cost and weight effective and have decent operating characteristics in a low temperature environment as found at high altitudes. The batteries are positioned at spaced-apart alternating positions so that maximum unit volume density is maintained below established maximum unit volume density requirements for federal aviation safety standards. The low unit volume density and low total payload weight keeps the launching of the balloons from being restricted by FAA regulations. There is a bottom opening 310 through which the meteorological connection cable 84 connects at a releasable cable connector 312 to the circuit board 306 inside of the container 302. Also, antennae 76 is attached at an antennae connection 314 located in the bottom opening 310 so that signals may be received or transmitted through the antennae 76 to and from circuit board 306. Meteorological data from fiberoptic cable 84 may be received and processed in components of the circuit board 306 or may be transmitted directly to the ground terminal 24 through antennae 76. Active antennae stabilizers 316 are provided to reduce and dampen movement of antennae 76 so that consistent signal reception and transmission is accomplished. To facilitate regulation of the altitude of the airborne platform 12 and the attached communication unit 74, the payload box 300 includes a ballast storage chamber 320 in which ballast 318 is carried. Ballast 318 is preferably easily moveable lead shot, metal BBs or spherical glass beads that may be controllably released as with a ballast drop gate, such as a shuttle, that moves alternatively between opening into the ballast chamber 320 and then to the ballast outlet orifice 324, such that the ballast may fall from the bottom opening 310 as schematically depicted at 326. For convenience and for avoiding power depletion during storage or transport, a manual circuit activation switch 328 is provided.

At the top of the payload box 300 is a balloon connection spindle 334, having a distal neck top 332 over which the flexible balloon connection neck 330 is attached. The balloon connection neck 330 is sized for fitting over the spindle and is stretched and moved down to a stop lip 336 so that it is secured in position with one or more heavy rubber bands 338. For convenience, a rubber band storage channel 340 is provided below the stop lip. A rubber band is stored and in position for securing a "fresh," lighter-than-air enclosure or balloon 70. Preferably, balloon 70 will be filled with helium (He), hydrogen or natural gas through a light gas fill valve 344 that is preferably positioned above a rain hood 342 that shields the payload box and certain components thereof from rain and other precipitation. The light gas fill valve 344 provides for a convenient connection to a light gas supply tank, such as a helium or a hydrogen supply tank, so that an expandable balloon is attached at its neck 330 to the spindle 334 and fill gas can then be supplied in a desired amount into the attached enclosure or balloon. A gas pressure sensor tube 346 communicates between the interior of the spindle to relay the internal balloon gas pressure sensor 348 connected to the electronics of the circuit board. A gas temperature sensor 350 is attached and is desirably positioned at or above the neck top 332. A temperature sensor wire 352 communicates a signal representing the temperature to appropriate circuitry on the circuit board 306. An ambient air temperature sensor 354 is also desirably provided, as well as an ambient air pressure sensor 356, both of which are connected for communicating the sensed ambient air temperature and the sensed ambient air pressure to the circuit board. A battery temperature sensor 358, a payload temperature sensor 360 and an attitude sensor 362 may all be connected to the circuit board 306 to desirably provide information and input for remote controlling and for maintaining the functions of the airborne platform 12 using the circuit 306. The data collected from the gas temperature sensor 350, the ambient air temperature sensor 354, the gas pressure sensor tube input 346, and the ambient air pressure sensor 356 is used, in part, to determine if the balloon is nearing a burst condition. A heater and cooler device 364 is attached to control the interior temperature of the payload box. As the airborne platform ascends into high altitudes, the ambient temperature drops dramatically and the interior of the box will desirably be heated by heat generated by the batteries or, alternatively, by the heater 364. If the heat from the batteries is significant and is combined with, for example, bright sunlight, the interior temperature might increase above desired operating temperatures, then the cooler portion of heater and cooler device 364 may be activated to maintain a desired operating temperature range. The heater and cooler device may be a thermoelectric cell.

For purposes of regulating the altitude of the balloon and, in particular, to avoid continuous ascent above the desired maximum high altitude, a light gas relief valve 366 is provided. A spring 368 keeps the relief valve 366 normally closed. An actuator rod 369 is attached to the valve 366 and to a valve actuator wire 370, to open the valve against the spring loading. A Nickel-Titanium (NiTi) wire may be used as the actuator wire 370. Light gas relief valve 366 opens against the spring loading when a small amount of current is passed through the NiTi wire causing it to shrink or shorten a predetermined amount so that the relief valve is pulled open, thereby allowing lighter-than-air gasses to escape. The actuator rod may pass through the top of the container 302, preferably through a seal 371, so that the interior of the container is not directly exposed to the elements. The ballast shuttle gate 322 may similarly be activated with a ballast drop actuator wire 372, also made of Nickel-Titanium (NiTi). The active antenna stabilizers 316 may similarly be comprised of NiTi wire.

A meteorological drop control wire 374 may also be NiTi and can be used to disconnect the weather sonde after meteorological data is no longer being obtained. Typically, weather balloons burst after they pass through the stratosphere. Here, the balloon will vent some of the light gas to hold at a stratospheric altitude for desired period of time. The destruct mechanism 74 may be remotely activated with the sharp end 378 of a pivotal destruct arm to cause the platform to fall. The destruct arm 376 is spring-loaded for rapid rotation into contact with the exterior of the balloon when a hold release pin 386 is pulled from engagement in a hold/release groove 384. The release pin 386 may advantageously be controlled with a control wire 388 also appropriately activated through the circuit board upon receipt of remote signals through the antennae 76 or from the processor. Also provided inside of the platform is a GPS antennae 390 connected to the circuit board for reception of position information from The GPS satellite system to facilitate tracking of the platform as it migrates and floats over the contiguous geographic area of coverage.

Figure 23:
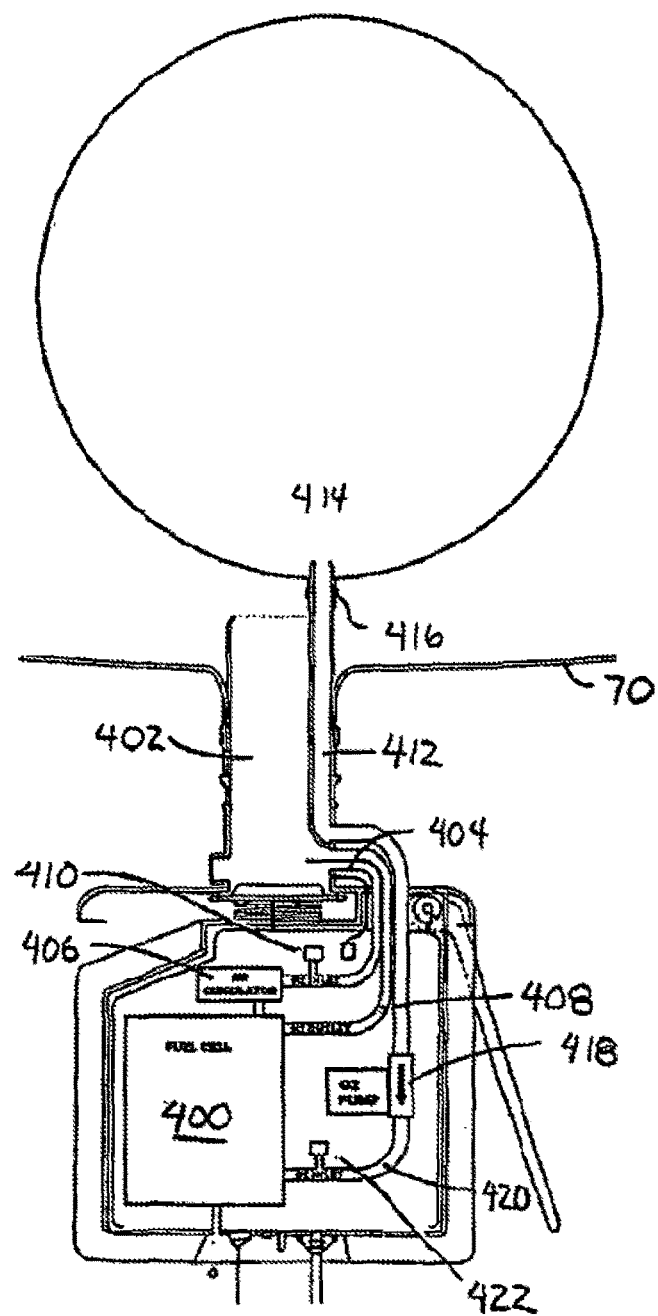
FIG. 23 is a partial cross-sectional side view of an alternative embodiment of a control and communication platform in which an alternate power source, including a hydrogen/oxygen-powered fuel cell is used in place of the batteries of the embodiment of FIG. 18.

FIG. 23 is a schematic side partial cross-section of an alternative embodiment of the platform according to the present invention in which the electrical power source for the communication circuit and controls is a fuel cell 400. Fuel cell 400 may advantageously be a proton exchange membrane (PEM) fuel cell of the type that uses hydrogen and oxygen to provide electrical power. This type of system requires a hydrogen tube 402 connecting from the source of hydrogen, i.e., the lighter-than-air balloon 70 to the fuel cell 400. A hydrogen inlet 404 is provided with a hydrogen circulator 406, which may simply be a fan 406. Thus, using the hydrogen tube, hydrogen may be extracted from the balloon and inlet into the fuel cell 400. Also, there is a hydrogen outlet 408 that is recycled back to the balloon. A hydrogen tube pressure sensor 410 is provided to appropriately monitor the hydrogen partial pressure at the fuel cell. A fuel cell of this type also requires an oxygen supply that may be provided by attaching an oxygen balloon 414 to an oxygen tube 412 so that the oxygen balloon is inside of the hydrogen balloon enclosure. The oxygen balloon is constructed to hold the oxygen at a significant internal pressure. This oxygen balloon 414 may be attached to tube 412 with a rubber band 416 and an oxygen pump 418 moves and further pressurizes oxygen from the oxygen balloon 414 into the fuel cell through an oxygen inlet 420. Again, to regulate the process an oxygen pressure sensor 422 is provided. The fuel cell reaction results in water as a byproduct. The water is maintained in a liquid state by the heat generated by the fuel cell and is desirably drained before it can freeze at the high altitudes at which the platform operates.

Figure 24:
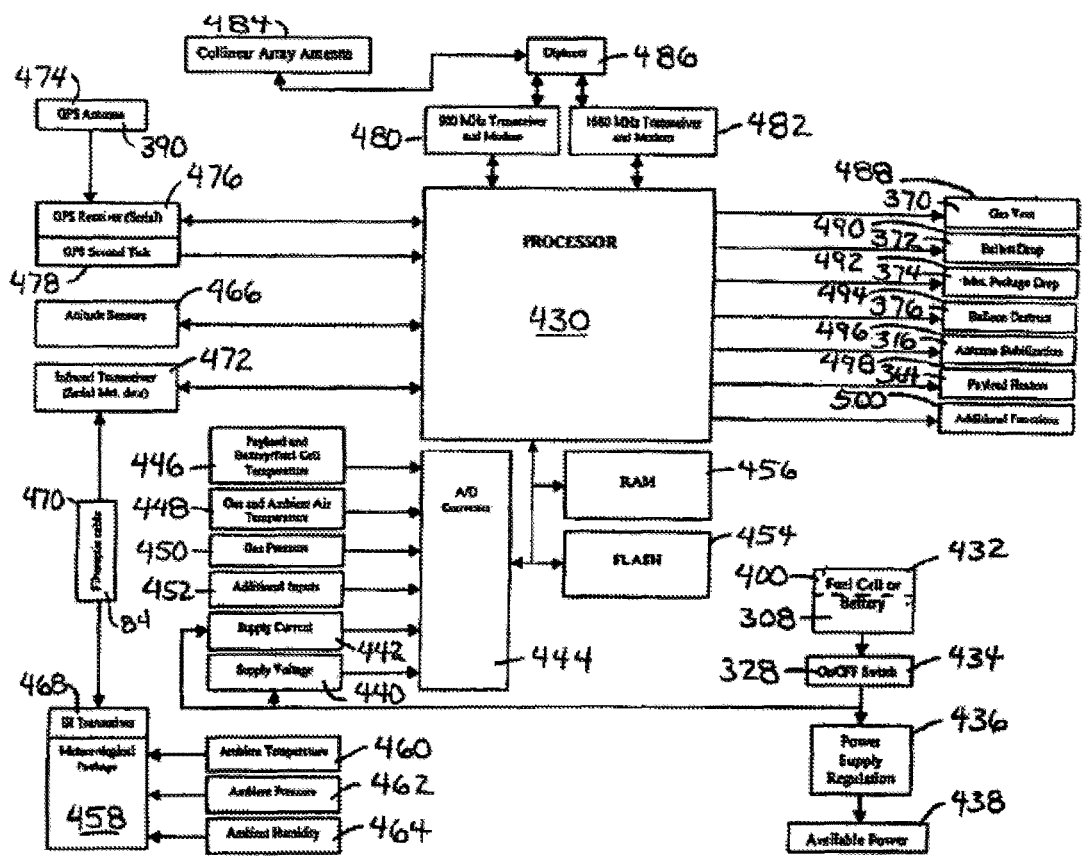
FIG. 24 is a schematic block diagram of an electronic circuit for control, sensing, and communications according to one embodiment of the invention.

FIG. 24 is a schematic block diagram of the SNS platform hardware contained within the payload box 300 and placed on or interconnected with circuit board 306. A processor 430 receives electrical signal input and provides electrical signal output, interacting with a plurality of components for both controlling the flotation altitude, temperature, balloon destruction, ballast drop, etc. of the platform and also for receiving, processing and transmitting communication signals received and transmitted to and from ground stations, personal communication devices or other information communications. Initially, block 432 represents either the batteries 308 or the fuel cell 400. Block 434 represents the on/off switch 328 to activate providing power to a power supply regulation circuit 436 with output available power 438. For clarity, individual power connections to various operational and control devices have not been shown in all instances. Power is provided to the supply voltage sensor at block 440 and current supply sensor block 442, which provide information to an analog to digital converter 444. The analog to digital converter also variously receives information from the payload and battery fuel cell temperature gauge at block 446, both gas and ambient air temperature readings at block 448 and gas pressure at block 450. Additional analog informational signals are generally represented by block 452. Digitally converted information is variously provided to and received from flash memory at block 454 and random access memory (RAM) at block 456. From AID converter 444 and also from the flash memory 454 and from RAM memory 456, the processor has access to all the various input control data. During the ascent of the SNS platform, the meteorological package represented by block 458 receives appropriate weather information including ambient temperature 460, ambient pressure at 462 and ambient humidity at 464. The antenna stabilization 316 represented by block 496 may rely upon the attitude sensor information that is part of the SNS platform control system at 466 to stabilize the antenna 76. Information sensed or gathered by the meteorological package 458 is transmitted. For example, the infrared transceiver 468 through a fiber optic cable at block 470 corresponding to the physical fiberoptic cable 84 and a processor infrared transceiver 472 by which serial meteorological data is transferred to the processor 430 for appropriate transmission to ground terminals during the ascent of the SNS platform with the meteorological package 458 attached. A GPS antennae block 474, corresponding to physical GPS antennae 390, communicates through a GPS receiver 476, indicated as a serial port and further synchronized with a GPS clock or seconds tick at block 478. Thus, the position at particular times is provided to the processor. This positioning information is coordinated with the other meteorological input for determining wind speeds steering any part of the ascent, thereby corresponding those wind speeds to particular altitudes and geographical locations during the ascent.

Communications are controlled by processor 430, preferably using both a 900 MHZ transceiver and modem 480 and a Gateway transceiver and modem 482 signal to and from co-linear array antennae 484 are interfaced through a diplexer 486 control information received at co-linear array antennae 484, therefore transferred through the diplexer and one of the appropriate frequency transceivers to the processor 430 with input information from ground signals and also from input information from the onboard sensors as provided through AID converter 444, the GPS position information from 476, the GPS time information 478 and the attitude sensor information 466, various functions of the SNS platform can be controlled. Including the gas vent at block 488 corresponding to the gas vent actuator 370. Also the ballast drop is controlled at block 490 corresponding to the physical ballast drop actuator 372. The meteorological package drop controlled schematically at block 492 corresponding to the package drop actuator 374. The balloon destruct control is depicted at block 494 corresponding to the destruct actuator 376. Antennae stabilization may be affected according to controls at block 496 corresponding to the antennae stabilization mechanism 316. Payload temperature controls, both heating and cooling, may be controlled at block 498 corresponding to heaters and coolers 364. Additional functions as may be additionally included, are provided with controls at block 500.

One embodiment of this invention relates to a LTA rise rate control system. A typical National Weather Service balloon system, as is well known, consists of a rubber extensible balloon filled with a lifting gas, a parachute tied to the balloon, a line extending down from the parachute and a radiosonde tied to the end of that line. The radiosonde collects and transmits weather related data down to a ground station as the balloon system rises through the atmosphere.

The National Weather Service requires that weather balloons rise at a standard rate of 1000 feet per minute. This is nearly impossible to maintain throughout the balloon's rise due to many factors including the variance with altitude of the pressure and temperature of both the lifting gas and the ambient air, the variance in the balloon material, the manufacturing process, and the physical change in the size of the balloon itself as the balloon rises.

In addition, a significant number of NWS weather balloons do not obtain the desired altitude of 100,000 feet because, among other factors, the balloon expands significantly when obtaining the higher altitudes, becoming thin and many times bursting early for the same reasons as listed above. If the amount of gas could be reduced at the higher altitudes, the chance of balloon burst would be decreased.

The present invention utilizes a rise rate control system to vent the lifting gas as needed to slow the balloon's ascent to no more than 1,000 feet per minute. Additionally, by venting the lifting gas, the balloon size is reduced, increasing the probability of reaching the desired 100,000-foot altitude without bursting.

The rise rate control system consists of a venting mechanism attached to the neck of the balloon that can release lifting gas from the balloon, a vent actuator for opening and closing the venting mechanism, an altitude sensor for determining the altitude and rise rate of the balloon system, and a comparing mechanism or circuit to control the vent actuator to cause the vent to release some lifting gas when the desired rise rate is greater than the desired value.

In one embodiment, a GPS unit provides the processor with rise rate information. The processor compares the current rise rate with the desired rise rate stored in the processor's memory. For the National Weather Service balloon systems, the desired rise rate is 1,000 feet per minute. If the current rise rate is higher than the desired rise rate, the processor directs the actuator to open the vent until the desired rise rate is achieved.

Additionally, a ballast system containing a ballast container, ballast, and a ballast actuator could be added to the rise rate control system. The processor compares the current rise rate with a minimum desired rise rate stored in the processor's memory. If the current rise rate is lower than the desired minimum rise rate, the processor, may activate the ballast actuator to drop ballast until the rise rate increases to the desired value.

The processor may first process the rise rate data coming from the GPS unit by filtering the rise rate values. This filtering may be necessary as the GPS data may be noisy. Additionally, erroneous data may be present and need to be removed from the GPS data. The need for filtering or removing of erroneous data will vary with the different makes and models of GPS units. Alternatively, mechanical means for determining the rise rate may also be used instead of using rise rate information from a GPS unit.

Another embodiment performs transmitter geo-location from a LTA platform. Having the capability to locate specific wireless devices can be extremely valuable. For example, locating a lost semi trailer outfitted with a wireless locating device could save a trucking company many thousands of dollars. Locating a wireless caller experiencing an emergency could save the caller's life by appropriately directing emergency services. Many wireless device manufacturers are incorporating GPS into their devices but for many devices this is not yet appropriate due to cost, size, battery power demands, the poor signal penetration of GPS in the operating environment, or other factors. Legacy devices will continue to exist in the marketplace that do not have the capability to provide their own location.

This invention provides a method of gee-locating a received signal by utilizing signal path delay measurements taken from one or more free drifting, high altitude lighter-than-air platforms. The method has the following advantages: The invention does not require the wireless device that it is tracking to contain position determining circuitry such as GPS thereby reducing the size, cost, weight and power of the mobile transmitter. It works with currently available wireless devices such as wireless phones, two-way pagers, advanced messaging devices, wireless Internet access devices, and almost any wireless information access device to add location capabilities without requiring modification. It has higher accuracy than solely using the knowledge of which tower or towers are currently receiving the mobile transmitter signal even with the use of sectored antennas. It does not require specialized directional antennas. Extremely large coverage areas can be provided from a single receiver.

The present invention utilizes multiple signal path delay measurements by high altitude platforms of the received signal from a wireless device to determine the wireless device's position. This method can either be used to locate wireless devices registered on a network supplied by the high altitude platform, or to provide or supplement the location capabilities of existing terrestrial based wireless networks of wireless devices registered on their network. In the later case, the high altitude platform needs only to measure the signal path delay of the wireless device and does not need to decode the wireless device's traffic.

Figure 25:
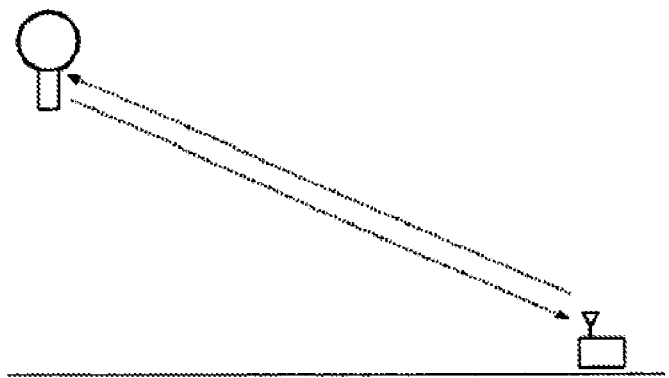
FIG. 25 shows a lighter-than-air platform in two-way communication with a ground-based transceiver.

This invention works with wireless transmitters whose transmissions are time synchronized to a standard. This standard may be GPS time or the timing of the network that the received wireless device is registered on. In most situations, the timing comes from the platform's forward channel transmission to the wireless device. In this case, all wireless devices on the platform's network have their timing synchronized with the received transmissions from the platform. The wireless device then uses this timing for transmissions back to the platform. Because of this, the start of a signal received at the platform from a wireless device is delayed by twice the signal path delay of the distance between the platform and the wireless device (FIG. 25). This signal path delay is measured by the platform and later converted to a distance. The distance from the platform to the wireless device is roughly Distance in meters=300,000,000*measured signal path delay in seconds/2.

Figure 26:
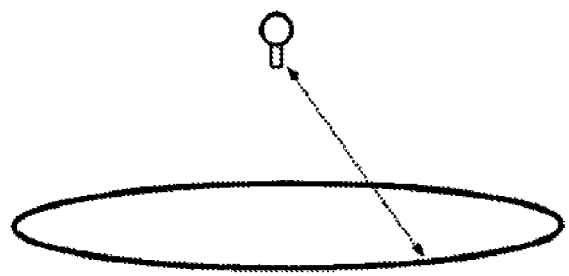
FIG. 26 shows a ring of equal propagation delay from a lighter-than-air platform on the ground.

If the platform uses a non directional antenna and the wireless device is on the ground, a rough circle can be traced on the surface of the earth with the platform as the center of the circle. The radius of the circle is the distance from the platform to the wireless device. The wireless device is located on this circle (FIG. 26). As the trace is the intersection of the surface of the earth with a measured distance from the platform (the distance calculated from the signal path delay), and the earth's terrain is not spherical, the trace does not form an exact circle.

Figure 27:
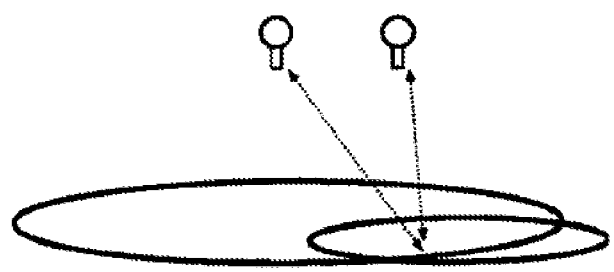
FIG. 27 shows rings of equal propagation delay from two separate lighter-than-air platforms.

A platform in a different position above the earth receiving the signal from the same wireless device also measures a signal path delay. This delay is also converted to a distance and can roughly trace out a circle drawn on the surface of the earth of the possible locations of the wireless device as described above. Again, this does not form an exact circle due to the earth's terrain. The intersections of these two rough circles give the two potential locations of the wireless device (FIG. 27).

A third position of a platform receiving the signal from the same wireless device also measures a signal path delay. This delay is also converted to a distance and can roughly trace out a circle drawn on the surface of the earth of the possible locations of the wireless device. Again, this does not form an exact circle due to the shape of the earth and varying terrain. The intersections of this circle with one of the two points from the prior intersection finally determines the location of the wireless device.

The geo-location of a wireless device, as described above, requires three measurements from a platform or platforms. The primary requirement is that the platform position be different for each measurements to allow the circles to form points at the intersections. It is possible to use a single platform taking measurements at three different positions as the platform moves. It is best if the three measurements be taken as close in time to each other as possible or practical to reduce the chance that the wireless device has moved between measurements. The measurements do not need to be taken simultaneously as is the case with other geo-location methods.

Although the single platform taking three separate signal path delay measurements has the potential to be the least accurate due to movement of the wireless device, it does not tie up the resources of other platforms to locate one wireless device. This is especially true when the wireless device is using a platform to supply its network. Therefore, the most preferred embodiment is that of the single platform geo-location.

Although three separate signal path delay measurements are necessary mathematically to determine the position of a wireless device on the surface of the earth, two measurements may be sufficient if the wireless device is known to stay in an area on the earth that is small relative to the distance between the two points acquired from the intersection of the first two signal path delay measurements. The wireless device location can be assumed to be the point closer to the usual or known most recent location of the wireless device.

Using sectored or directional antennas on one or more of the platforms performing the measurements may reduce the number of measurements needed to two. For example, if two separate measurements are taken from a platform or platforms with a 3-sectored antenna, the circles traced on the surface of the earth are reduced to 120-degree arcs. In a majority of the cases, the two arcs will only intersect at one point, that point being the location of the wireless device.

Satellite and terrestrial systems also employ various forms of geo-location although the methods are different. Satellite systems generally either have GPS units onboard the wireless device and do not need to geo-locate the device or they utilize Time Difference Of Arrival (TDOA) calculations to obtain the wireless device location. Time difference of arrival requires that more than one satellite receive the wireless device's signal simultaneously. Also, satellite systems employing geo-location techniques can rely on ephemeris data to calculate the location of the satellite. This mathematical method of determining location is not available to free drifting platforms and therefore an additional sensor such as GPS is required to determine the platforms position. Low earth satellite systems travel at significant speeds with respect to the earth (generally over 17,000 mph) and therefore must account for Doppler in their techniques. The present invention is moving at such a rate that Doppler adjustments are not necessary (under 100 mph). Terrestrial systems such as the various voice networks, do not need to sense the receiver position as the towers used are fixed. Nor do terrestrial systems require that ability to update their terrain maps when calculating the position of the wireless device as the terrain does not vary for that tower. The present invention must do both of these as it free drifts with the wind. An advantage of the present advantage is that excessive signal filtering is generally not required on a free drifting platform in order to perform the geo-location since there are no near, overpowering transmitters as there can be for terrestrial receivers. Reducing the amount of filtering on the receiver can mean a significant reduction in both size and weight of the required hardware.

The geo-location system consists of a ground network, one or more high altitude, LTA platforms, and wireless devices located on the ground. The ground network consists of a receiver capable of receiving signal path delay measurement information from a high altitude, LTA platform wirelessly, and at least one processor that can receive the data from the receiver. The processor is capable of calculating distance from multiple signal path delay measurements, calculating distance vectors onto terrain maps to determine distance circles, and determining intersections of circles and points on a terrain map to determine the location of a wireless device.

The high altitude, lighter-than-air platform consists of a receiver capable of receiving a signal from a wireless device, a GPS unit capable of providing position and timing information, and a processor capable of measuring the difference between a timing standard and the received signal from the wireless device, a wireless data link from the platform to a ground network to allow the receiver to send the signal path delay related information and platform position to the ground network.

The wireless device synchronizes its timing to either GPS, the received forward channel from the platform or from the terrestrial network the wireless device is registered on. The receiver on the platform receives frames transmitted from the wireless device. The processor compares the arrival time of the received frame from the receiver to the reference timing of the appropriate network or GPS to obtain the signal path delay. The processor sends the calculated signal path delay and the current platform location over the wireless data link to the ground network. The ground network converts the signal path delay to distance and calculates a rough circle on the surface of the earth using the calculated distance to the wireless device as the radius and the position of the platform as the center of the circle. This circle is rough in shape due to the earth's terrain. The wireless device location lies somewhere on this circle. A platform at a second position performs the same operation on the same wireless device to calculate a second rough circle on the earth. The intersection of these two circles forms two points on the earth's surface. A platform at a third position, again, performs the same operation on the same wireless device to calculate a third rough circle on the earth which intersects one of the two points from the previous intersection. That point is the location of the wireless device.

When the platform is locating a wireless device registered on a terrestrial network, the platform's ground network must have access to the timing standard used by the terrestrial network as well as the location of the tower the wireless device is communicating with in order to measure the signal path delay as this delay includes the signal path delay of the transmission from the network tower to the wireless device as well as the signal path delay from the wireless device to the platform. In this case, the roughly circular trace that the wireless device is located on becomes an ellipse with the platform and the terrestrial towers as the focal points of the ellipse. As the platform is at a significant altitude and has a large coverage area in which it can receive signals, when there is a need to locate a wireless device that is registered on a terrestrial network, it is desirable to have the terrestrial network command the wireless device to switch to a less used or dedicated frequency. This reduces or eliminates the number of received signals seen by the platform when the signal path delay measurements are made.

Depending on the protocol and frame structure used by the wireless device, the best feature of the frame to make the timing measurement off of may vary. The feature may be the start of a bit or a phase, frequency, or even amplitude change.

The major sources of error when using signal path delay measurements for geo-location come from the wireless devices themselves particularly in the capability of the wireless device to accurately match the timing of their transmissions with the received network timing. Half duplex devices have a much more difficult time accurately timing their transmissions to the forward channel as they must maintain the system timing internally between receiving and transmitting. A significant additional source of error comes from the timing resolution of the platform's receiver. For example, if the timing measurement resolution of the platform's receiver is 100 ns, that translates to a error of up to 300000000*0.0000001/2 or 15 meters of distance error.

Preferably, the LTA platform system of this invention is free-floating, moves at a speed of less than 100 miles per hour, more preferably, less than 50 miles per hour, and floats at an altitude of between 60,000-140,000 feet above the surface of the earth. Also, the geo-location system of this invention does not require that the LTA platforms do not need to account for Doppler shift unlike low earth orbit satellites.

Most scientific, commercial, and other ballooncraft payloads are worth the additional cost of recovering them. The largest problem with recovering payloads is knowing the actual landed location. Inmost situations, contact with the payload is lost when the payload falls below the horizon from the ground station and line of sight communications are lost. The landed location of payload can only be estimated. If communication with the payload is lost at a relatively high altitude, the payload may drift a significant distance as it descends and finding the payload's landed location becomes difficult. Satellite telemetry devices have been placed on payloads to solve this problem but remain a costly option. The weather services around the world currently launch approximately 800,000 radiosondes each year. Only about 18% of these radiosondes are recovered, reconditioned and reclaimed. The National Weather Service has no way of locating them once on the ground. A method of locating these payloads would significantly reduce the number of non-recovered payloads littering the ground.

The present invention uses a low cost transmitter to send the GPS position of a landed payload to a second, aloft ballooncraft for relay to a ground station to aid in recovery or to confirm the landing site. The electronics for such a system are much less complex and costly than that of a satellite telemetry unit as the design does not need to incorporate processing for large Doppler shifts. Also, the second ballooncraft is significantly closer to the landed payload than even a low earth orbit satellite and therefore the location transmitting device on the landed payload requires less transmit power than that needed to communicate with a satellite.

The location transmitting device on the payload consists of a GPS unit capable of supplying position data, a transmitter capable of transmitting data in a desired protocol such as FLEX or POCSAG on a desired frequency such as the NPCS frequencies, a processor capable of reading data from the GPS unit and sending data to the transmitter for transmission, and a power supply capable of supplying power to the GPS unit and the transmitter. The processor is connected to the GPS unit in order to receive position and timing data. The processor is connected to the transmitter to enable the processor to send data wirelessly to the second, aloft balloncraft. The power supply is connected to supply both the transmitter and the GPS unit with power.

The processor receives position data from the GPS unit. In order to determine if the payload has landed or is close to landing, the processor looks for at least two conditions. The first condition is that the payload is not changing position (including altitude). Filtering the GPS position and altitude data may be necessary to allow this determination. The amount of filtering necessary depends on the actual GPS unit used as some units supply filtered position data. The second condition is that the altitude of the landed payload is determined to be below a stored value such as 15,000 feet. As most ballooncraft missions operate above 60,000 feet, this prevents the location-transmitting device from transmitting during normal operation. Other conditions may be added to assure that the payload has landed before transmission starts. When the processor has determined that the payload has landed, the processor reads the current GPS position and sends it to the transmitter for transmission to the second, aloft ballooncraft. The processor continues to send the position data to the transmitter at set intervals such as once every 30 minutes. The second, aloft ballooncraft receives the position transmission and relays the information to its ground station to aid in recovery or confirm the landing site as is shown in FIG. 9.

In an alternate embodiment, the transmitter is replaced with a transceiver capable of operating in a desired 2-way protocol such as ReFLEX, GSM, CDMA, or iDEN on a desired frequency such as the NPCS or BPSC frequencies. When the ground station wishes to determine the position of the landed payload, and a second, aloft ballooncraft is within communications range of the landed payload, the ground station sends a request to the location transmitting device transceiver through the second, aloft ballooncraft. The processor receives the request, queries the GPS for position and sends the position data to the transceiver for transmission to the second, aloft ballooncraft for relay to its ground station to aid in recovery or confirm the landing site as is shown in FIG. 9.

Alternately, the transmitter could utilize a low power unlicensed frequency.

A device such as the CreataLink 2XT from SmartSynch, Inc. has an processor integrated with a ReFLEX transceiver. This device could be used in place of a separate transceiver and processor.

If the mission of the second, aloft ballooncraft is providing service as a wireless network for wireless devices such as ReFLEX telemetry units or digital phones (using iDEN, CDMA, GSM, or other digital protocols used for voice services), the landed payload can operate as another wireless device on the ballooncraft wireless network. This allows the landed payload to perform its function of reporting its location to the ground station by acting simply as another wireless device on the system. The landed payload could then send a message or place a call to the ground station to provide its location as another wireless device operating on the ballooncraft's service.

To reduce cost and complexity, an existing processor already on the payload that is performing other functions during the flight, but is idle now that the flight is over could do the processing functions described above in order to save costs. The power needs of the location-transmitting device could also be provided by the payload's existing power supply.

Another preferred application of the geo-location system and method of this invention is usage monitoring and determining the location of ground-based vehicles, particularly semi trailers. Knowing the location and movement of semi trailers can significantly reduce the cost of searching them when they are stolen or simply misplaced. It is also important to know when the trailers require periodic maintenance. The trucking industry has utilized mechanical tire rotation counters mounted to the hub of trailers to measure the distance traveled by the trailers primarily for maintenance purposes but these have to be manually read. This invention provides a low cost, wireless means for remotely monitoring semi trailer location and usage information.

The present invention utilizes a GPS unit, a processor, a wireless transceiver, a power source, and a tire rotation sensor mounted in a weatherproof housing attached to the hub of a semi trailer wheel for the purpose of measuring the current speed, distance traveled, location and other usage related values of the semi trailer and wirelessly transmit this information back to a host office through a wireless network either automatically or upon request.

Figure 28:
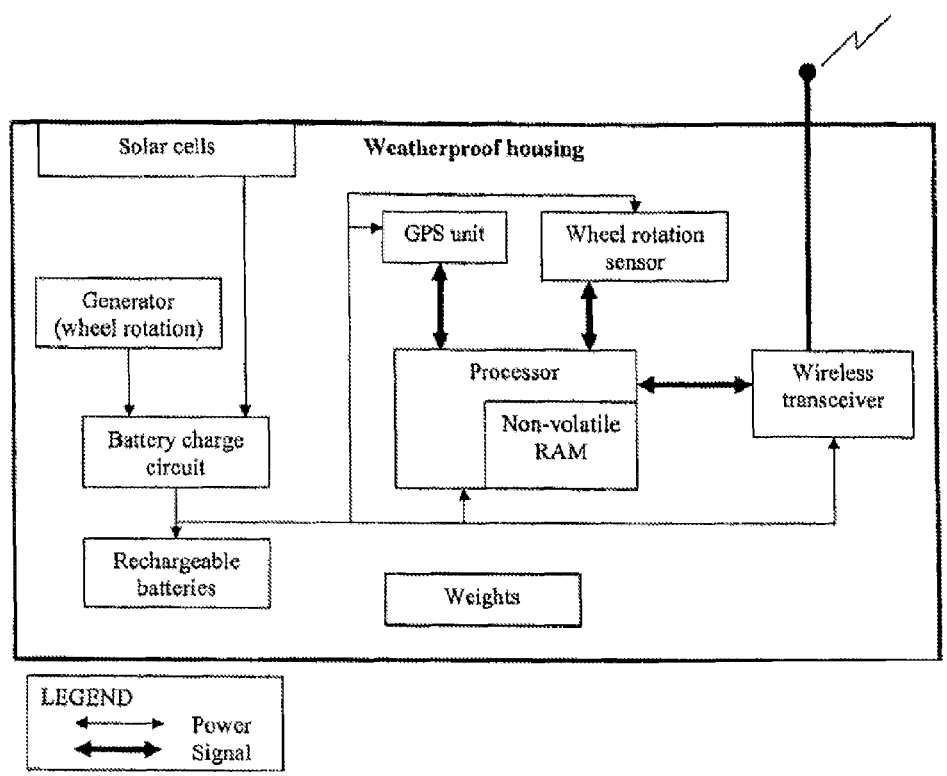
FIG. 28 shows a weatherproof housing for attachment to the hub of a semi trailer wheel for the purpose of measuring the semi trailer usage and location.

In its preferred embodiment, a tire rotation sensor, a transceiver, a power source, a processor, and GPS unit are located within a weatherproof housing that is rotatably attached to the hub of a vehicle wheel (FIG. 28). The weatherproof housing does not rotate with the wheel as it is rotatably attached to the wheel and is weighted to maintain an upright position at all times.

The processor is connected to the output of the tire rotation sensor and can communicate with the GPS unit for the purpose of receiving position, speed, direction, and timing information from the GPS unit. The processor is also connected to the transceiver in order to exchange data and commands wirelessly through the network with the host office. The power supply provides power for the GPS, processor and tire rotation sensor. The power supply may be batteries, solar cells mounted on the weatherproof housing so as to be visible externally, a generator that utilizes the rotation of the wheel with respect to the housing to generate electricity or, most likely, a combination of the three. If either the solar cells or the generator are used, the batteries must be rechargeable. If rechargeable batteries are used, a charging circuit receives power from the generator or the solar cells and charges the rechargeable batteries with this power appropriately. The generator is mounted in the weatherproof housing and attached to the hub such that when the vehicle is moving, the generator shaft is turned. The solar cells when sunlight is available and the internal generator when the vehicle is moving, provide power to charge the internal rechargeable batteries through the charging circuit. The processor removes power from the GPS or places the GPS in low power mode when the GPS is not in use to reduce power consumption. The processor may also put itself into a low power mode that wakes up when the tire rotation sensor senses movement, a query comes from the host office through the transceiver, or a timed interval has elapsed.

In operation, the processor monitors the tire rotation sensor to determine vehicle speed and distance traveled. The processor queries the GPS unit to determine vehicle position if significant tire rotations have occurred or when queried by the host office. Values such as the semi trailer's maximum speed, total distance traveled, and total traveling time are stored in the processor's non-volatile memory for transmission. Alternately, the tire rotation sensor can be removed and speed and distance may be computed by the processor using GPS data such as heading, speed, and position.

Upon request from the host office, at scheduled intervals, or at specific events such as when the vehicle starts moving or when the vehicle leaves a specific geographical area, the processor sends the required values to the wireless transceiver for transmission to the host office. The transceiver communicates with the host office over a ReFLEX, CDPD, GSM, CDMA, TDMA, iDEN™, or other selected network. The transceiver may be replaced with a transmitter if the network used does not require a device to have a receiver in order to operate on the network. FLEX and POCSAG networks are examples of this.

Yet another embodiment of this invention is a steerable recovery system that is applicable for autonomous, GPS guided parachutes and gliders. Steerable parachutes and gliders are important for the recovery of expensive payloads, safely avoiding populated areas during descent, and for specific target delivery applications. Generally, the control systems for these steerable recovery systems are not designed for low cost as the payloads themselves are very expensive and the control system is a fraction of the overall cost. Recent, high volume, low cost ballooncraft applications have made a simplified, lower cost control system more important. This invention reduces the overall cost of an autonomous steerable recovery system by utilizing novel algorithms that allow operation without the need for a compass and airspeed indicator. This invention has applicability in the scientific, meteorological, commercial, and other fields.

Steerable recovery systems require five inputs: (1) the current position of the steerable body; (2) the target position where the steerable body should land; (3) the ground track vector; (4) the local wind vector; and (5) the flight vector. The three different vectors are used in the control of an autonomous steerable recovery system, the Ground track vector which is the direction and speed that the Recovery system is moving with respect to the earth's surface, the Local wind vector which is the direction and speed of the wind at the Recovery system with respect to the ground, and the Flight vector which is the direction and speed the Recovery system is moving with respect to the local air at the recovery system. Typical autonomous, GPS guided recovery systems use GPS to provide the Ground track vector. An onboard compass supplies the Flight vector direction, and the flight vector speed is either provided by a pitot tube or by estimating the forward travel from the glide ratio and current fall rate. With these two vectors, the Local wind vector can be determined as the Ground track vector is the sum of the winds acting on the Recovery system (Local wind vector) and the speed and direction in the local air of the Recovery system (Flight vector).

Figure 29:
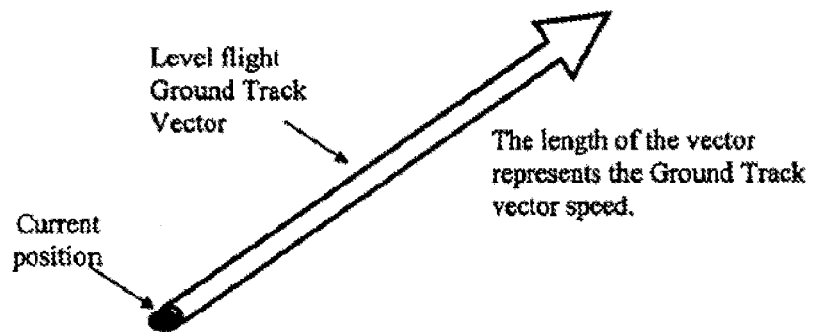
FIG. 29 shows a ground track vector.
Figure 30:
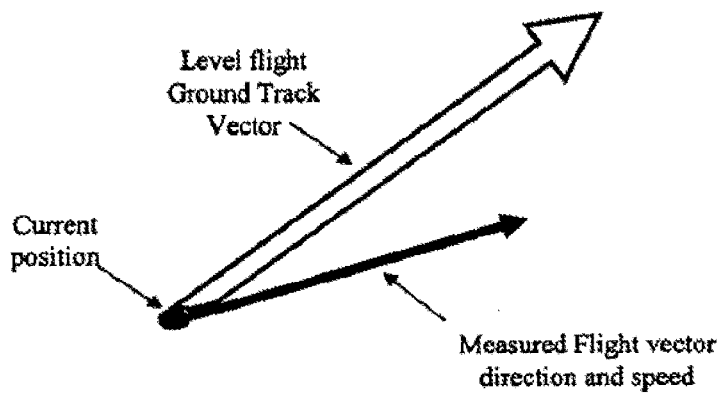
FIG. 30 shows a ground track vector and flight vector.
Figure 31:
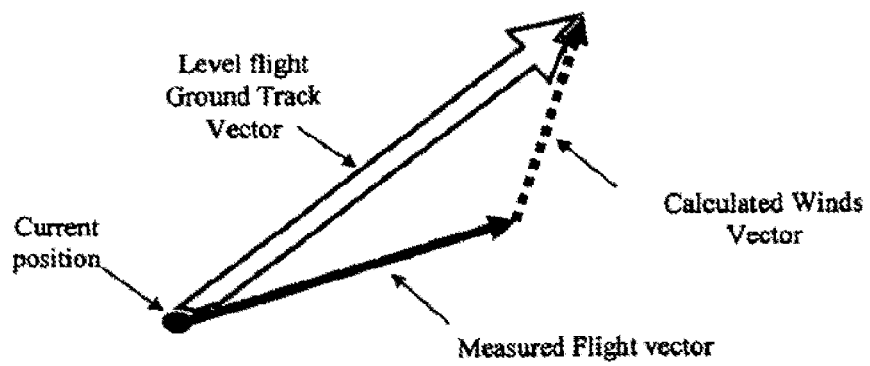
FIG. 31 shows a ground track vector, flight vector and calculated wind vector.
Figure 32:
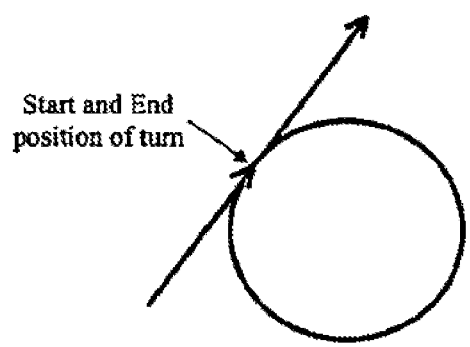
FIG. 32 shows the full circle procedure under no wind for effectively nullifying the flight vector.
Figure 33:
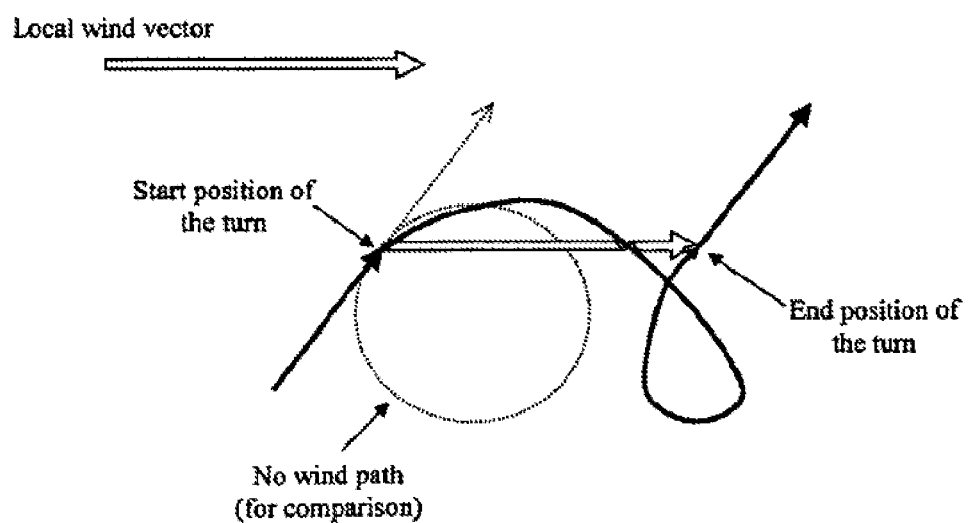
FIG. 33 shows the full circle procedure under wind for effectively nullifying the flight vector.

This invention relating to steerable recovery systems can be summarized as follows with reference to FIGS. 29-33. A GPS supplies the Recovery system's current position and Ground Track vector. The Ground track vector is measured before starting the turn so that it is measured in non-turning flight (FIG. 29). In present systems, a compass is used to determine the Flight vector's direction and the Flight vector's speed is either calculated from the descent rate and the estimated glide ratio of the Recovery system or by using an airspeed sensor (FIG. 30). The measured Flight vector is one of the two components that sum together to form the Ground Track vector (FIG. 31). The second component, the Local winds vector, is determined by subtracting the measured Flight vector from the Ground track vector. In the present invention, the Local winds vector is determined by effectively nullifying the Flight vector and calculating the new Ground Track vector over the period of time the Flight vector is nullified. In order to null the Flight vector, the Recovery system is placed into a constant turn for one full revolution. If no local winds are present (Local vector equals zero), the path of the Recovery system with respect to the ground is a circle (FIG. 32). Over the total period of time of the turn, the effective Ground track vector is zero as the Recovery system ended up in the same position in latitude and longitude that it started. Since the Ground track vector was measured to be zero during the turn, the winds are calculated to be zero since the Ground track vector equals the sum of the Local winds vector and the Flight vector and the Flight vector was nullified by turning in a circle over the period of the turn. If local winds are present, the path of the Recovery system is a circle shifted by the local winds. In the following example, the Local Winds vector is from the west (heading 90 degrees) (FIG. 33). The path of the Recovery system during the complete circle is pushed to the East by the Local wind vector. The path of the Recovery system (above) shows how the start and end positions of the circle are shift by the local winds. By measuring the start and end positions during the turn and dividing by the time it took to complete the full circle, the Local wind vector is determined. Subtracting the Local winds vector from the Ground track vector taken in level flight (before the start of the turn) the Flight vector is determined. By the steering method of this invention, the payload of the steerable recovery system need not have a compass and air speed indicator, which are required in conventional systems to determine the Flight vector.

GPS is unable to provide the Flight vector direction because GPS's position and Ground track vectors are in relation to the earth's surface and give no information as to the Recovery System's flight through the air around it. The Recovery systems flight direction is in reference to the local air. For example, if the Recovery system is facing west with a airspeed of 40 mph and the wind speed is 60 mph toward the East, GPS will provide a Ground Track vector of East at 20 mph although the steerable system is actually facing West. This is why a compass is necessary to provide the actual direction the Recovery system is facing and not the direction the recovery system is moving with respect to the ground. For the same reasons given above, the Flight vector speed must also be determined from sources other than the GPS as the Flight vector speed is the airspeed and not the Ground track speed. Therefore it is necessary either to have an airspeed sensor on the Recovery system or to estimate the Flight vector speed from the Recovery system's glide ratio.

Since the Ground track vector is the sum of the Local winds vector and the Flight vector, if the Flight vector can be removed or nullified, then the Local winds vector becomes equal to the current Ground track vector. This invention nulls both the direction and speed of the Recovery system through the local air (the Flight vector) by flying the Recovery system in a complete circle and measuring the Ground track vector over the interval. As there is no compass on board the Recovery system, one complete turn is determined by monitoring the Ground track vector direction. When the vector matches that recorded at the start of the turn, one full turn is complete. Over the period of time it takes to make the full circle any component of the Flight vector is removed as it average out to zero. Therefore, the only lateral force on the Recovery system is the wind. By taking the change in position over the total time to loop, the Local wind vector is determined. The Flight vector can then be determined by subtracting the Local wind vector from the Ground track in level flight. The calculations involved in determining the Local wind vector (direction and speed) as well as the Flight direction vector follow.

Make the following measurements during flight in order to null the contributions of the Flight vector:

Place the steerable parachute or glider into a constant rate of turn. The speed of the turn is not critical although the rate should be chosen to minimize the altitude change during the complete turn. This minimizes the error due to changes in the Wind vector with altitude. It is important that the turn rate be as constant as possible.

Record the Ground vector, position, and time.
Start Ground Vector direction (degrees)
Start Ground Vector speed (m/s)
Start latitude (decimal)
Start Longitude (decimal)
Start Time (GPS seconds)

Continue the turn until the ground vector direction matches that recorded at the start of the turn Record the current ground position, and time.
End latitude (decimal)
End longitude (decimal)
End Time (GPS seconds)

Calculate the Local wind vector and the Flight vector using the method and formulas below.

To return to the original direction, roll out of the turn and adjust direction to maintain the initial Ground track vector direction.

To continue turning to a new Flight vector direction continue to turn the number of seconds calculated below before rolling out of the turn.

Number of additional degrees of turn desired*(End_Time−Start_Time)/360

Alternately, the appropriate Ground track vector direction can be calculated from the newly calculated Local wind and Flight vectors.

Taking the end measurements when passing through the exact heading as that of the start measurements allows the measurement period to be that of one complete turn. By flying the recovery system in a constant, complete circle any component of the Flight vector is removed from the Ground track vector for the period from Start Time to End Time. The only lateral force on the Recovery system is the Local wind. By taking the change in position over the total time to complete a full turn, the Local wind vector is determined.

The latitude and longitude change during one complete turn due to the local winds are calculated as follows:

Latitude_change_(radians)=[Start_latitude_(decimal)−End_latitude_(decimal)]*$pi$/180

Longitude_change_(radians)=[Start_longitude_(decimal)−End_longitude_(decimal)]*$pi$/180

Converting latitudinal and longitudinal change during one complete turn to the Local wind North and East components in meters per second requires the non-spherical earth model to convert latitudinal and longitudinal change to actual distances and rates. The formulas can be summarized as:

Radius of the Earth at latitude($Rn$)=$R$avg/(1−Eccent*(sin(latitude_change_(radians))^2))

Where $R$avg is the average radius of the earth=6378137 meters and Eccent is the earth's eccentricity=0.00669437999014138

Local_Winds_North_(m/s)=$Rn$*Latitude_change_(radians)/(End_Time−Start_Time)

Local_Winds_East_(m/s)=$Rn$*cos((Start_Latitude_(decimal)+End_Latitude_(decimal)/2)*$pi$/180)*(Longitude_change_(radians)/(End_Time−Start_Time)

Convert the Local wind components to a vector (Local winds vector).

Local_winds_direction_(degrees)=Arc TAN(Local_winds_North_(m/s)/Local_Winds_East_(m/s))

If the Local Wind direction is negative, add 360 degrees.

Local_winds_speed_(m/s)=SQRT((Local_Winds_North_(m/s))^2+(Local_Winds_East_(m/s))^2)

From the Ground track vector from GPS and the Local wind vector, the Flight vector can be determined. It is easier to subtract the Local wind vector from the Ground track vector when both vectors are converted to North and East components first:

Convert the Ground track vector to its North and East components.

Ground_Track_North_(m/s)=cos(Start_Ground_Vector_Direction_(degrees)*$Pi$/180)*Start_Ground_Vector_Speed_(m/s)

Ground_Track_East_(m/s)=sin(Start_Ground_Vector_Direction_(degrees)*$Pi$/180)*Start_Ground_Vector_Speed_(m/s)

Subtract the Local wind components from the Ground Track components to arrive at the Flight components.

Flight_North_(m/s)=Ground_Track_North_(m/s)−Local_Winds_North_(m/s)

Flight_East_(m/s)=Ground_Track_East_(m/s)−Local_Winds_East_(m/s)

Convert the Flight components to a vector (the Flight Vector).

Flight vector direction(degrees)=Arc TAN(Flight_North_(m/s)/Flight_East_(m/s))

If the Flight direction is negative, add 360 degrees.

Flight vector speed(m/s)=SQRT((Flight_North_(m/s))^2=(Flight_East_(m/s)^2)

Now the Flight vector and the Local wind vector have been separated from the Ground track vector and the steering control algorithms can use their components.

The software functions above can be implemented into the control system of an autonomous Recovery system such as an autonomous, GPS guided, steerable parachute or glider. A typical system consists of at least the steerable parachute or glider, one or more steering actuators, a GPS unit for position data, ground track, and time, a processor to perform the algorithms described above, and a power source for the processor and actuators. No airspeed sensor or compass is needed.

A steerable parachute includes steering control lines that are pulled or released to effect a turn of the Recovery system. A steering actuator such as a winch, could turn one way to pull the right turn steering control line and turn the other way to pull the left turn steering control line. The processor controls the actuator to steer in either direction. The processor receives the Ground track vector, position data, and time from the GPS unit. The processor initiates a complete circle as described above, receives information from the GPS and applies the algorithms described above to determine the current Flight and Local winds vectors. The processor then controls the actuators appropriately to end or continue the turn based on its steering algorithm in order to negotiate to the target landing position.

A single control line may also be used to steer the parachute. This allows the parachute to turn primarily in only one direction (direction A). The parachute would either be turning in direction A or adjusted to straight flight by the actuator under processor control (by maintaining a constant Ground track direction). The steerable parachute would be designed to have a natural inclination to turn slightly in the opposite of direction A (direction B) when the steering line is completely slack. Slightly adjusting (pulling) the control line would cause the parachute to fly straight as indicated to the processor by a constant Ground track direction. Further pulling the control line would cause the parachute to turn in direction A. This capability to trim the parachute for straight flight is generally necessary to correct for individual differences in the parachutes.

Because the local winds may change as the Recovery system descends into different winds, the Flight and Local wind vectors will occasionally need to be recalculated to account for both the new Local winds and the change in the Flight vector due to changes in air density and other factors. There may be additional error due to differing winds between those at the start measurements and those at the end measurements. The full circle procedure described above should be done as often as necessary for the desired accuracy of the Flight vector. The major drawback to performing the full circle procedure more frequently is that the effective forward motion of the Recovery system is not available while in the full circle procedure.

An example of the inventive method being used to determine Local wind and Flight vectors without the use of a compass or airspeed indicator is shown in Table 1.

Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

STEERABLE RECOVERY SYSTEM EXAMPLE

LEGEND   Black on white values are supplied by the GPS unit
Black on grey values are calculated by the processor using the formulas

| | |
|---:|:---:|
| Start Ground Vector direction (degrees) | 61 |
| Start Ground Vector speed (m/s) | 12 |
| Start latitude (decimal) | 33.11 |
| Start Longitude (decimal) | 111.858 |
| Start Time (GPS seconds) | 908311 |
| End latitude (decimal) | 33.09 |
| End longitude (decimal) | 111.87 |
| End Time (GPS seconds) | 908406 |
| Number of additional degrees of turn desired | 21 |

The latitude and longitude change per second due to the local winds:

| | |
|---:|:---:|
| Latitude_change_(radians) | -0.0003491 |
| Longitude_change_(radians) | -0.0002094 |

Converting latitudinal and longitudinal winds to meters per second North and meters per second East requires the non-spherical Earth model. The formulas can be summarized as:

| | | |
|---:|:---:|:---|
| Ravg | 6378137 | meters |
| Eccent | 0.00669438 | |
| Radius of the Earth at latitude(Rn) | 6378137 | meters |
| Local_North_wind_(m/s) | -23.44 | |
| Local_East_wind_(m/s) | -4.23 | |

Calculate the Local wind vector direction and speed from the north and east wind components.

| | |
|---:|:---:|
| Local_wind_direction_(degrees) | 190.24 |
| Local_wind_speed_(m/s) | 23.82 |

From the Local wind vector and the Ground track vector from GPS, the Flight vector can be determined as follows:

Convert the Ground track vector to North and East components

| | |
|---:|:---:|
| Ground track North (m/s) | 5.82 |
| Ground track East (m/s) | 10.50 |

Subtract the Local wind North and East components from the Ground track North and East components to get the Flight components. This is done because the Ground Track vector is the sum of the Local winds vector and the Flight vector.

| | |
|---:|:---:|
| Flight North (m/s) | 29.25 |
| Flight East (m/s) | 14.73 |

Convert the Flight North and East components to a vector

| | |
|---:|:---:|
| Flight vector direction (degrees) | 26.73 |
| Flight vector speed (m/s) | 32.75 |

To calculate a change from the initial heading

To continue the turn to a new Flight vector direction continue to turn the number of seconds calculated below before rolling out of the turn.

| | | |
|---:|:---:|:---|
| Continue the turn at the same bank angle for | 5.5 | seconds |

The invention claimed is:

1. A method to determine a location of a device transmitting wireless signals to a plurality of lighter-than-air (LTA) platforms, the method comprising:
   taking, at a processor configured to determine the location, signal path delay measurements from the plurality of LTA platforms, wherein the signal path delay measurements are determined at the plurality of LTA platforms based on wireless signals received at the plurality of LTA platforms from the device;
   determining, at the processor, the location of the device transmitting wireless signals based on the signal path delay measurements; and
   communicating, by the processor, the location of the device transmitting wireless signals to an LTA platform.

2. The method of claim 1, wherein one or more of the plurality of the LTA platforms float at an altitude of about 60,000-140,000 feet.

3. The method of claim 1, wherein one or more of the plurality of the LTA platforms have a speed relative to the surface of the earth of less than 100 miles per hour.

4. The method of claim 1, wherein the signal path delay measurements are performed by measuring a difference between a time of arrival of a wireless signal of the device transmitting wireless signals and a standard time.

5. The method of claim 1, wherein the determining the location of the device transmitting wireless signals is based on the signal path delay measurements from at least three independent LTA platforms.

6. The method of claim 1, wherein the device transmitting wireless signals is located (a) on an LTA platform that has landed on the earth, or (b) on a ground-based vehicle.

7. The method of claim 1, wherein the device transmitting wireless signals includes a radiosonde.

8. The method of claim 1, wherein the device transmitting wireless signals includes a landed payload.

9. The method of claim 8, wherein the device transmitting wireless signals includes a payload that has landed on the earth.

10. The method of claim 9, wherein the determining that the device transmitting wireless signals has landed on the earth comprises checking for no shifting of the location of the device transmitting wireless signals.

11. The method of claim 1, wherein the determining the location of the device transmitting wireless signals based on the signal path delay measurements comprises:
    determining distances from the device to the plurality of LTA platforms;
    tracing out approximate circles on the earth based on the distances; and
    determining a point of intersection of the circles, wherein the point of intersection is substantially the location of the device transmitting wireless signals.

12. The method of claim 11, wherein the taking signal path delay measurements is taking only two signal path delay measurements.

13. The method of claim 11, wherein the taking signal path delay measurements is performed using sectored or directional antennas.

14. A method to determine a location of a device transmitting wireless signals to one or more (LTA) platforms, the method comprising:
    taking, at a processor configured to determine the location, signal path delay measurements from an LTA platform, wherein each of the signal path delay measurements is determined at the LTA platform based on a wireless signal received at the LTA platform from the device at a different interval of time;
    determining, at the processor, the location of the device transmitting wireless signals based on the signal path delay measurements; and
    communicating, by the processor, the location of the device transmitting wireless signals to the LTA platform.

15. The method of claim 14, wherein the signal path delay measurements at different intervals of time from only one LTA platform.

16. The method of claim 14, wherein the device transmitting wireless signals includes a radiosonde.

17. The method of claim 14, wherein the device transmitting wireless signals includes a landed payload.

18. The method of claim 14, wherein the device transmitting wireless signals includes a payload that has landed on the earth.

19. The method of claim 18, wherein the determining that the device transmitting wireless signals has landed on the earth comprises checking for no shifting of the location of the device transmitting wireless signals.

20. The method of claim 14, wherein the signal path delay measurements are performed by measuring a difference between a time of arrival of a wireless signal of the device transmitting wireless signals and a standard time.

21. The method of claim 14, wherein the device transmitting wireless signals is located (a) on an LTA platform that has landed on the earth, or (b) on a ground-based vehicle.

22. The method of claim 14, wherein the determining the location of the device transmitting wireless signals based on the signal path delay measurements comprises:
    determining a first distance from the device to the LTA platform at a first time instance;
    tracing out a first approximate circle on the earth based on the first distance;
    determining a second distance from the device to the LTA platform at a second time instance;
    tracing out a second approximate circle on the earth based on the second distance; and
    determining a point of intersection of the first and second approximate circles, wherein the point of intersection is substantially the location of the device transmitting wireless signals.

23. The method of claim 14, wherein the taking signal path delay measurements is performed using sectored or directional antennas.

24. An apparatus to determine a location of a device transmitting wireless signals to a plurality of lighter-than-air (LTA) platforms, the apparatus comprising:
    a communication transceiver to receive signal path delay measurements from the plurality of LTA platforms, wherein the signal path delay measurements are determined based on wireless signals received at the plurality of LTA platforms from the device; and
    a processor to determine the location of the device transmitting wireless signals based on the signal path delay measurements,
    wherein the communication transceiver is to communicate the location of the device transmitting wireless signals to an LTA platform.

25. The apparatus of claim 24, wherein one or more of the plurality of the LTA platforms float at an altitude of about 60,000-140,000 feet.

26. The apparatus of claim 24, wherein the signal path delay measurements are performed by measuring a difference between a time of arrival of a wireless signal of the device transmitting wireless signals and a standard time.

27. The apparatus of claim 24, wherein the device transmitting wireless signals is located (a) on an LTA platform that has landed on the earth, or (b) on a ground-based vehicle.

28. The apparatus of claim 24, wherein the device transmitting wireless signals includes a radiosonde.

29. The apparatus of claim 24, wherein the device transmitting wireless signals includes a landed payload.

30. The apparatus of claim 24, wherein, to determine the location of the device transmitting wireless signals based on the signal path delay measurements, the processor is configured to:
- determine distances from the device to the plurality of LTA platforms;
- trace out approximate circles on the earth based on the distances; and
- determine a point of intersection of the circles, wherein the point of intersection is substantially the location of the device transmitting wireless signals.

* * * * *

UNITED STATES PATENT AND TRADEMARK OFFICE
CERTIFICATE OF CORRECTION

PATENT NO.         : 9,519,045 B2                                    Page 1 of 1
APPLICATION NO.    : 14/473691
DATED              : December 13, 2016
INVENTOR(S)        : Gerald M. Knoblach et al.

It is certified that error appears in the above-identified patent and that said Letters Patent is hereby corrected as shown below:

On the Title Page

Under "Related U.S. Application Data", please replace:
"Division of application No. 13/757,585, filed on Feb. 1, 2013, now Pat. No. 8,825,232, which is a division of application No. 12/099,004, filed on Apr. 7, 2008, now abandoned, which is a division of application No. 10/673,474, filed on Sep. 30, 2003, now Pat. No. 7,356,390, which is a continuation-in-part of application No. 09/342,440, filed on Jun. 29, 1999, now Pat. No. 6,628,941, and a continuation of application No. 10/129,666, filed as application No. PCT/US02/ 12228 on Apr. 18, 2002, now Pat. No. 7,203,491. Provisional application No. 60/284,799, filed on Apr. 18, 2001."

With:
-- Division of application No. 13/757,585, filed on Feb. 1, 2013, now Pat. No. 8,825,232, which is a division of application No. 12/099,004, filed on Apr. 7, 2008, now abandoned, which is a division of application No. 10/673,474, filed on Sep. 30, 2003, now Pat. No. 7,356,390, which is a continuation-in-part of application No. 09/342,440, filed on Jun. 29, 1999, now Pat. No. 6,628,941, and a continuation-in-part of application No. 10/129,666, filed as application No. PCT/US02/12228 on Apr. 18, 2002, now Pat. No. 7,203,491. Provisional application No. 60/284,799, filed on Apr. 18, 2001. --

Signed and Sealed this
Nineteenth Day of June, 2018

Andrei Iancu
*Director of the United States Patent and Trademark Office*